United States Patent
Zhang et al.

(10) Patent No.: US 12,514,419 B2
(45) Date of Patent: Jan. 6, 2026

(54) OCCUPANCY MAP SEGMENTATION FOR AUTONOMOUS GUIDED PLATFORM WITH DEEP LEARNING

(71) Applicant: Trifo, Inc., Santa Clara, CA (US)

(72) Inventors: Zhe Zhang, Sunnyvale, CA (US); Zhongwei Li, Beijing (CN); Peizhang Chen, Guangzhou (CN); Rui Xiang, Beijing (CN); Xu Han, Shanghai (CN)

(73) Assignee: Trifo, Inc., Santa Clara, CA (US)

( * ) Notice: Subject to any disclaimer, the term of this patent is extended or adjusted under 35 U.S.C. 154(b) by 364 days.

(21) Appl. No.: 18/081,672

(22) Filed: Dec. 14, 2022

(65) Prior Publication Data
US 2023/0363610 A1    Nov. 16, 2023

Related U.S. Application Data

(60) Provisional application No. 63/294,907, filed on Dec. 30, 2021.

(30) Foreign Application Priority Data

Dec. 27, 2021    (CN) .......................... 202111613025.5

(51) Int. Cl.
| | | |
|---|---|---|
| *A47L 11/40* | (2006.01) | |
| *G05D 1/00* | (2024.01) | |
| *G06T 7/50* | (2017.01) | |

(52) U.S. Cl.
CPC ........ *A47L 11/4011* (2013.01); *G05D 1/0246* (2013.01); *G05D 1/0274* (2013.01);
(Continued)

(58) Field of Classification Search
CPC ............. A47L 11/4011; A47L 2201/04; G05D 1/0246; G05D 1/0274; G05D 2105/10;
(Continued)

(56) References Cited

U.S. PATENT DOCUMENTS 8,475,275 B2 * 7/2013 Weston .................. A63J 21/00
    463/31
8,639,644 B1 * 1/2014 Hickman ............. G05B 19/042
    706/14
(Continued)

FOREIGN PATENT DOCUMENTS

| CN | 106725135 A | 5/2017 |
|---|---|---|
| CN | 111714042 A | 9/2020 |

(Continued)

OTHER PUBLICATIONS

U.S. Appl. No. 18/081,669, filed Dec. 14, 2022, 20230363609, Nov. 16, 2023, Pending.
(Continued)

*Primary Examiner* — Bhavesh V Amin
(74) *Attorney, Agent, or Firm* — Haynes Beffel & Wolfeld LLP; Andrew L. Dunlap; Paul A. Durdik

(57) ABSTRACT

The technology disclosed includes systems and methods for preparing a segmented occupancy grid map based upon image information of an environment in which a robot moves. The image information is captured by at least one visual spectrum-capable camera and at least one depth measuring camera. The system includes logic to receive image information captured by at least one visual spectrum-capable camera and location information captured by at least one depth measuring camera located on a mobile platform. The system includes logic to extract from the image information, features in the environment. The system includes logic to determine a 3D point cloud of points having 3D information. The system includes logic to determine, from the 3D point cloud, an occupancy map of the environment. The system includes logic to segment the occupancy map into a segmented occupancy map of regions that represent rooms and corridors in the environment.

20 Claims, 52 Drawing Sheets

(52) U.S. Cl.
CPC .............. *G06T 7/50* (2017.01); *A47L 2201/04* (2013.01); *G06T 2207/10028* (2013.01); *G06T 2207/20081* (2013.01); *G06T 2207/20084* (2013.01)

(58) Field of Classification Search
CPC ........... G05D 2107/40; G05D 2109/10; G05D 2111/10; G05D 1/2435; G05D 1/2464; G06T 7/50; G06T 2207/10028; G06T 2207/20081; G06T 2207/20084; G06T 2207/10024; G06T 7/55; G06T 7/11
See application file for complete search history.

(56) References Cited

U.S. PATENT DOCUMENTS

| | | | |
|---|---|---|---|
| 8,790,180 B2 * | 7/2014 | Barney | A63F 13/69 463/42 |
| 9,983,592 B2 * | 5/2018 | Hong | G01C 21/206 |
| 10,032,276 B1 * | 7/2018 | Liu | G06T 7/292 |
| 10,366,508 B1 * | 7/2019 | Liu | G01C 21/1656 |
| 10,390,003 B1 * | 8/2019 | Liu | G01C 21/206 |
| 10,410,328 B1 * | 9/2019 | Liu | G05D 1/0274 |
| 10,423,861 B2 | 9/2019 | Gao et al. | |
| 10,571,925 B1 * | 2/2020 | Zhang | G05D 1/0253 |
| 10,571,926 B1 * | 2/2020 | Zhang | G05D 1/0274 |
| D908,992 S | 1/2021 | Jang | |
| D908,993 S | 1/2021 | Li et al. | |
| D924,522 S | 7/2021 | Jang | |
| 11,069,082 B1 * | 7/2021 | Ebrahimi Afrouzi | H04N 23/56 |
| 11,223,497 B2 * | 1/2022 | Hong | H04W 4/023 |
| D961,177 S | 8/2022 | Jang | |
| 11,592,825 B2 * | 2/2023 | Jung | G06V 40/20 |
| 11,687,092 B2 * | 6/2023 | Thorne | G05D 1/0033 700/255 |
| 11,774,983 B1 * | 10/2023 | Zhang | G05D 1/0253 701/28 |
| 12,140,954 B2 * | 11/2024 | Hong | A47L 9/2826 |
| 12,175,759 B2 * | 12/2024 | Furuhata | G06V 20/52 |
| 12,197,204 B2 * | 1/2025 | Kim | G06F 3/00 |
| 2007/0156286 A1 * | 7/2007 | Yamauchi | G05D 1/0278 700/245 |
| 2007/0192910 A1 * | 8/2007 | Vu | H04N 7/142 901/1 |
| 2008/0086236 A1 * | 4/2008 | Saito | G05D 1/028 901/1 |
| 2008/0154429 A1 * | 6/2008 | Lee | G05D 1/0272 901/1 |
| 2010/0161225 A1 * | 6/2010 | Hyung | G05D 1/0274 345/420 |
| 2010/0332128 A1 * | 12/2010 | Ikeuchi | G01C 21/3859 701/532 |
| 2011/0077802 A1 * | 3/2011 | Halloran | G05D 1/028 701/2 |
| 2011/0205338 A1 * | 8/2011 | Choi | G06T 7/74 348/46 |
| 2012/0095619 A1 * | 4/2012 | Pack | G05D 1/0016 701/2 |
| 2012/0182392 A1 * | 7/2012 | Kearns | B25J 11/009 348/46 |
| 2012/0185091 A1 * | 7/2012 | Field | G05D 1/0088 700/262 |
| 2013/0056032 A1 * | 3/2013 | Choe | G05D 1/0038 15/3 |
| 2013/0245937 A1 | 9/2013 | DiBernardo et al. | |
| 2013/0338525 A1 | 12/2013 | Allen | |
| 2014/0316636 A1 * | 10/2014 | Hong | G05D 1/0274 901/1 |
| 2014/0350839 A1 * | 11/2014 | Pack | G05D 1/0231 901/1 |
| 2015/0234398 A1 | 8/2015 | Harris et al. | |
| 2016/0166126 A1 | 6/2016 | Morin et al. | |
| 2016/0183752 A1 | 6/2016 | Morin et al. | |
| 2017/0196196 A1 | 7/2017 | Trottier et al. | |
| 2018/0012411 A1 | 1/2018 | Richey et al. | |
| 2018/0075403 A1 | 3/2018 | Mascorro Medina et al. | |
| 2018/0284802 A1 * | 10/2018 | Tsai | G05D 1/0253 |
| 2018/0286072 A1 * | 10/2018 | Tsai | G05D 1/249 |
| 2018/0289579 A1 | 10/2018 | Agrawal | |
| 2018/0317725 A1 | 11/2018 | Lee et al. | |
| 2018/0364731 A1 * | 12/2018 | Liu | G06F 18/251 |
| 2019/0026943 A1 * | 1/2019 | Yan | G06T 7/344 |
| 2019/0102667 A1 | 4/2019 | Bashkirov et al. | |
| 2019/0156944 A1 | 5/2019 | Eriksson et al. | |
| 2019/0235083 A1 * | 8/2019 | Zhang | G01S 7/51 |
| 2019/0291277 A1 * | 9/2019 | Oleynik | B25J 9/1669 |
| 2019/0324473 A1 * | 10/2019 | Hillen | G05D 1/0219 |
| 2019/0346271 A1 * | 11/2019 | Zhang | G05D 1/245 |
| 2019/0355173 A1 * | 11/2019 | Gao | G06T 19/20 |
| 2019/0370691 A1 * | 12/2019 | Chae | A47L 11/4061 |
| 2019/0377349 A1 | 12/2019 | van der Merwe et al. | |
| 2019/0392240 A1 * | 12/2019 | Araújo | G06F 3/0304 |
| 2020/0004260 A1 * | 1/2020 | Kim | G05D 1/0274 |
| 2020/0008639 A1 * | 1/2020 | Lee | G05D 1/0274 |
| 2020/0019181 A1 * | 1/2020 | Kim | G05D 1/0246 |
| 2020/0029490 A1 * | 1/2020 | Bertucci | A01B 79/005 |
| 2020/0039068 A1 * | 2/2020 | Kim | G06V 20/52 |
| 2020/0107008 A1 * | 4/2020 | Hur | H04N 13/183 |
| 2020/0117212 A1 * | 4/2020 | Tian | G01C 21/206 |
| 2020/0117213 A1 * | 4/2020 | Tian | G05D 1/0274 |
| 2020/0117898 A1 * | 4/2020 | Tian | G06F 3/04815 |
| 2020/0156255 A1 | 5/2020 | Soltani Bozchalooi et al. | |
| 2020/0192388 A1 * | 6/2020 | Zhang | G05D 1/648 |
| 2020/0225673 A1 * | 7/2020 | Ebrahimi Afrouzi | A47L 11/4011 |
| 2020/0311971 A1 * | 10/2020 | Corcodel | B25J 9/0096 |
| 2020/0334843 A1 * | 10/2020 | Kasuya | G01S 17/86 |
| 2020/0334855 A1 * | 10/2020 | Higo | G06T 7/0002 |
| 2020/0394410 A1 * | 12/2020 | Zhang | G01C 21/1656 |
| 2021/0000006 A1 * | 1/2021 | Ellaboudy | A01B 69/001 |
| 2021/0019527 A1 * | 1/2021 | Zhang | G06V 10/44 |
| 2021/0089040 A1 * | 3/2021 | Ebrahimi Afrouzi | G05D 1/0248 |
| 2021/0114213 A1 * | 4/2021 | Lee | G05D 1/0274 |
| 2021/0121035 A1 * | 4/2021 | Kim | A47L 9/2836 |
| 2021/0142788 A1 * | 5/2021 | Choi | G10L 15/08 |
| 2021/0151043 A1 * | 5/2021 | Lee | G10L 15/20 |
| 2021/0174097 A1 * | 6/2021 | Tsai | G05D 1/245 |
| 2021/0232144 A1 * | 7/2021 | Lee | G05D 1/0217 |
| 2021/0294328 A1 * | 9/2021 | Dhayalkar | G06T 7/73 |
| 2022/0066456 A1 * | 3/2022 | Ebrahimi Afrouzi | G06F 3/04883 |
| 2022/0287527 A1 | 9/2022 | Hong et al. | |
| 2023/0363609 A1 * | 11/2023 | Zhang | G05D 1/0246 |
| 2023/0363610 A1 * | 11/2023 | Zhang | G06T 7/11 |
| 2024/0310851 A1 * | 9/2024 | Ebrahimi Afrouzi | G01S 17/87 |

FOREIGN PATENT DOCUMENTS

| | | |
|---|---|---|
| CN | 111839375 A | 10/2020 |
| CN | 211749328 U | 10/2020 |
| CN | 212382573 U | 1/2021 |
| CN | 112869673 A | 6/2021 |
| CN | 112998605 A | 6/2021 |
| CN | 213309501 U | 6/2021 |
| CN | 214073161 U | 8/2021 |
| CN | 214073183 U | 8/2021 |
| CN | 214414759 U | 10/2021 |
| CN | 214804493 U | 11/2021 |
| CN | 215191283 U | 12/2021 |
| CN | 215457682 U | 1/2022 |
| CN | 215650867 U | 1/2022 |
| CN | 215838790 U | 2/2022 |
| CN | 216020830 U | 3/2022 |
| CN | 216569783 U | 5/2022 |
| WO | 2015063119 A1 | 5/2015 |

OTHER PUBLICATIONS

Zhang et al., ShuffleNet: An Extremely Efficient Convolutional Neural Network for Mobile Devices, dated Dec. 7, 2017, 9 pages.
Lin et al., Network in Network, in Proc. of ICLR, 2014.

(56) References Cited

OTHER PUBLICATIONS

Sifre, Rigid-motion Scattering for Image Classification, Ph.D. thesis, 2014.
Sifre et al., Rotation, Scaling and Deformation Invariant Scattering for Texture Discrimination, in Proc. of CVPR, 2013.
Chollet, Xception: Deep Learning with Depthwise Separable Convolutions, in Proc. of CVPR, 2017. 8 pages.
He et al., Deep Residual Learning for Image Recognition, in Proc. of CVPR, 2016.
Xie et al., Aggregated Residual Transformations for Deep Neural Networks, in Proc. of CVPR, 2017.
Howard et al., Mobilenets: Efficient Convolutional Neural Networks for Mobile Vision Applications, 2017.
Sandler et al., MobileNetV2: Inverted Residuals and Linear Bottlenecks, 2018.
Qin et al., FD-MobileNet: Improved MobileNet with a Fast Downsampling Strategy, 2018.
Oord et al., Wavenet: A Generative Model for Raw Audio, dated Sep. 19, 2016, 15 pages.
Arik et al., Deep Voice: Real-time Neural Text-to-Speech, dated 2017, 17 pages.
Yu et al., Multi-Scale Context Aggregation by Dilated Convolutions, ICLR 2016, dated Apr. 30, 2016, 13 pages.
He et al., Deep Residual Learning for Image Recognition, 2015.
Srivastava et al., Highway Networks, dated 2015, 6 pages.
Huang et al., Densely Connected Convolutional Networks, dated Aug. 17, 2017, 9 pages.
Szegedy et al., Going Deeper with Convolutions, dated 2014, 12 pages.
Ioffe et al., Batch Normalization Accelerating Deep Network Training by Reducing Internal Covariate Shift, dated 2015, 11 pages.
Piqueras, Autoregressive Model Based on a Deep Convolutional Neural Network for Audio Generation, Tampere University of Technology, dated 2016, 58 pages.
Wu, Introduction to Convolutional Neural Networks, Nanjing University, dated 2017, 31 pages.
Goodfellow et al., Chapter 9—Convolutional Networks, Deep Learning, MIT Press, dated 2016, 41 pages.
Gu et al., Recent Advances in Convolutional Neural Networks, dated Jan. 5, 2017, 37 pages.
Srivastava, Dropout A Simple Way to Prevent Neural Networks from Overfitting, 2014, 30 pages.
Chaubard et al., CS224D: Deep Learning for NLP, Lecture Notes Part 1, Spring 2015, Stanford University, 11 pages.
Chaubard et al., CS224D: Deep Learning for NLP, Lecture Notes Part 2, Spring 2015, Stanford University, 11 pages.
Chaubard et al., CS224D: Deep Learning for NLP, Lecture Notes Part 3, Spring 2015, Stanford University, 14 pages.
Chaubard et al., CS224D: Deep Learning for NLP, Lecture Notes Part 4, Spring 2015, Stanford University, 12 pages.
Chaubard et al., CS224D: Deep Learning for NLP, Lecture Notes Part 5, Stanford University, Spring 2015, 6 pages.
EP 22216758.7 Extended European Search Report dated May 6, 2023, 13 pages.
Sun Hao et al.: "Semantic mapping and semantics-boosted navigation with path creation on a mobile robot," 2017 IEEE International Conference on Cybernetics and Intelligent Systems (CIS) and IEEE Conference on Robotics, Automation and Mechatronics (RAM), IEEE, Nov. 19, 2017, pp. 207-212.
Sun Hao et al.: "Scene Recognition and Object Detection in a Unified Convolutional Neural Network on a Mobile Manipulator," 2018 IEEE International Conference on Robotics and Automation (ICRA), IEEE, May 21, 2018, pp. 1-5.
Song Shuran et al.: "Sun RGB-D: A RBG-D scene understanding benchmark suite," 2018 IEEE Conference on Computer Vision and Pattern Recognition (CVPR), IEEE, Jun. 7, 2015, pp. 567-576.
Jiao Jichao et al.: "A Post-Recitifcation Approach of Depth Images of Kinect v2 for 3D Reconstruction of Indoor Scenes," ISPRS International Journal of Geo-Information, vol. 6, No. 11, Nov. 13, 2017, p. 349.

\* cited by examiner

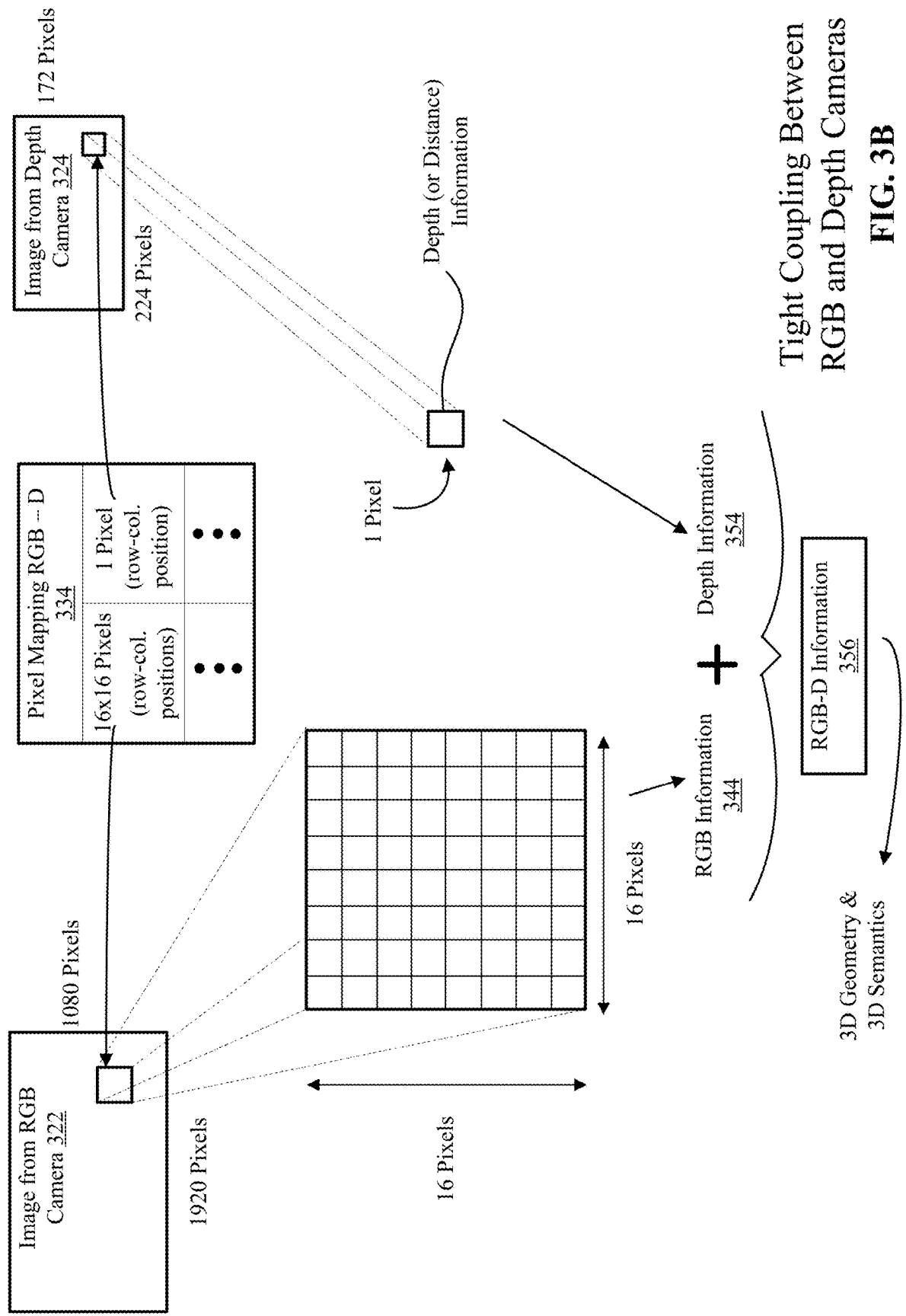

Non-Linear Layers of Convolutional Neural Networks

ReLU Activation Function

Residual Block and Skip-Connections used in Convolutional Neural Networks

Batch Normalization Forward Pass with Convolutional Neural Networks $$\mu_B = \frac{1}{n}\sum_{i=1}^{n} x_i^{(\ell-1)}$$

$$\sigma_B^2 = \frac{1}{n}\sum_{i=1}^{n} (x_i^{(\ell-1)} - \mu_B)^2$$

$$\hat{x}^{(\ell-1)} = \frac{x^{(\ell-1)} - \mu_B}{\sqrt{\sigma_B^2 + \epsilon}}$$

$$x^{(\ell)} = \gamma^{(\ell)} \hat{x}^{(\ell-1)} + \beta^{(\ell)}$$

FIG. 14

Batch Normalization – Inference with Convolutional
Neural Networks $$\hat{x}^{(\ell-1)} = \frac{x^{(\ell-1)} - \mu_\mathcal{D}}{\sqrt{\sigma_\mathcal{D}^2 + \epsilon}}$$

$$x_i^{(\ell)} = \gamma^{(\ell)} \hat{x}_i^{(\ell-1)} + \beta^{(\ell)}$$

FIG. 15

Batch Normalization Backward Pass with
Convolutional Neural Networks $$\nabla_{\gamma^{(\ell)}} \mathcal{L} = \sum_{i=1}^{n} \left( \nabla_{x^{(\ell+1)}} \mathcal{L} \right)_i \cdot \hat{x}_i^{(\ell)}$$

$$\nabla_{\beta^{(\ell)}} \mathcal{L} = \sum_{i=1}^{n} \left( \nabla_{x^{(\ell+1)}} \mathcal{L} \right)_i$$

FIG. 16

Batch Normalization in Convolution Layers

```
conv_model.add(layers.Conv2D(32, 3, activation='relu'))      ←------ After a Conv layer
conv_model.add(layers.BatchNormalization())

dense_model.add(layers.Dense(32, activation='relu'))         ←------ After a Dense layer
dense_model.add(layers.BatchNormalization())
```

FIG. 17

OCCUPANCY MAP SEGMENTATION FOR AUTONOMOUS GUIDED PLATFORM WITH DEEP LEARNING

PRIORITY APPLICATION

This application claims the benefit of Chinese Application No: 202111613025.5, filed 27 Dec. 2021, titled "3D Geometric and Semantic Awareness with Deep Learning for Autonomous Devices", the entire contents of which are incorporated herein by reference.

This application claims the benefit of U.S. Provisional Application No. 63/294,907, titled "Occupancy Map Segmentation For Autonomous Guided Platform With Deep Learning", filed 30 Dec. 2021, the entire contents of which are incorporated herein by reference.

INCORPORATIONS

The following materials are incorporated herein by reference in their entirety for all purposes:

- U.S. Provisional Application No. 63/294,899, filed 30 Dec. 2021, titled "Autonomous Guided Platform With Deep Learning Environment Recognition And Sensor Calibration";
- U.S. Provisional Application No. 63/294,901, titled "3D Geometric And Semantic Awareness With Deep Learning For Autonomous Guidance", filed 30 Dec. 2021;
- U.S. Provisional Application No. 63/294,903, titled "Training Of Deep Learning Neural Networks Of Autonomous Guided Platform", filed 30 Dec. 2021;
- U.S. Provisional Application No. 63/294,904, titled "Preparing Training Data Sets For Deep Learning Neural Networks Of Autonomous Guided Platform", filed 30 Dec. 2021;
- U.S. Provisional Application No. 63/294,908, titled "Calibration For Multi-Sensory Deep Learning Autonomous Guided Platform", filed 30 Dec. 2021; and
- U.S. Provisional Application No. 63/294,910, titled "Self Cleaning Docking Station For Autonomous Guided Deep Learning Cleaning Apparatus", filed 30 Dec. 2021.

This application is also related to the following contemporaneously filed applications which are incorporated herein by reference in their entirety for all purposes:

- U.S. Non-Provisional application Ser. No. 18081668, titled "Autonomous Guided Platform With Deep Learning Environment Recognition And Sensor Calibration", filed 14 Dec. 2022;
- U.S. Non-Provisional application Ser. No. 18081668, titled "3D Geometric And Semantic Awareness With Deep Learning For Autonomous Guidance", filed 14 Dec. 2022;
- U.S. Non-Provisional application Ser. No. 18081668, titled "Training Of Deep Learning Neural Networks Of Autonomous Guided Platform", filed 14 Dec. 2022;
- U.S. Non-Provisional application Ser. No. 18081668, titled "Preparing Training Data Sets For Deep Learning Neural Networks Of Autonomous Guided Platform", filed 14 Dec. 2022;
- U.S. Non-Provisional application Ser. No. 18081668, titled "Calibration For Multi-Sensory Deep Learning Autonomous Guided Platform", filed 14 Dec. 2022;
- U.S. Non-Provisional application Ser. No. 18081668, titled "Self Cleaning Docking Station For Autonomous Guided Deep Learning Cleaning Apparatus", filed 14 Dec. 2022; and
- U.S. Design application Ser. No. 29863047, titled "Self Cleaning Docking Station For Autonomous Guided Deep Learning Cleaning Apparatus", filed 14 Dec. 2022.

TECHNICAL FIELD

The present disclosure relates to occupancy map segmentation for autonomous guided platform with deep learning techniques for environment recognition and sensor calibration, and more specifically to robots employing occupancy map segmentation for autonomous guided platform with deep learning techniques for environment recognition and sensor calibration.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Autonomous robots have long been the stuff of science fiction fantasy. One technical challenge in realizing the truly autonomous robot is the need for the robot to be able to identify where they are, where they have been and plan where they are going. Traditional techniques have improved greatly in recent years; however, there remains considerable technical challenge to providing fast accurate and reliable positional awareness to robots and self-guiding mobile platforms. Further, conventional approaches in the field of task planning fail to include sensory data captured in real time, and thus are incapable of conducting planning or altering plans based upon changing conditions sensed in real time.

The challenge of providing fast reliable affordable environmental awareness to robotic devices heretofore remained largely unsolved.

SUMMARY

Occupancy Map Segmentation

The technology disclosed includes a method for preparing a segmented occupancy grid map based upon image information of an environment in which a robot moves. The image information. The image information is captured by at least one visual spectrum-capable camera and at least one depth measuring camera. The method includes receiving image information captured by at least one visual spectrum-capable camera and location information captured by at least one depth measuring camera located on a mobile platform. The method includes, extracting, by a processor, features in the environment from the image information. The method includes determining, by a processor, a 3D point cloud of points having 3D information including location information from the depth camera and the at least one visual spectrum-capable camera. The points in the 3D point cloud correspond to the features in the environment as extracted. The method includes determining, by a processor, an occupancy map of the environment from the 3D point cloud. The method includes segmenting, by a processor, the occupancy map into a segmented occupancy map of regions that represent rooms and corridors in the environment.

In one implementation, segmenting an occupancy map further includes:

(1) reducing noise in the occupancy map;
(2) classify voxels as (i) free, (ii) occupied; or (iii) unexplored;
(3) removing ray areas;
(4) removing obstacles within rooms; and (5) obstacles attached to boundaries;
(6) computing for each pixel, a distance to a closest zero pixel;
(7) finding candidate seeds by binarizing distance with a threshold change from low to high and finding blobs with size less than 2000; dilate the blobs; and remove noise blobs;
(8) watersheding blobs until boundaries are encountered;
(9) merging smaller rooms; and
(10) aligning the occupancy map.

A voxel classified as occupied further includes a label from a neural network classifier implementing 3D semantic analysis.

In one implementation, the classifying further includes setting a binary threshold to find free and occupied voxels and filling holes according to surrounding voxels. Filling holes includes determining if there are more free points around any voids. If so, the voids will become free; otherwise, smaller voids will become occupied, and larger voids will remain unexplored. The classifying further includes using sensory information to repairing defects.

Removing ray areas further includes finding free edges in the map and drawing a line between voxels in nearby edges, if the line is not blocked by occupied voxels or sensors The technology disclosed includes logic to train the neural network classifiers. The trained neural network classifiers can implement convolutional neural networks (CNN). The trained neural network classifiers can implement recursive neural networks (RNN) for time-based information. The trained neural network classifiers can implement long short-term memory networks (LSTM) for time-based information.

The ensemble of neural network classifiers can include 80 levels in total, from the input to the output.

The ensemble of neural network classifiers can implement a multi-layer convolutional network. The multi-layer convolutional network can include 60 convolutional levels. The ensemble of neural network classifiers can include normal convolutional levels and depth-wise convolutional levels.

The technology disclosed presents a robot system comprising a mobile platform having disposed thereon at least one visual spectrum-capable camera to capture images in a visual spectrum (RGB) range. The robot system further comprises at least one depth measuring camera. The robot system comprises an interface to a host including one or more processors coupled to a memory. The memory can store instructions to prepare a segmented occupancy grid map based upon image information captured by the at least one visual spectrum-capable camera and location information captured by the at least one depth measuring camera. The computer instructions when executed on the processors, implement actions comprising the method presented above.

A non-transitory computer readable medium comprising stored instructions is disclosed. The instructions when executed by a processor, cause the processor to implement actions comprising the method presented above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 3B illustrates an architectural level diagram of sensory camera coupling in one exemplary robot 120 of FIG. 1.

FIG. 14 shows the batch normalization forward pass.

FIG. 15 illustrates the batch normalization transform at test time.

FIG. 16 shows the batch normalization backward pass.

FIG. 17 depicts use of a batch normalization layer with convolutional or densely connected layer.

DETAILED DESCRIPTION

Aspects of the present disclosure relate to autonomous robot with deep learning environment recognition and sensor calibration.

Environment

Figure 1:
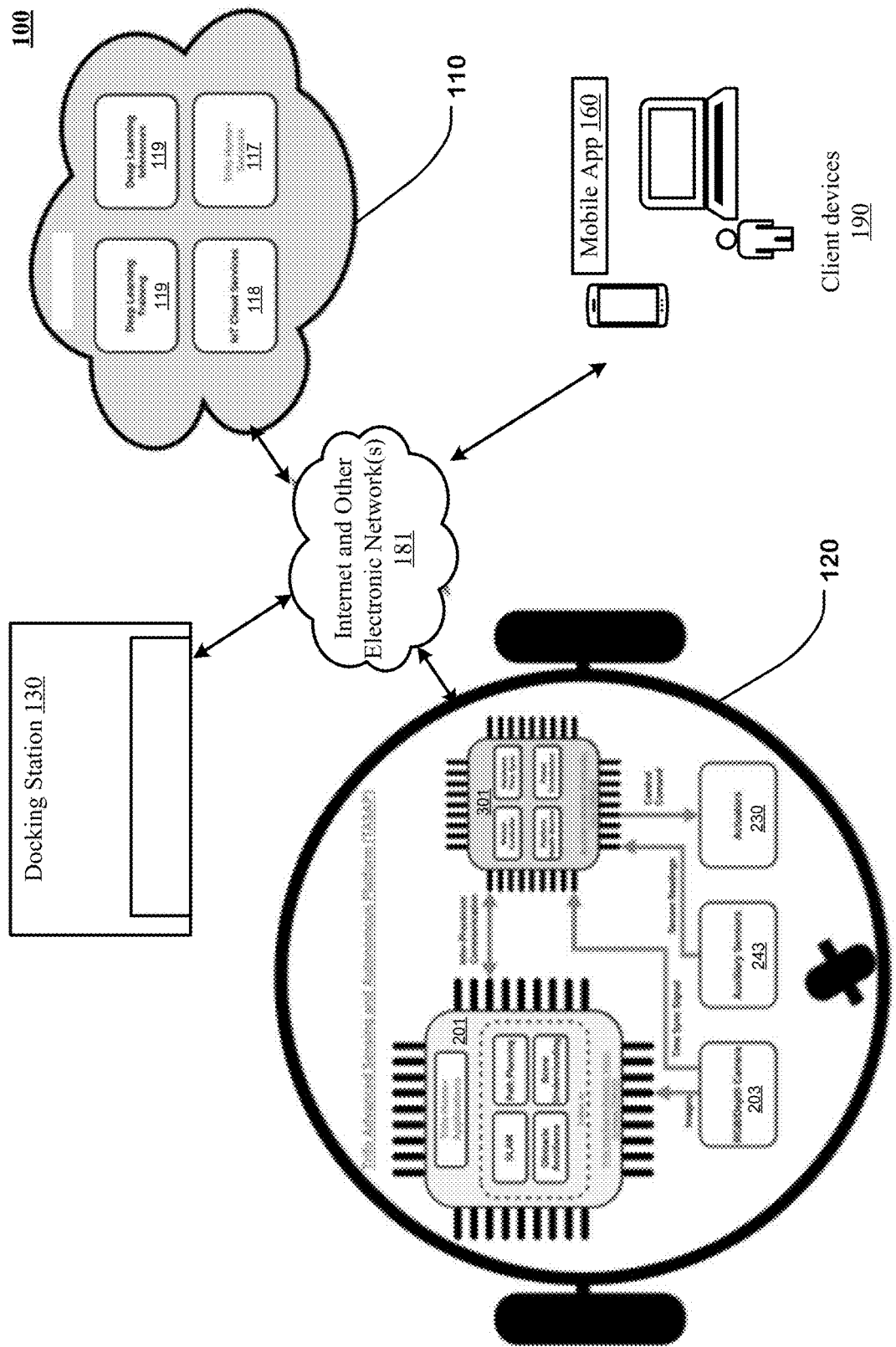
FIG. 1 illustrates architectural level schematic of a system in which the autonomous robot with deep learning environment recognition and sensor calibration can be implemented.

We describe a system employing deep learning techniques for guiding a robot about a plurality of domains. FIG. 1 is a simplified diagram of one environment 100 of the system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes the system 100. This paragraph names labeled parts of the system 100. The figure illustrates a server 110, robot 120, Service/docking station 130, (Inter-) network(s) 181 and Clients 190., etc.

Server(s) 110 can include a plurality of process implementing deep learning training 119, IoT 118 and other cloud-based services 117 that support robot installations in the home.

Robot 120 can includes a multi-level controller comprising a higher-level cognitive level processor system 201 implementing Simultaneous Localization and Mapping (SLAM), path planning, obstacle avoidance, scene understanding and other cognitive functions, and a utility processor system 301 implementing motion control, hardware time synch, system health monitoring, power distribution and other robot functions, visual spectrum sensitive (RGB) sensors and depth sensors 203, auxiliary sensors 243 and actuators 230. A generalized schematic diagram for a Robot 120 implementation can be found in FIG. 2A below.

Service/docking station 130 can include a variety of support structures to facilitate, enhance, or supplement operation of robot 120, including without limitation interfaces to the robot, as well as to server 110 via networks 181. On implementation described in further detail herein bellow with reference to FIGS. 26A, 26B and 27 comprises an interface configured to couple with a robot and to off-load waste collected and stored by the robot and a robot comprising a mobile platform having disposed thereon a waste storage, at least one visual spectrum-capable camera and an interface to a host.

Client Devices 190 enable users to interact with the forementioned components 110, 120, 130 of the system 100 using a variety of mechanisms, such as mobile applications 160.

Completing the description of FIG. 1, the components of the system 100, described above, are all coupled in communication with the network(s) 181. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

Robot Architecture

Figure 2A:
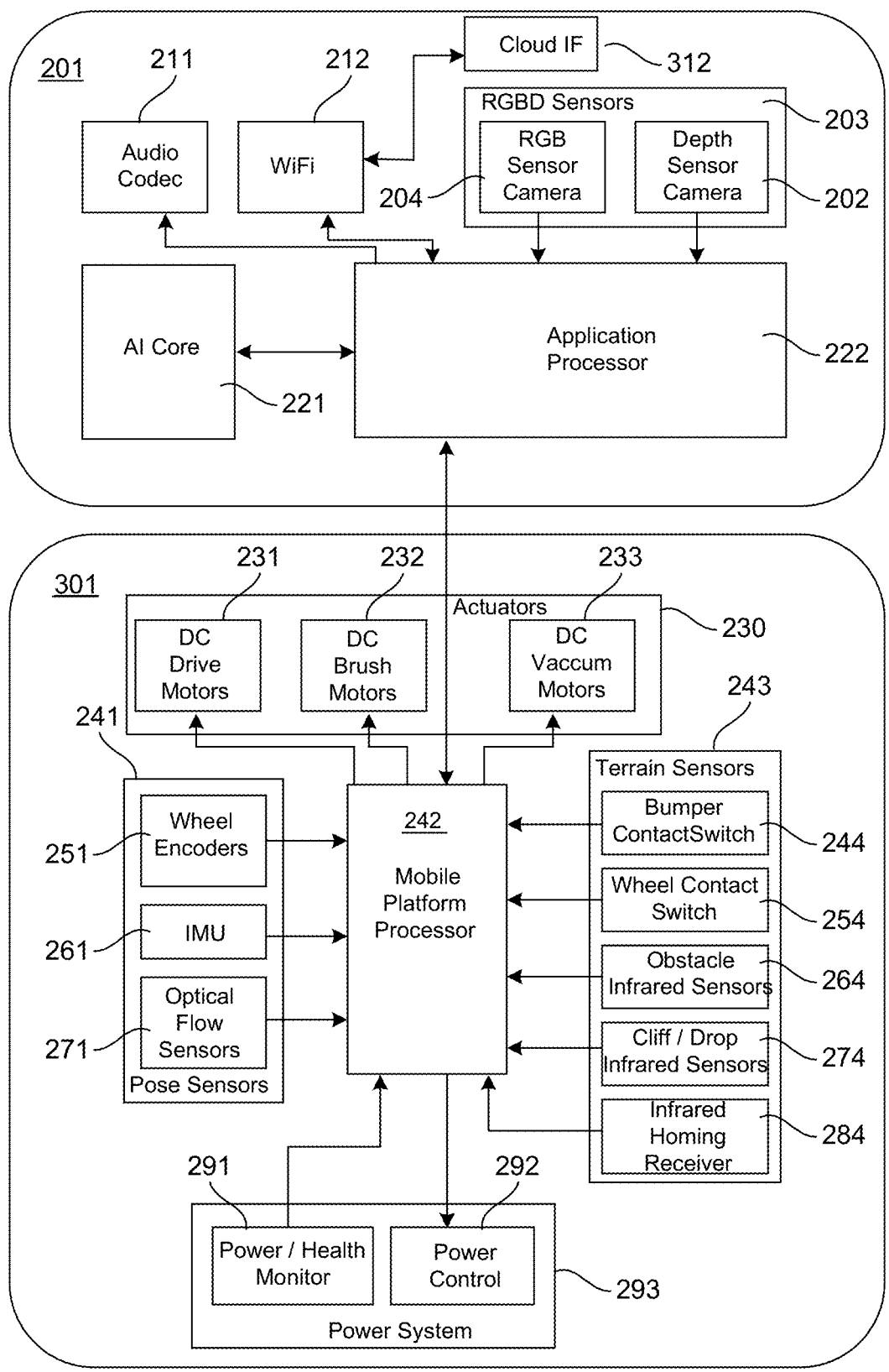
FIG. 2A depicts a representative robot architecture 200A suitable for implementing a multiple sensory capable home robot
Figure 2B:
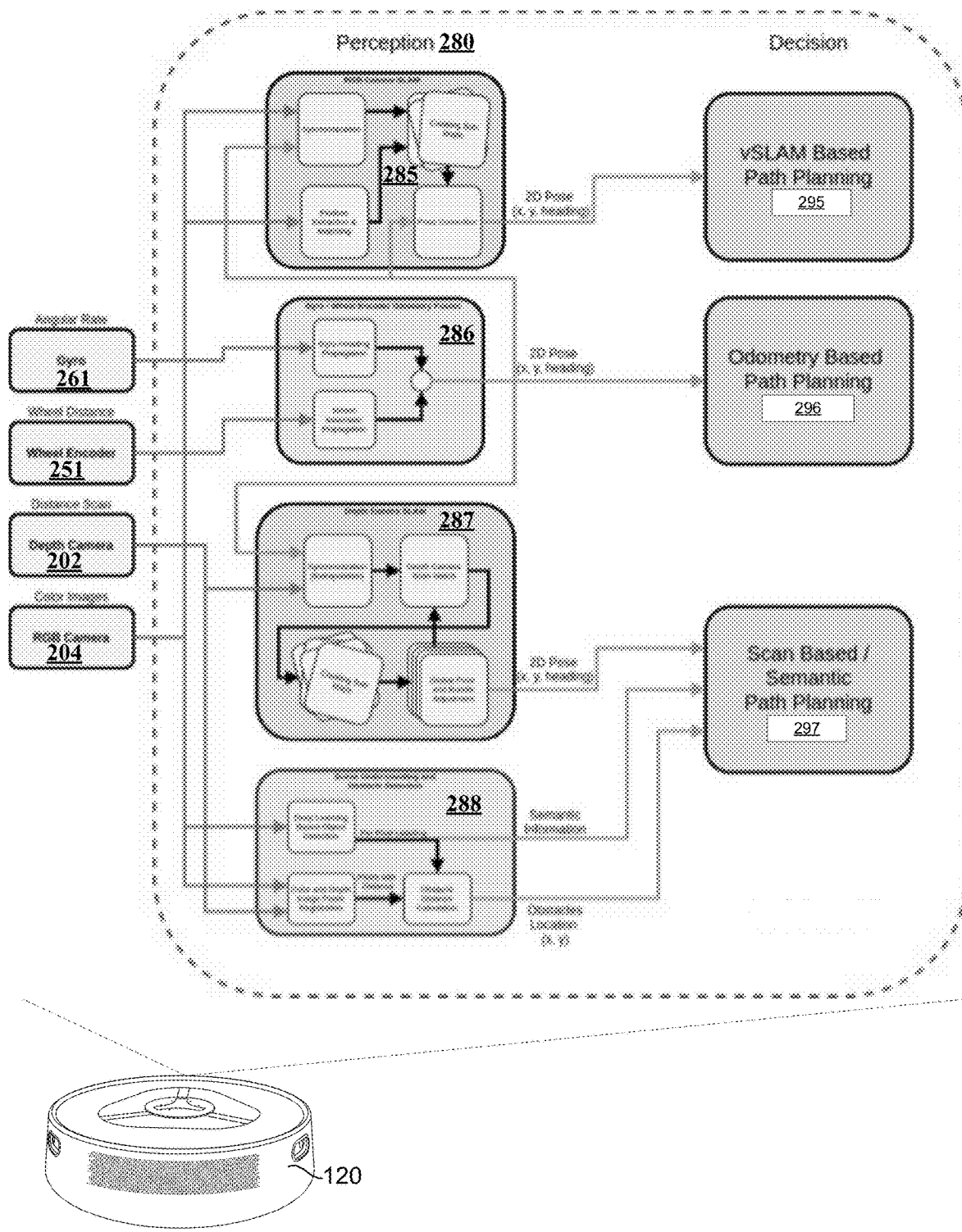
FIG. 2B illustrates a schematic diagram 200B of one exemplary robot 120 of FIG. 1 in an embodiment of the present technology.

We now present examples of a selected robot types as presented in FIGS. 2A and 2B. FIGS. 2A and 2B illustrate representative system diagrams for a system in which a multiple sensory capable home robot may be embodied. FIG. 2A depicts a representative robot architecture 200A suitable for implementing a multiple sensory capable home robot. Architecture 200A includes a higher-level cognitive level processor system 201 cooperatively coupled with a utility level processor system 202. Cognitive processor system 201 is preferably equipped to process nodes of one or more deep neural networks trained with responses to sensed inputs (e.g., 241, 251, 261, 271, 243, 244, 254, 264, 274, 284) from the robot's environment and commands from human or other supervisory users. The neural networks in which the deep learning system can be realized are discussed in further detail hereinbelow with reference to FIGS. 5 to 20.

Cognitive processor system 201 includes an application processor 222 coupled to an AI core 221, audio codec 211, Wi-Fi system 212 and a set of RGBD Sensors 203. RGBD Sensors 203 include nominally one or more Red Green Blue (RGB) visual range cameras 204 configured to capture images of the environment surrounding the robot and one or more depth sensor camera 202 to capture distance information to obstacles and objects in the environment surrounding the robot. Other types of sensors, such as infrared (IR) sensitive cameras not shown in FIG. 2A for clarity's sake can also be included. Application processor 222, in conjunction with AI core 221, gathers information including images captured from RGBD sensors 203, network messages communicated via Wi-Fi system 212, audio information from audio codec 211, and status updates from utility processor system 202. Application processor 222 and AI core processor 221 process these information inputs to utilize it to understand the environment surrounding the robot, the robot's own internal operations and health, and desires and requests being made of the robot by its human companion and makes output of commands to utility processor system 301 to control the robot's own functions, output via Wi-Fi system 212 of network messages and requested or otherwise deemed necessary to communicate to the human companion, or other robots or systems, output via audio codec 211 speech or sounds to communicate to the human companion, pets or other humans and animals. In some implementations, AI core processor 221 implements selected ensemble neural networks implementing trained classifiers to determine a situation state of the environment encountered by the robot using sensory input of the robot and training of the classifiers. Implementations may use supervised machine learning (i.e., the machine learning task of learning a function that maps an input to an output based on example input-output pairs), un-supervised machine learning (i.e., the system discovers features of the input population without a prior set of categories defined), or combinations thereof to train classifiers. Portions of AI core processor 221 functionality may be remoted to host processors 110 (e.g., in the cloud) via cloud interface 312, for example, enabling classifier functionality to be offloaded from robot platform 100. In some implementations, the classifier is selected in the cloud and downloaded to the AI core processor 221 for processing locally. Collecting outcome information enables AI core processor 221 to provide new training scenarios to re-train neural network classifiers enabling the robot to learn from experience. Cloud node 312 provides an interface enabling experience data gathered by AI core processor 221 to be shared via a deep learning training system (e.g., 119 of FIG. 1) with other robots. In one deep learning system implementation, a training stage of a deep neural network that trains the deep neural network to submit hundreds of training sensory input samples to multiple sensory input recognition engines and determine how sensory state recognition error rates of the sensory input recognition engines vary with image, sound and other sensor characteristics of the training sensory input samples.

Utility processor system 202 includes a mobile platform processor 242 coupled to a set of pose sensors 241, a set of terrain sensors 243, power system 293 and a set of motor drivers (not shown in FIG. 2A for clarity's sake) that in turn drive various motors and actuators. In one representative example in which robot is equipped with an integrated cleaning system, processor 242 can control Drive motors 231, and cleaning system motors including brush motors 232 and vacuum motors 233. Some implementations of robot base 100 will not include cleaning system components. While other implementations will include different actuators and drives than those illustrated by FIG. 2A.

Pose sensors 241 include wheel encoders 251 that sense turns of drive wheels used to move the robot base 100. Some implementations will use treads or other drive mechanisms instead of wheels and will accordingly use different types of encoder sensors to determine drive tread travel. Pose sensor 241 also includes an Inertial measurement Unit (IMU) 261 to detect acceleration and deceleration of the robot platform. IMU 261 can be solid state and can be implemented using one or more gyroscopic sensors. Optical flow sensors 271 are used to sense changes in pose of the robot and function by capturing changes in optical information being sensed and determining therefrom changes in the robot's pose. Not all implementations will use all of the pose sensors of pose sensor set 241. Some implementations will use various numbers of sensors or different types and combinations. Other types of sensors not shown in FIG. 2A can also provide pose information to processor 241.

Terrain sensors 243 include contact switches 244 that detect an occurrence of actual physical contact by the robot with an object in the environment. Wheel contact switches 254 detect occurrence of contact by the wheels of the robot with a solid surface. Obstacle infrared sensors 264 detect an imminent collision by the robot with an obstacle in the environment. Cliff or drop sensors 274 detect a cliff or a drop-off of the surface on which the robot base 100 resides, such as encountering a stairway or pit. An infrared homing receiver 284 detects presence of an infrared source to which the robot may be commanded to home. Not all implementations will use all of the terrain sensors of terrain sensor set 243. Some implementations will use various numbers of sensors or different types and combinations. Other types of sensors not shown in FIG. 2A can also provide pose information to processor 241.

FIG. 2B illustrates a functional diagram 200B of one exemplary Robot 120 in an embodiment of the present technology. In FIG. 2B, multiple sensory inputs including distance information from depth sensing camera 202, color images from visual-spectrum sensitive camera 204, wheel distance information from wheel encoder 251, and angular rate information from Inertial Measuring Unit (IMU) 261 are provided to a plurality of perception processors 280 including RBG camera-based SLAM 285, Gyro/wheel encoder odometry positions 286, depth camera SLAM 287, and scene understanding and obstacle detection 288. These outputs are provided to decision logics 290 of vSLAM based path planning 295, odometry based path planning 296 and scan based semantic path planning 297, respectively.

Figure 3A:
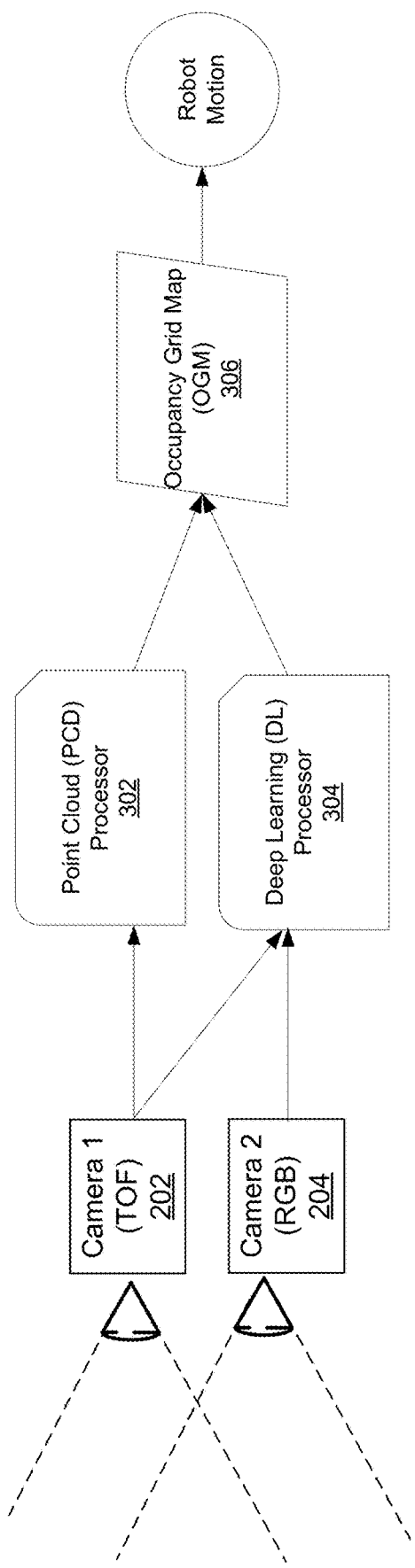
FIG. 3A illustrates an architectural level diagram of deep learning-based robot sensory perception employing multiple sensory inputs.

FIG. 3A illustrates an architectural level diagram of deep learning based robot sensory perception employing multiple sensory inputs. Diagram 300 includes multiple sensory inputs, a depth sensing camera 202 and a visual spectrum sensitive (RGB) camera 204. Output of depth sensing camera 202 is provided to a point cloud processor (PCD) 302 and a deep learning processor (DL) 304. Output of RGB camera 204 is provided to deep learning processor (DL) 304. Outputs from these processes are unified into an Occupancy Grid Map (OGM) 306.

As shown by FIG. 3B, depth sensing camera 202 and visual spectrum sensitive (RGB) camera 204 are tightly coupled. One or more images 322 from visual spectrum sensitive (RGB) camera 204 can be mapped to one or more images 324 from depth sensing camera 204. The mapping can be defined by calibrating the two cameras. For example, the cameras can be extrinsically calibrated. The field of view (FOV) of both cameras 202 and 204 can overlap. The cameras 202 and 204 can be synchronized. The two cameras can take images using the same number of frames per second. For example, the cameras can take images at the rate of 3 frames per second, 6 frames per second, 12 frames per second or more. The images taken during an imaging cycle such as one second, 0.5 seconds or 0.1 seconds can be matched across to images taken from the other camera for enriching the image information. For example, the image 322 from RGB camera is matched to the image 324 from the depth sensing camera. The image resolution of the two cameras can be different. For example, in this example, the RGB images has 1920×1080 pixels while the image from the depth or the range camera has 224×172 pixels. It is understood that other image resolutions can be used that are greater than or less than the example image resolutions presented in this example for the two cameras. A mapping table 334 can map a group of image pixels from image from one camera to one or more pixels from image from the other camera. For example, a group of 16×16 pixels from the image 322 is mapped to one pixel from image 324. The mapping table can include locations of individual or groups of pixels from each image that are mapped using row-column positions of pixels. The RGB information 344 is combined with depth or range information 354 to generate an RGB-D information 356 which can be provided as an input to a machine learning model or another process. The combined RGB-D information 356 can be used for generating 3D geometry and 3D semantics.

Now with renewed reference to FIG. 3A, the Point Cloud processor 302 implements actions including:
1) Raw input point cloud received from camera node
2) Crop input raw point cloud
3) Voxel down sample with a point quantity threshold in each voxel grid Deep learning processor 304 implements actions including:
4) Capture a newest RGB image
5) Crop the image to lower half and then run a deep learning segmentation inference
6) Run post-processing on the inference result:
   a) Small component filter: In the inference image, for each label, separate component instances by connectivity and then filter out small components
7) Capture PCD point cloud which is taken closest to the RGB image input in terms of time
8) Crop PCD
9) Align the PCD to RGB position according to the robot poses corresponding to when the RGB and PCD data is recorded
10) Project the inference result to each point in the PCD, instance concept in PCD is inherited from the component concept in inference image
11) Run post-processing on the labeled PCD:
   a) Component height filter: For each labeled component, filter it according to the height limit in this label category. For example, wire component height limit is 2 cm, if one wire component does not have point which is higher than 2 cm, this component will be filtered out
   b) Component range filter: For each labeled component, filter it by distance distribution of all the points in this component. Points which are outliers (filter by mean plus certain times of standard deviation) will be deleted
   c) Component normal filter: Filter component by its average surface normal (currently disabled)

Process of Guiding the Autonomous Robot

Figure 4:
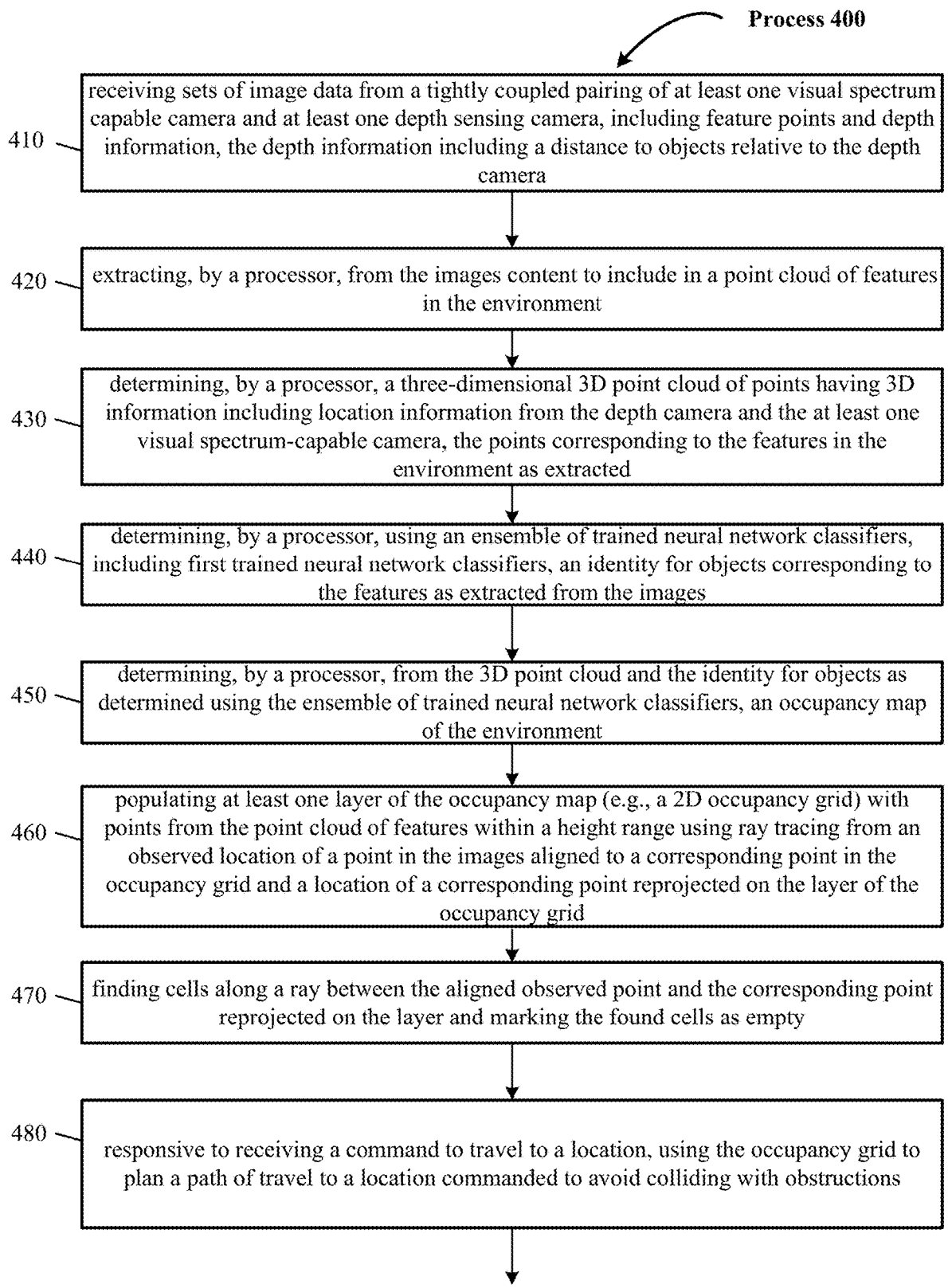
FIG. 4 depicts a flowchart of various processes used during the process of guiding the autonomous robot in an embodiment of the present technology.
Figure 5:
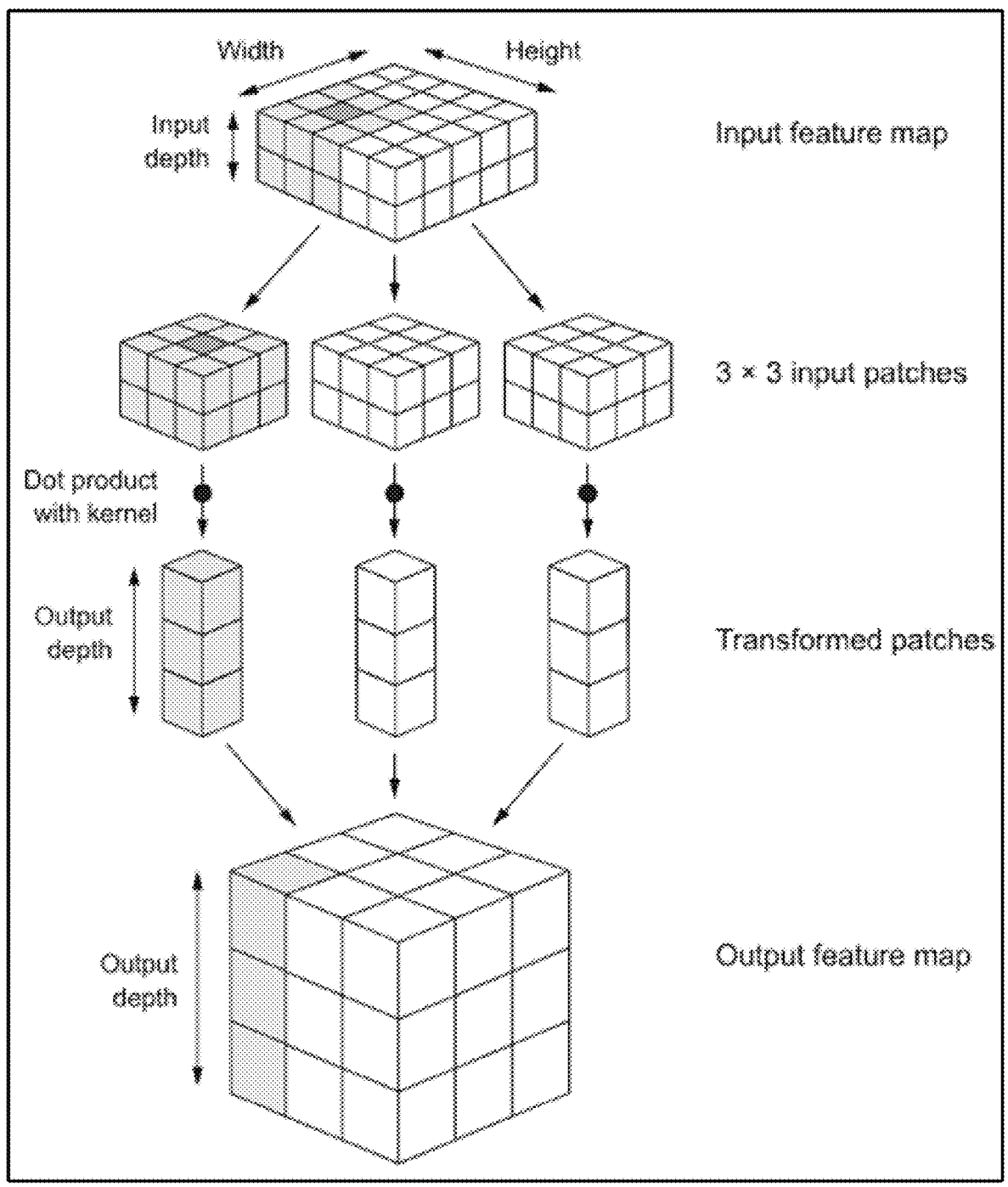
FIG. 5 depicts one implementation of workings of a convolutional neural network.

FIG. 4 presents a flowchart presenting process 400 for guiding a robot in an environment in which the robot moves. The process starts at a step 410 which includes receiving sets of image data from a tightly coupled pairing of at least one visual spectrum capable camera and at least one depth sensing camera, including feature points and depth information. The depth information includes a distance to objects relative to the depth camera. At a step 420, the method includes extracting, by a processor, from the images content to include in a point cloud of features in the environment. At a step 430, the method includes, determining, by a processor, a three-dimensional 3D point cloud of points having 3D information including location information from the depth camera and the at least one visual spectrum-capable camera. The points correspond to the features in the environment as extracted. At a step 440, the method includes, determining, by a processor, using an ensemble of trained neural network classifiers, including first trained neural network classifiers, an identity for objects corresponding to the features as extracted from the images. At a step 450, the method includes determining, by a processor, from the 3D point cloud and the identity for objects as determined using the ensemble of trained neural network classifiers, an occupancy map of the environment. At a step 460, the method includes populating at least one layer of the occupancy map (e.g., a 2D occupancy grid) with points from the point cloud of features within a height range using ray tracing from an observed location of a point in the images aligned to a corresponding point in the occupancy grid and a location of a corresponding point reprojected on the layer of the occupancy grid. At a step 470, the method includes finding cells along a ray between the aligned observed point and the corresponding point reprojected on the layer and marking the found cells as empty. At a step 480, the method includes responsive to receiving a command to travel to a location, using the occupancy grid to plan a path of travel to a location commanded to avoid colliding with obstructions.

Deep Learning Architecture & Deep Neural Networks

We now present details of the deep learning architecture that can be applied by the technology disclosed.

Classifier Inputs and Outputs

An exemplary deep neural network implementation selects an appropriate classification from a set of environmental conditions using a set of inputs to the neural network-based classifier(s). Inputs whether structured or unstructured data type data points, can be encoded into fields of a vector (or tensor) representation. Implementations will employ various levels of abstraction in configuring, classification and anomaly detection tasks, e.g., in an elder home care application, data can be selected to describe detected condition of the cared for person, potentially medically significant changes to the cared for person, emergency as well as non-emergency changes to the environment and so forth.

In one example, a neural network ensemble can implement a set of classifiers that are trained to classify situation states according to input data gathered from robot's sensors and to trigger learned behaviors based upon the situation state classification. An appropriate selection of trained classifier(s) can be selected automatically based upon detected component mated to the robot base 120. Robots equipped with appropriately trained classifiers can find use in applications such as elderly home care, home entertainment, home environment maintenance, and pet entertainment applications, without limitation that the trained classifier(s) are suited. In one implementation, trained classifier(s) are disposed remotely, in a server or set of servers accessible by the robot via wireless or other network(s).

For example, an elderly home robot can include classifier(s) once trained on a training dataset to determine a Classification of Condition (Obstacle encountered, Obstacle with stall condition encountered, Medication not taken, Status change notification, Status alert (fall) notification, External danger) for a particular situation state. The exemplary deep neural network implementation as trained selects an appropriate classification based upon sensory input from the robot's sensors among other inputs and triggers appropriate learned behaviors.

| Determined Condition(s) | Sensory Input (Sub-) Classifications | Remedial Actions/ Behavior(s) Triggered |
|---|---|---|
| Obstacle encountered | Sensory input from camera(s), contact sensors indicates an obstacle is encountered. | Guide cared person around obstacle. |
| Obstacle with stall condition encountered | Sensory input from motor current sensors, contact sensors indicate an obstacle is blocking the robot from continuing. | Capture images, transmit images to recipient over wireless network and/or accept human guidance from cared person or person with oversight remotely. |
| Medication not taken | Detect presence of medication left in pill drawer using sensor and/or captured images of patient when medication was administered. | Report cared for person not in compliance with scheduled medication via wireless network to person with remote oversight. |
| Status change notification | Camera(s) and microphone(s) detect change in amount or type of activity of cared for person. | Notify person with remote oversight such as medical care-givers, family members, and the like by sending out reports. |
| Status alert notification | Camera(s) and microphone(s) detect apparent fall of cared for person. | Notify person with remote oversight such as medical care-givers, family members, and the like by sending out alerts. |
| External danger | Smoke detection sensor, CO detection sensor detect dangerous condition/potential fire. | Notify emergency response persons such as fire department, police, ambulance and the like by sending out alerts. |

In another configuration, a home entertainment robot can include classifier(s) that once trained on a training dataset to determine a Classification of Condition (Children request play, Children appear bored, Status change notification, Status alert (fall) notification, External danger) for a particular situation state.

| Determined Condition(s) | Sensory Input (Sub-) Classifications | Remedial Actions/ Behavior(s) Triggered |
|---|---|---|
| Children request play | Receive command from child. | Provide game or movie appropriate to the selection and child |
| Children appear bored or misbehaving | Camera(s) and microphone(s) detect change in amount or type of activity of children. | Trigger response offering child options to play game or watch movie. |
| Status change notification | Camera(s) and microphone(s) detect change in amount or type of activity of children indicating woke up from nap, ready for nap, etc . . . | Notify person with remote oversight such as medical care-givers, family members, and the like by sending out reports. |
| Status alert notification | Camera(s) and microphone(s) detect apparent fall or accident during play. | Notify person with remote oversight such as medical care-givers, family members, and the like by sending out alerts. |
| External danger | Smoke detection sensor, CO detection sensor detect dangerous condition/potential fire. | Notify emergency response persons such as fire department, police, ambulance and the like by sending out alerts. |

In a further configuration, a home environment robot can include classifier(s) that once trained on a training dataset to determine a Classification of Condition (Cared for person requests environmental change, Cared for person appears uncomfortable, Status change notification, Status alert (window left open, etc.) notification, External danger) for a particular situation state.

| Determined Condition(s) | Sensory Input (Sub-) Classifications | Remedial Actions/ Behavior(s) Triggered |
|---|---|---|
| Cared for person requests environmental change | Receive command. | Message intelligent thermostat and/or other smart home controllers |
| Cared for person appears uncomfortable | Camera(s) and microphone(s) detect change in amount or type of activity or condition of cared for person. | Trigger response offering to alter the environment (e.g., turn on/off heat, etc.), gather input from cared for person and message intelligent thermostat and/or other smart home controllers. |
| Status change notification | Humidity and temperature sensors detect change in environmental conditions indicating low/high temperature, low/high humidity, low/high particulates in atmosphere, etc . . . | Gather further information and attempt to remedy (e.g., run on-board or other (de-)humidifier), air purifier, , message intelligent thermostat and/or other smart home controllers), otherwise notify family member(s) with gentle (non-emergency) message, and the like. |
| Status alert notification | Humidity and temperature sensors detect rapid or large change (e.g., exceeding at hreshold in amount or rate or time) in environmental conditions indicating power to heater is off, window is open, fireplace has gone out, etc . . . | Gather further information and attempt to remedy (e.g., close window, message intelligent thermostat and/or other smart home controllers), otherwise notify family member(s) with gentle (non-emergency) message, and the like. |
| External danger | Smoke detection sensor, CO detection sensor detect dangerous condition/potential fire. | Notify emergency response persons such as fire department, police, ambulance and the like by sending out alerts. |

In a yet further configuration, a pet care entertainment robot can include classifier(s) that once trained on a training dataset to determine a Classification of Condition (Pet request play, Pet appears bored, Status change notification, Status alert (fall) notification, External danger) for a particular situation state.

| Determined Condition(s) | Sensory Input (Sub-) Classifications | Remedial Actions/ Behavior(s) Triggered |
|---|---|---|
| Pet requests play | Receive command from remote user to initiate play with pet. | Provide game for pet and capture images of pet playing for transmission to remote user. |
| Pet appears bored/ misbehaving | Camera(s) and microphone(s) detect change in amount or type of activity of pet. | Trigger response offering pet options to play. |
| Status change notification | Camera(s) and microphone(s) detect change in amount or type of activity of pet indicating woke up from nap, ready for nap, etc. . . | Notify person with remote oversight such as owner, family members, vet, and the like by sending out reports. |
| Status alert notification | Camera(s) and microphone(s) detect apparent fall or accident. | Notify person with remote oversight such as owner, family members, vet, and the like by sending out alerts. |
| External danger | Smoke detection sensor, CO detection sensor detect dangerous condition/potential fire. | Notify emergency response persons such as fire department, police, ambulance and the like by sending out alerts. |

In one exemplary implementation, some neural networks implementing AI core 221 are implemented as an ensemble of subnetworks trained using datasets widely chosen from appropriate conclusions about environmental conditions and incorrect conclusions about environmental conditions, with outputs including classifications of anomalies based upon the input sensed data, and/or remedial actions to be triggered by invoking downstream applications such as preparing and submitting reports to persons with oversight, alerts to emergency authorities, regulatory compliance information, as well as the capability to both cluster information and to escalate problems.

Convolutional Neural Networks

A convolutional neural network is a type of neural network. The fundamental difference between a densely connected layer and a convolution layer is this: Dense layers learn global patterns in their input feature space, whereas convolution layers learn local patters: in the case of images, patterns found in small 2D windows of the inputs. This key characteristic gives convolutional neural networks two interesting properties: (1) the patterns they learn are translation invariant and (2) they can learn spatial hierarchies of patterns.

Regarding the first, after learning a certain pattern in the lower-right corner of a picture, a convolution layer can recognize it anywhere: for example, in the upper-left corner. A densely connected network would have to learn the pattern anew if it appeared at a new location. This makes convolutional neural networks data efficient because they need fewer training samples to learn representations, and they have generalization power.

Regarding the second, a first convolution layer can learn small local patterns such as edges, a second convolution layer will learn larger patterns made of the features of the first layers, and so on. This allows convolutional neural networks to efficiently learn increasingly complex and abstract visual concepts.

A convolutional neural network learns highly non-linear mappings by interconnecting layers of artificial neurons arranged in many different layers with activation functions that make the layers dependent. It includes one or more convolutional layers, interspersed with one or more sub-sampling layers and non-linear layers, which are typically followed by one or more fully connected layers. Each element of the convolutional neural network receives inputs from a set of features in the previous layer. The convolutional neural network learns concurrently because the neurons in the same feature map have identical weights. These local shared weights reduce the complexity of the network such that when multi-dimensional input data enters the network, the convolutional neural network avoids the complexity of data reconstruction in feature extraction and regression or classification process.

Convolutions operate over 3D tensors, called feature maps, with two spatial axes (height and width) as well as a depth axis (also called the channels axis). For an RGB image, the dimension of the depth axis is 3, because the image has three color channels; red, green, and blue. For a black-and-white picture, the depth is 1 (levels of gray). The convolution operation extracts patches from its input feature map and applies the same transformation to all of these patches, producing an output feature map. This output feature map is still a 3D tensor: it has a width and a height. Its depth can be arbitrary, because the output depth is a parameter of the layer, and the different channels in that depth axis no longer stand for specific colors as in RGB input; rather, they stand for filters. Filters encode specific aspects of the input data: at a height level, a single filter could encode the concept "presence of a face in the input," for instance.

For example, the first convolution layer takes a feature map of size (28, 28, 1) and outputs a feature map of size (26, 26, 32): it computes 32 filters over its input. Each of these 32 output channels contains a 26×26 grid of values, which is a response map of the filter over the input, indicating the response of that filter pattern at different locations in the input. That is what the term feature map means: every dimension in the depth axis is a feature (or filter), and the 2D tensor output [:, :, n] is the 2D spatial map of the response of this filter over the input.

Convolutions are defined by two key parameters: (1) size of the patches extracted from the inputs—these are typically 1×1, 3×3 or 5×5 and (2) depth of the output feature map— the number of filters computed by the convolution. Often these start with a depth of 32, continue to a depth of 64, and terminate with a depth of 128 or 256.

A convolution works by sliding these windows of size 3×3 or 5×5 over the 3D input feature map, stopping at every location, and extracting the 3D patch of surrounding features (shape (window_height, window_width, input_depth)). Each such 3D patch is ten transformed (via a tensor product with the same learned weight matrix, called the convolution kernel) into a 1D vector of shape (output_depth). All of these vectors are then spatially reassembled into a 3D output map of shape (height, width, output_depth). Every spatial location in the output feature map corresponds to the same location in the input feature map (for example, the lower-right corner of the output contains information about the lower-right corner of the input). For instance, with 3×3 windows, the vector output [i, j, :] comes from the 3D patch input [i−1: i+1, j−1J+1, :]. The full process is detailed in FIG. 5.

The convolutional neural network comprises convolution layers which perform the convolution operation between the input values and convolution filters (matrix of weights) that are learned over many gradient update iterations during the training. Let (m, n) be the filter size and W be the matrix of weights, then a convolution layer performs a convolution of the W with the input X by calculating the dot product W·x+b, where x is an instance of X and b is the bias. The step size by which the convolution filters slide across the input is called the stride, and the filter area (m×n) is called the receptive field. A same convolution filter is applied across different positions of the input, which reduces the number of weights learned. It also allows location invariant learning, i.e., if an important pattern exists in the input, the convolution filters learn it no matter where it is in the sequence.

Training a Convolutional Neural Network

Figure 6:
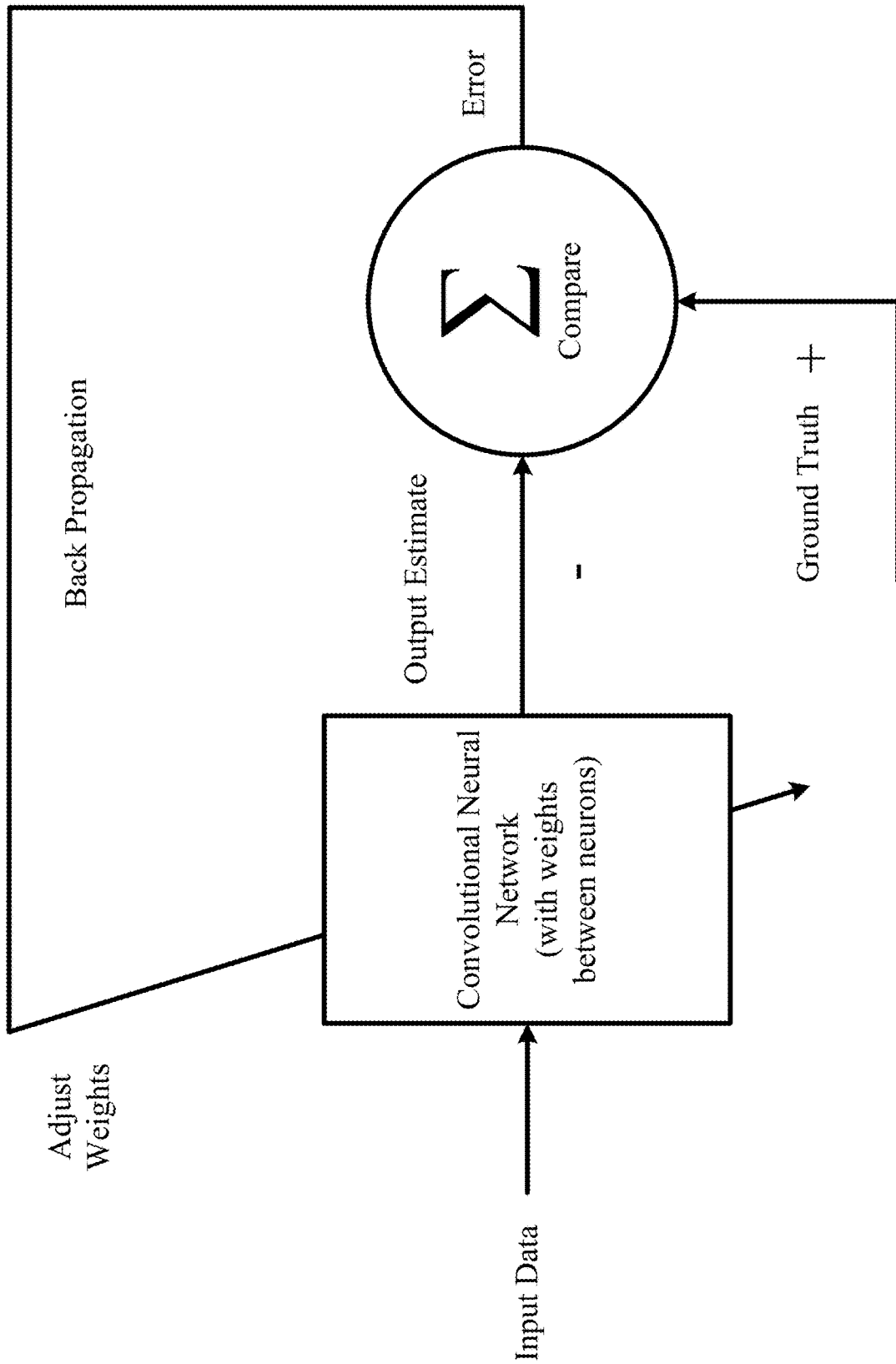
FIG. 6 depicts a block diagram of training a convolutional neural network in accordance with one implementation of the technology disclosed.

FIG. 6 depicts a block diagram of training a convolutional neural network in accordance with one implementation of the technology disclosed. The convolutional neural network is adjusted or trained so that the input data leads to a specific output estimate. The convolutional neural network is adjusted using back propagation based on a comparison of the output estimate and the ground truth until the output estimate progressively matches or approaches the ground truth.

The convolutional neural network is trained by adjusting the weights between the neurons based on the difference between the ground truth and the actual output. This is mathematically described as:

$$\Delta w_i = x_i \delta$$

where δ=(ground truth)−(actual output)

In one implementation, the training rule is defined as:

$$w_{nm} \leftarrow w_{nm} + \alpha(t_m - \varphi_m)a_m$$

In the equation above: the arrow indicates an update of the value; $t_m$ is the target value of neuron m; $\varphi_m$ is the computed current output of neuron m; $a_n$ is input n; and α is the learning rate.

The intermediary step in the training includes generating a feature vector from the input data using the convolution layers. The gradient with respect to the weights in each layer, starting at the output, is calculated. This is referred to as the backward pass or going backwards. The weights in the network are updated using a combination of the negative gradient and previous weights.

In one implementation, the convolutional neural network uses a stochastic gradient update algorithm (such as ADAM) that performs backward propagation of errors by means of gradient descent. One example of a sigmoid function based back propagation algorithm is described below:

$$\varphi = f(h) = \frac{1}{1 + e^{-h}}$$

In the sigmoid function above, h is the weighted sum computed by a neuron. The sigmoid function has the following derivative:

$$\frac{\partial \varphi}{\partial h} = \varphi(1 - \varphi)$$

The algorithm includes computing the activation of all neurons in the network, yielding an output for the forward pass. The activation of neuron m in the hidden layers is described as:

$$\varphi_m = \frac{1}{1 + e^{-h_m}}$$

$$h_m = \sum_{n=1}^{N} a_n w_{nm}$$

This is done for all the hidden layers to get the activation described as:

$$\varphi_k = \frac{1}{1 + e^{hk}}$$

$$h_k = \sum_{m=1}^{M} \varphi_m v_{mk}$$

Then, the error and the correct weights are calculated per layer. The error at the output is computed as:

$$\delta_{ok} = (t_k - \varphi_k)\varphi_k(1 - \varphi_k)$$

The error in the hidden layers is calculated as:

$$\delta_{hm} = \varphi_m(1 - \varphi_m)\sum_{k=1}^{K} v_{mk}\delta_{ok}$$

The weights of the output layer are updated as:

$$v_{mk} \leftarrow v_{mk} + \alpha\delta_{ok}\varphi_m$$

The weights of the hidden layers are updated using the learning rate α as:

$$v_{nm} \leftarrow w_{mk} + \alpha\delta_{hm}a_n$$

In one implementation, the convolutional neural network uses a gradient descent optimization to compute the error across all the layers. In such an optimization, for an input feature vector x and the predicted output ŷ, the loss function is defined as l for the cost of predicting ŷ when the target is y, i.e. l(ŷ, y). The predicted output ŷ is transformed from the input feature vector x using function f. Function f is parameterized by the weights of convolutional neural network, i.e. ŷ=$f_w$(x). The loss function is described as l(ŷ, y)=l($f_w$(x), y), or Q(z, w)=l($f_w$(x), y) where z is an input and output data pair (x, y). The gradient descent optimization is performed by updating the weights according to:

$$v_{t+1} = \mu v_t - \alpha \frac{1}{n}\sum_{i=1}^{N} \nabla w_t Q(z_t, w_t)$$

$$W_{t+1} = W_t + V_{t+1}$$

In the equations above, α is the learning rate. Also, the loss is computed as the average over a set of n data pairs. The computation is terminated when the learning rate α is small enough upon linear convergence. In other implementations, the gradient is calculated using only selected data pairs fed to a Nesterov's accelerated gradient and an adaptive gradient to inject computation efficiency.

In one implementation, the convolutional neural network uses a stochastic gradient descent (SGD) to calculate the cost function. A SGD approximates the gradient with respect to the weights in the loss function by computing it from only one, randomized, data pair, $z_t$, described as:

$$v_{t+1} = \mu v - \alpha \nabla w Q(z_t, w_t)$$

$$w_{t+1} = w_t + v_{t+1}$$

In the equations above: α is the learning rate; μ is the momentum; and t is the current weight state before updating. The convergence speed of SGD is approximately O(1/t) when the learning rate α are reduced both fast and slow enough. In other implementations, the convolutional neural network uses different loss functions such as Euclidean loss and softmax loss. In a further implementation, an Adam stochastic optimizer is used by the convolutional neural network.

Convolution Layers

The convolution layers of the convolutional neural network serve as feature extractors. Convolution layers act as adaptive feature extractors capable of learning and decomposing the input data into hierarchical features. In one implementation, the convolution layers take two images as input and produce a third image as output. In such an implementation, convolution operates on two images in two-dimension (2D), with one image being the input image and the other image, called the "kernel", applied as a filter on the input image, producing an output image. Thus, for an input vector f of length n and a kernel g of length m, the convolution f*g off and g is defined as:

$$(f * g)(i) = \sum_{j=1}^{m} g(j) \cdot f(i - j + m/2)$$

The convolution operation includes sliding the kernel over the input image. For each position of the kernel, the overlapping values of the kernel and the input image are multiplied and the results are added. The sum of products is the value of the output image at the point in the input image where the kernel is centered. The resulting different outputs from many kernels are called feature maps.

Once the convolutional layers are trained, they are applied to perform recognition tasks on new inference data. Since the convolutional layers learn from the training data, they avoid explicit feature extraction and implicitly learn from the training data. Convolution layers use convolution filter kernel weights, which are determined and updated as part of the training process. The convolution layers extract different features of the input, which are combined at higher layers. The convolutional neural network uses a various number of convolution layers, each with different convolving parameters such as kernel size, strides, padding, number of feature maps and weights.

Non-Linear Layers

Figure 7:
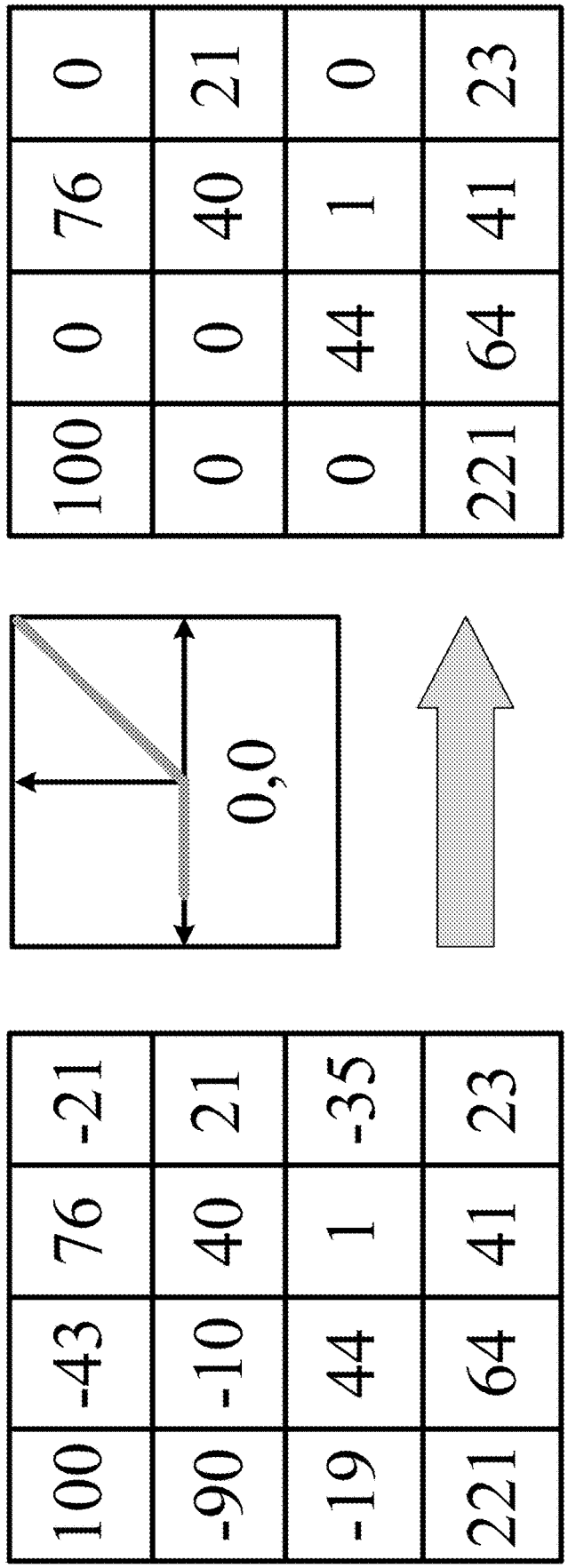
FIG. 7 shows one implementation of a ReLU non-linear layer in accordance with one implementation of the technology disclosed.

FIG. 7 shows one implementation of non-linear layers in accordance with one implementation of the technology disclosed. Non-linear layers use different non-linear trigger functions to signal distinct identification of likely features on each hidden layer. Non-linear layers use a variety of specific functions to implement the non-linear triggering, including the rectified linear units (ReLUs), hyperbolic tangent, absolute of hyperbolic tangent, sigmoid and continuous trigger (non-linear) functions. In one implementation, a ReLU activation implements the function y=max(x, 0) and keeps the input and output sizes of a layer the same. The advantage of using ReLU is that the convolutional neural network is trained many times faster. ReLU is a non-continuous, non-saturating activation function that is linear with respect to the input if the input values are larger than zero and zero otherwise. Mathematically, a ReLU activation function is described as:

$$\varphi(h) = \max(h, 0)$$

$$\varphi(h) = \begin{cases} h & \text{if } h > 0 \\ 0 & \text{if } h \leq 0 \end{cases}$$

In other implementations, the convolutional neural network uses a power unit activation function, which is a continuous, non-saturating function described by:

$$\varphi(h) = (a + bh)^c$$

In the equation above, a, b and c are parameters controlling the shift, scale and power respectively. The power activation function is able to yield x and y-antisymmetric activation if c is odd and y-symmetric activation if c is even. In some implementations, the unit yields a non-rectified linear activation.

In yet other implementations, the convolutional neural network uses a sigmoid unit activation function, which is a continuous, saturating function described by the following logistic function:

$$\varphi(h) = \frac{1}{1 + e^{-\beta h}}$$

In the equation above, β=1. The sigmoid unit activation function does not yield negative activation and is only antisymmetric with respect to the y-axis.

Dilated Convolutions

Figure 8:
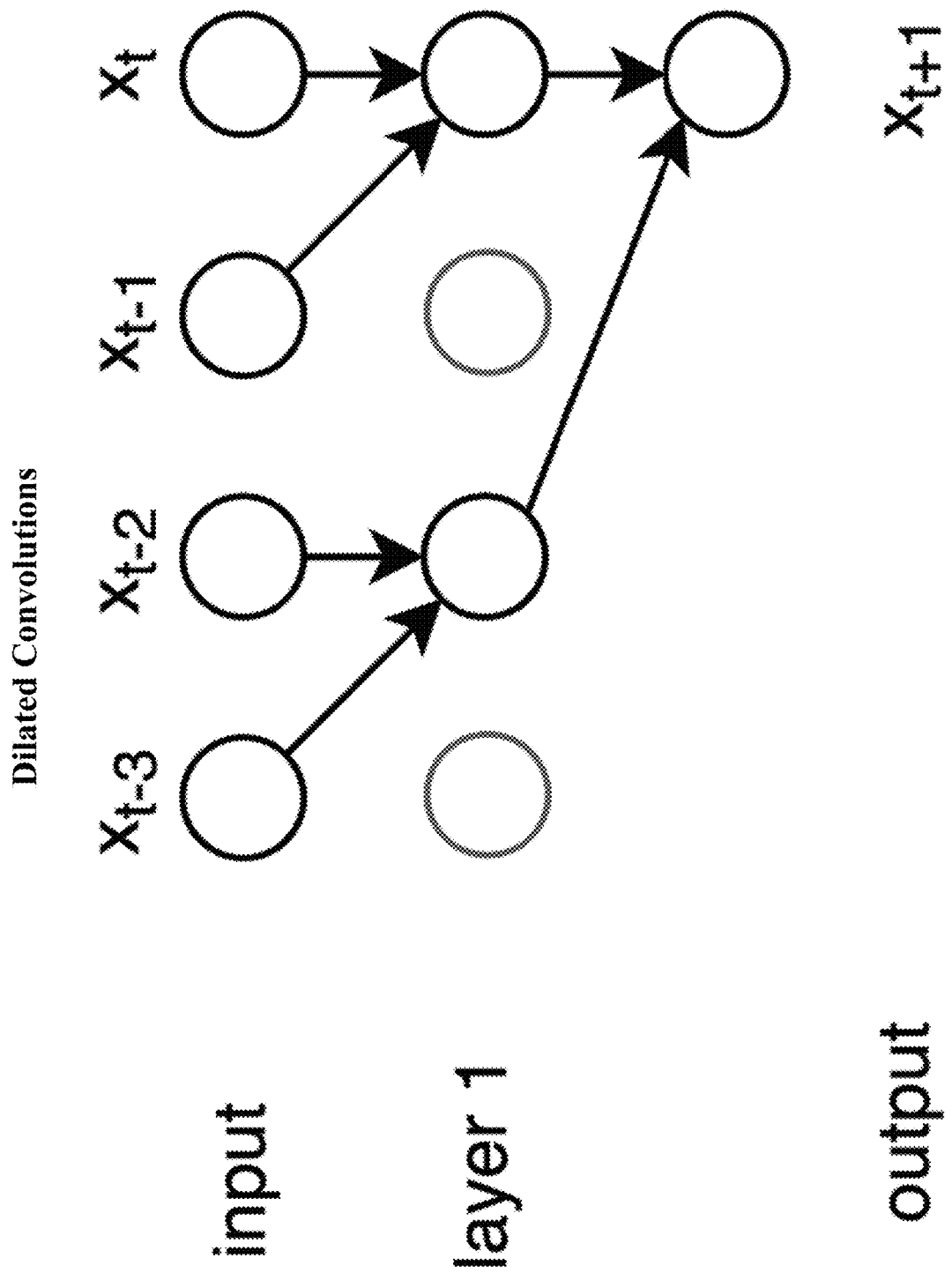
FIG. 8 illustrates dilated convolutions.

FIG. 8 illustrates dilated convolutions. Dilated convolutions, sometimes called atrous convolutions, which literally means with holes. The French name has its origins in the algorithme a trous, which computes the fast dyadic wavelet transform. In these type of convolutional layers, the inputs corresponding to the receptive field of the filters are not neighboring points. This is illustrated in FIG. 8. The distance between the inputs is dependent on the dilation factor.

Sub-Sampling Layers

Figure 9:
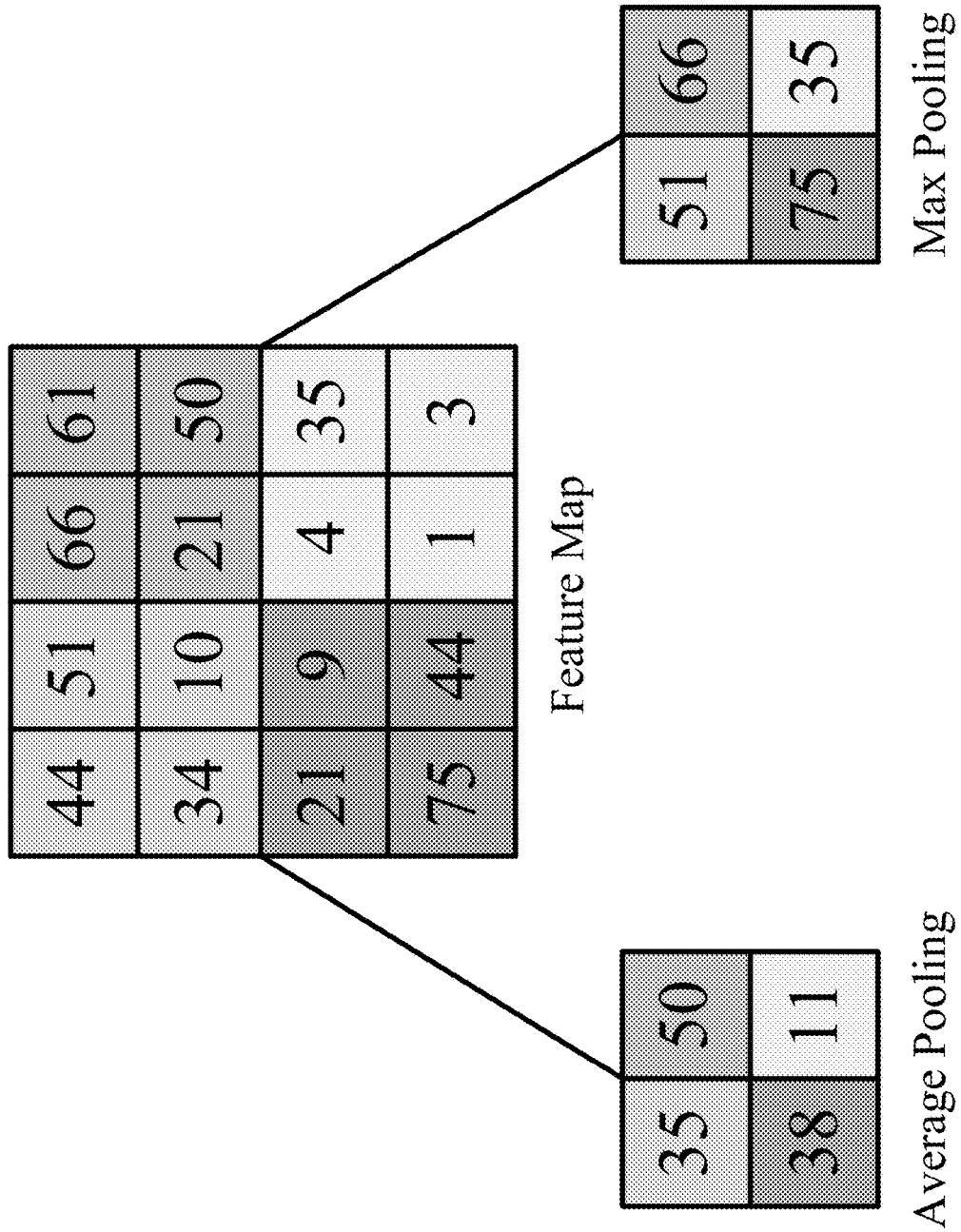
FIG. 9 is one implementation of sub-sampling layers (average/max pooling) in accordance with one implementation of the technology disclosed.

FIG. 9 is one implementation of sub-sampling layers in accordance with one implementation of the technology disclosed. Sub-sampling layers reduce the resolution of the features extracted by the convolution layers to make the extracted features or feature maps—robust against noise and distortion. In one implementation, sub-sampling layers employ two types of pooling operations, average pooling and max pooling. The pooling operations divide the input into non-overlapping two-dimensional spaces. For average pooling, the average of the four values in the region is calculated. For max pooling, the maximum value of the four values is selected.

In one implementation, the sub-sampling layers include pooling operations on a set of neurons in the previous layer by mapping its output to only one of the inputs in max pooling and by mapping its output to the average of the input in average pooling. In max pooling, the output of the pooling neuron is the maximum value that resides within the input, as described by:

$$\varphi_o = \max(\varphi_1, \varphi_2, \ldots, \varphi_1)$$

In the equation above, N is the total number of elements within a neuron set.

In average pooling, the output of the pooling neuron is the average value of the input values that reside with the input neuron set, as described by:

$$\varphi_o = \frac{1}{N}\sum_{n=1}^{N}\varphi_n$$

In the equation above, N is the total number of elements within input neuron set.

In FIG. 9, the input is of size 4×4. For 2×2 sub-sampling, a 4×4 image is divided into four non-overlapping matrices of size 2×2. For average pooling, the average of the four values is the whole-integer output. For max pooling, the maximum value of the four values in the 2×2 matrix is the whole-integer output.

Convolution Examples

Figure 10:
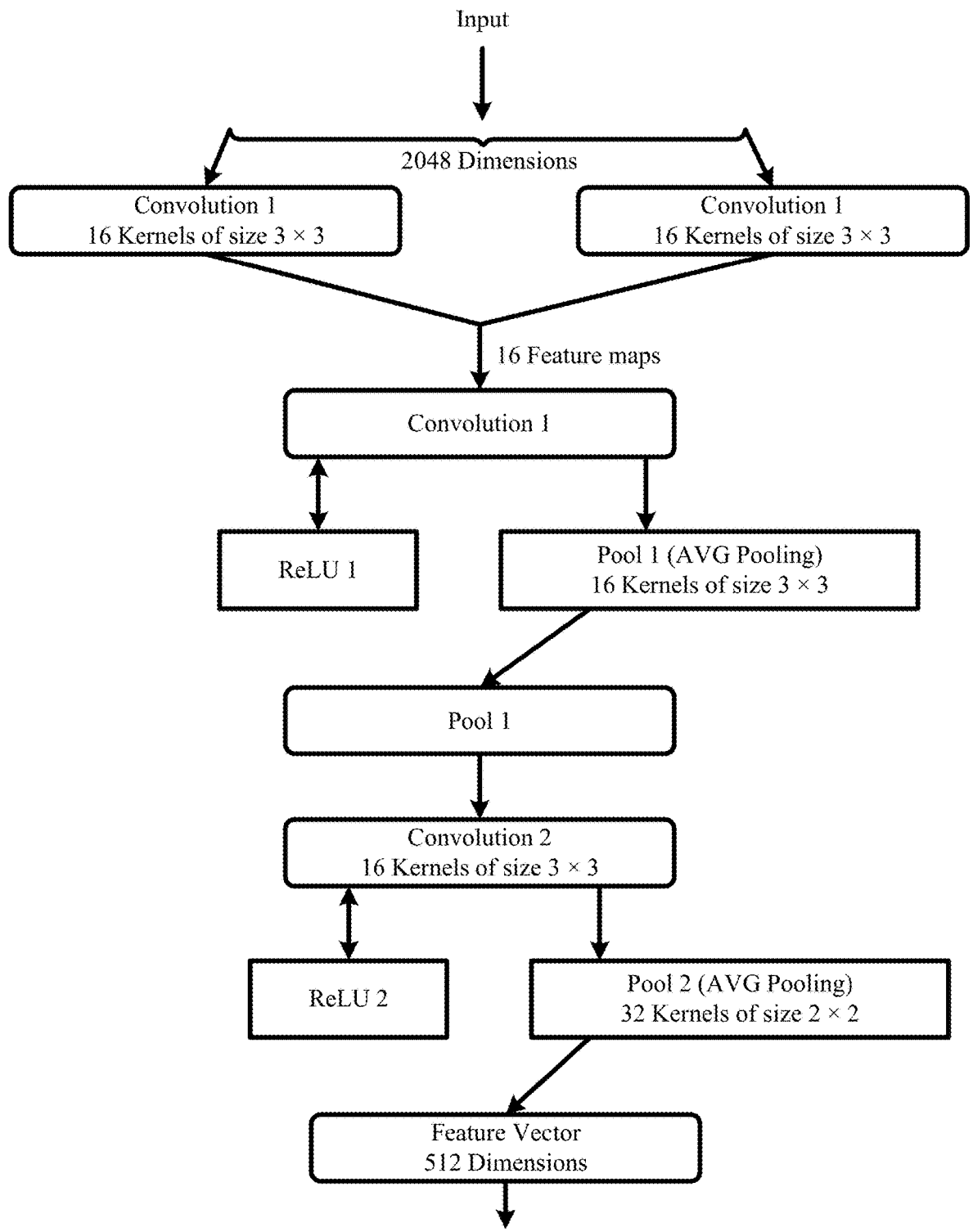
FIG. 10 depicts one implementation of a two-layer convolution of the convolution layers.

FIG. 10 depicts one implementation of a two-layer convolution of the convolution layers. In FIG. 10, an input of size 2048 dimensions is convolved. At convolution 1, the input is convolved by a convolutional layer comprising of two channels of sixteen kernels of size 3×3. The resulting sixteen feature maps are then rectified by means of the ReLU activation function at ReLU1 and then pooled in Pool 1 by means of average pooling using a sixteen channel pooling layer with kernels of size 3×3. At convolution 2, the output of Pool 1 is then convolved by another convolutional layer comprising of sixteen channels of thirty kernels with a size of 3×3. This is followed by yet another ReLU2 and average pooling in Pool 2 with a kernel size of 2×2. The convolution layers use varying number of strides and padding, for example, zero, one, two and three. The resulting feature vector is five hundred and twelve (512) dimensions, according to one implementation.

In other implementations, the convolutional neural network uses different numbers of convolution layers, sub-sampling layers, non-linear layers and fully connected layers. In one implementation, the convolutional neural network is a shallow network with fewer layers and more neurons per layer, for example, one, two or three fully connected layers with hundred (100) to two hundred (200) neurons per layer. In another implementation, the convolutional neural network is a deep network with more layers and fewer neurons per layer, for example, five (5), six (6) or eight (8) fully connected layers with thirty (30) to fifty (50) neurons per layer.

Forward Pass

The output of a neuron of row x, column y in the $l^{th}$ convolution layer and $k^{th}$ feature map for f number of convolution cores in a feature map is determined by the following equation:

$$O_{x,y}^{(l,k)} = \tanh\left(\sum_{t=0}^{f-1}\sum_{r=0}^{k_h}\sum_{c=0}^{k_w} W_{(r,c)}^{(k,t)} O_{(x+r,x+c)}^{(l-1,t)} + \text{Bias}^{(l,k)}\right)$$

The output of a neuron of row x, column y in the $l^{th}$ sub-sample layer and $k^{th}$ feature map is determined by the following equation:

$$O_{x,y}^{(l,k)} = \tanh\left(W^{(k)}\sum_{r=0}^{S_h}\sum_{c=0}^{S_w} O_{(x\times S_h+r, y\times S_w+c)}^{(l-1,k)} + \text{Bias}^{(l,k)}\right)$$

The output of an $i^{th}$ neuron of the $l^{th}$ output layer is determined by the following equation:

$$O_{(l,i)} = \tanh\left(\sum_{j=0}^{H} O_{(l-1,j)} W_{(i,j)}^l + \text{Bias}^{(l,i)}\right)$$

Backpropagation

The output deviation of a $k^{th}$ neuron in the output layer is determined by the following equation:

$$d(O_k^o) = y_k - t_k$$

The input deviation of a $k^{th}$ neuron in the output layer is determined by the following equation:

$$d(I_k^o) = (y_k - t_k)\varphi'(v_k) = \varphi'(v_k) d(O_k^o)$$

The weight and bias variation of a $k^{th}$ neuron in the output layer is determined by the following equation:

$$\Delta W_{k,x}^o = d(I_k^o) y_{k,x}$$

$$\Delta \text{Bias}_k^o = d(I_k^o)$$

The output bias of a $k^{th}$ neuron in the hidden layer is determined by the following equation:

$$d(O_k^H) = \sum_{i=0}^{i<84} d(I_i^o) W_{i,k}$$

The input bias of a $k^{th}$ neuron in the hidden layer is determined by the following equation:

$$d(I_k^H) = \varphi'(v_k) d(O_k^H)$$

The weight and bias variation in row x, column y in a $m^{th}$ feature map of a prior layer receiving input from k neurons in the hidden layer is determined by the following equation:

$$\Delta W_{m,x,y}^{H,k} = d(I_k^H) y_{x,y}^m$$

$$\Delta \text{Bias}_k^H = d(I_k^H)$$

The output bias of row x, column y in a $m^{th}$ feature map of sub-sample layer S is determined by the following equation:

$$d(O_{x,y}^{S,m}) = \sum_{k}^{170} d(I_{m,x,y}^H) W_{m,x,y}^{H,k}$$

The input bias of row x, column y in a $m^{th}$ feature map of sub-sample layer S is determined by the following equation:

$$d(I_{x,y}^{S,m}) = \varphi'(v_k)d(O_{x,y}^{S,m})$$

The weight and bias variation in row x, column y in a $m^{th}$ feature map of sub-sample layer S and convolution layer C is determined by the following equation:

$$\Delta W^{S,m} = \sum_{x=0}^{fh}\sum_{y=0}^{fw} d(I_{[x/2],[y/2]}^{S,m})O_{x,y}^{C,m}$$

$$\Delta \text{Bias}^{S,m} = \sum_{x=0}^{fh}\sum_{y=0}^{fw} d(O_{x,y}^{S,m})$$

The output bias of row x, column y in a $k^{th}$ feature map of convolution layer C is determined by the following equation:

$$d(O_{x,y}^{C,k}) = d(I_{[x/2],[y/2]}^{S,k})W^k$$

The input bias of row x, column y in a $k^{th}$ feature map of convolution layer C is determined by the following equation:

$$d(I_{x,y}^{C,k}) = \varphi'(v_k)d(O_{x,y}^{C,k})$$

The weight and bias variation in row r, column c in an $m^{th}$ convolution core of a $k^{th}$ feature map of $l^{th}$ convolution layer C:

$$\Delta W_{r,c}^{k,m} = \sum_{x=0}^{fh}\sum_{y=0}^{fw} d(I_{x,y}^{C,k})O_{x+r,y+c}^{l-1,m}$$

$$\Delta \text{Bias}^{C,k} = \sum_{x=0}^{fh}\sum_{y=0}^{fw} d(I_{x,y}^{C,k})$$

Residual Connections

Figure 11:
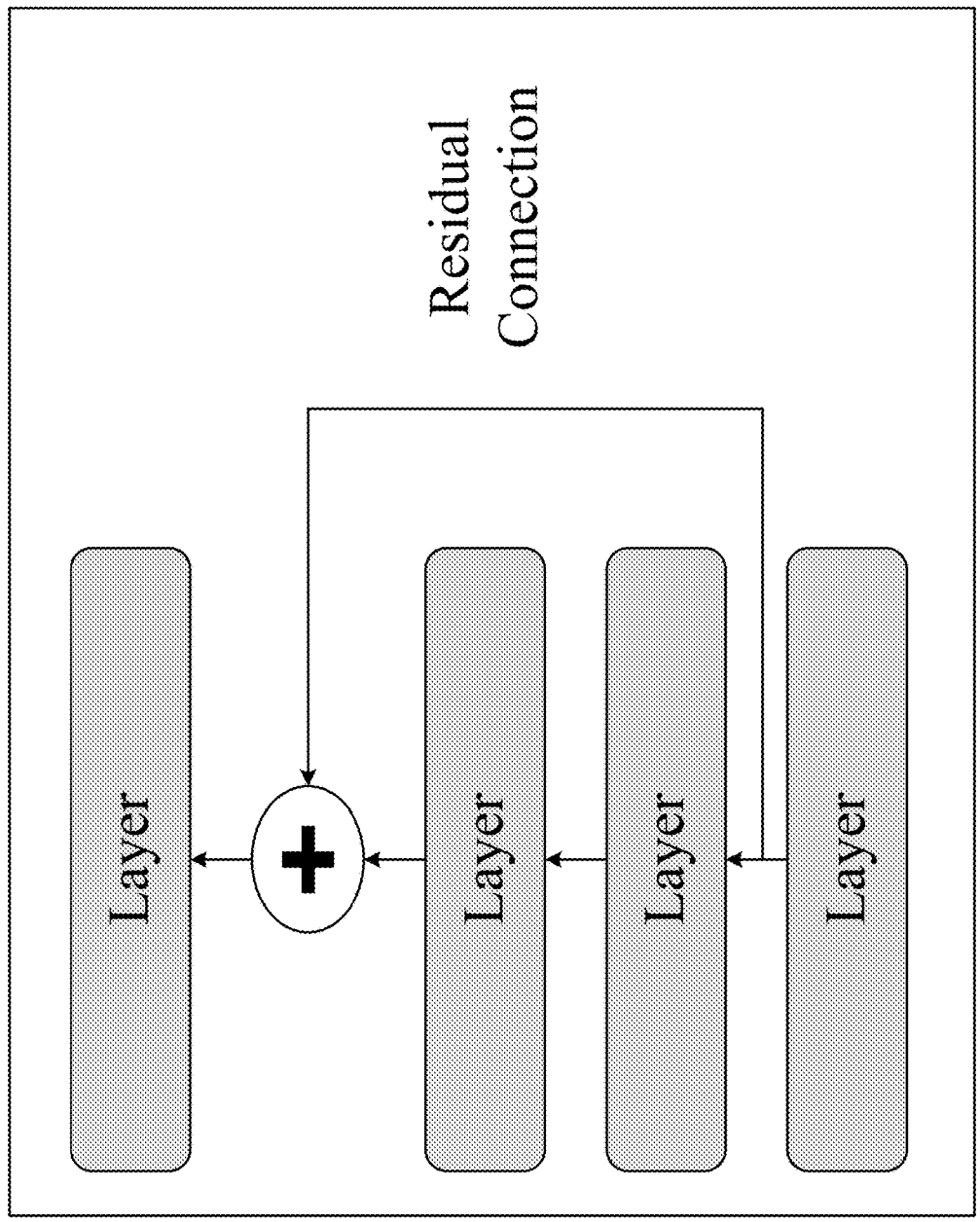
FIG. 11 depicts a residual connection that reinjects prior information downstream via feature-map addition.

FIG. 11 depicts a residual connection that reinjects prior information downstream via feature-map addition. A residual connection comprises reinjecting previous representations into the downstream flow of data by adding a past output tensor to a later output tensor, which helps prevent information loss along the data-processing flow. Residual connections tackle two common problems that plague any large-scale deep-learning model: vanishing gradients and representational bottlenecks. In general, adding residual connections to any model that has more than 10 layers is likely to be beneficial. As discussed above, a residual connection comprises making the output of an earlier layer available as input to a later layer, effectively creating a shortcut in a sequential network. Rather than being concatenated to the later activation, the earlier output is summed with the later activation, which assumes that both activations are the same size. If they are of different sizes, a linear transformation to reshape the earlier activation into the target shape can be used.

Residual Learning and Skip-Connections

Figure 12:
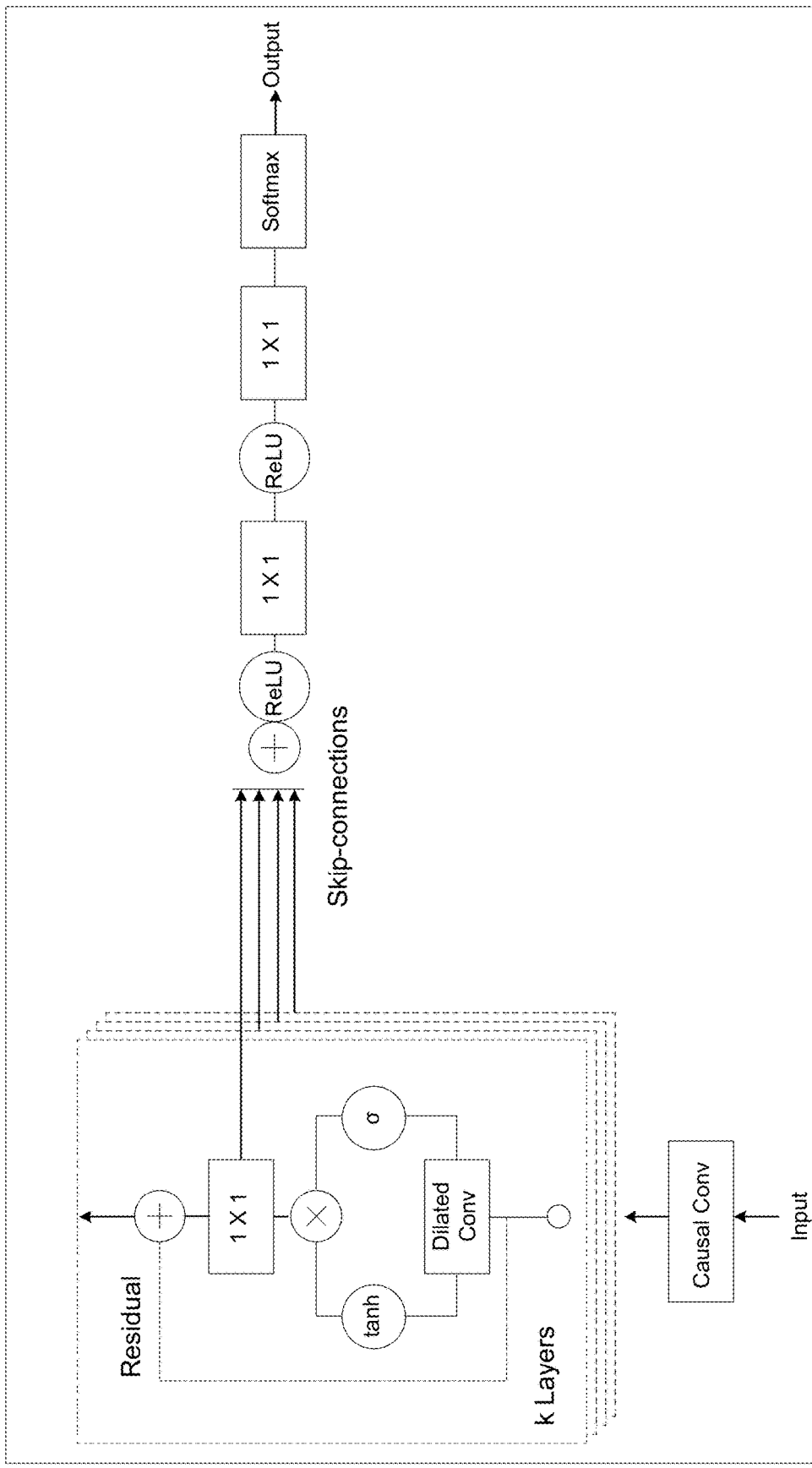
FIG. 12 depicts one implementation of residual blocks and skip-connections.

FIG. 12 depicts one implementation of residual blocks and skip-connections. The main idea of residual learning is that the residual mapping is much easier to be learned than the original mapping. Residual network stacks a number of residual units to alleviate the degradation of training accuracy. Residual blocks make use of special additive skip connections to combat vanishing gradients in deep neural networks. At the beginning of a residual block, the data flow is separated into two streams: the first carries the unchanged input of the block, while the second applies weights and non-linearities. At the end of the block, the two streams are merged using an element-wise sum. The main advantage of such constructs is to allow the gradient to flow through the network more easily.

Benefited from residual network, deep convolutional neural networks (CNNs) can be easily trained and improved accuracy has been achieved for image classification and object detection. Convolutional feed-forward networks connect the output of the $l^{th}$ layer as input to the $(l+1)^{th}$ layer, which gives rise to the following layer transition: $x_l = H_l(x_{l-1})$. Residual blocks add a skip-connection that bypasses the non-linear transformations with an identify function: $x_l = H_l(x_{l-1}) + x_{l-1}$. An advantage of residual blocks is that the gradient can flow directly through the identity function from later layers to the earlier layers. However, the identity function and the output of $H_l$ are combined by summation, which may impede the information flow in the network.

WaveNet

The WaveNet is a deep neural network for generating raw audio waveforms. The WaveNet distinguishes itself from other convolutional networks since it is able to take relatively large 'visual fields' at low cost. Moreover, it is able to add conditioning of the signals locally and globally, which allows the WaveNet to be used as a text to speech (TTS) engine with multiple voices, is the TTS gives local conditioning and the particular voice the global conditioning.

Figure 13:
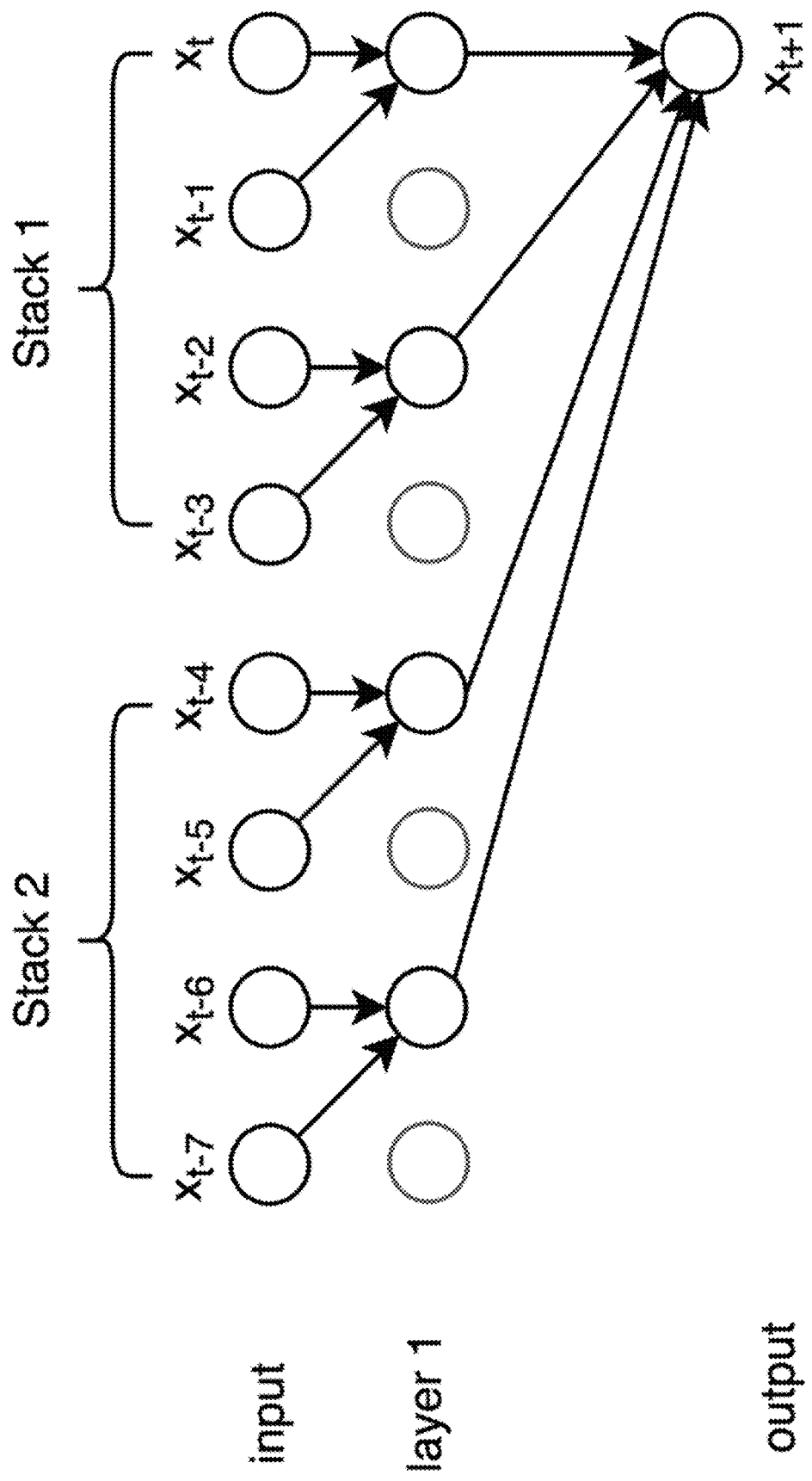
FIG. 13 shows one implementation of stacked dilated convolutions.

The main building blocks of the WaveNet are the causal dilated convolutions. As an extension on the causal dilated convolutions, the WaveNet also allows stacks of these convolutions, as shown in FIG. 13. To obtain the same receptive field with dilated convolutions in this figure, another dilation layer is required. The stacks are a repetition of the dilated convolutions, connecting the outputs of dilated convolution layer to a single output. This enables the WaveNet to get a large 'visual' field of one output node at a relatively low computational cost. For comparison, to get a visual field of 512 inputs, a fully convolutional network (FCN) would require 511 layers. In the case of a dilated convolutional network, we would need eight layers. The stacked dilated convolutions only need seven layers with two stacks or six layers with four stacks. To get an idea of the differences in computational power required for covering the same visual field, the following table shows the number of weights required in the network with the assumption of one filter per layer and a filter width of two. Furthermore, it is assumed that the network is using binary encoding of the 8 bits.

| Network type | No. stacks | No. weights per channel | Total No. of weights |
|---|---|---|---|
| FCN | 1 | $2.6 \cdot 10^5$ | $2.6 \cdot 10^6$ |
| WN | 1 | 1022 | 8176 |
| WN | 2 | 1022 | 8176 |
| WN | 4 | 508 | 4064 |

The WaveNet adds a skip connection before the residual connection is made, which bypasses all the following residual blocks. Each of these skip connections is summed before passing them through a series of activation functions and convolutions. Intuitively, this is the sum of the information extracted in each layer.

Batch Normalization

Batch normalization is a method for accelerating deep network training by making data standardization an integral part of the network architecture. Batch normalization can adaptively normalize data even as the mean and variance change over time during training. It works by internally maintaining an exponential moving average of the batch-wise mean and variance of the data seen during training. The main effect of batch normalization is that it helps with gradient propagation—much like residual connections—and thus allows for deep networks. Some very deep networks can only be trained if they include multiple Batch Normalization layers.

Batch normalization can be seen as yet another layer that can be inserted into the model architecture, just like the fully connected or convolutional layer. The BatchNormalization layer is typically used after a convolutional or densely connected layer. It can also be used before a convolutional or densely connected layer. Both implementations can be used by the technology disclosed and are shown in FIG. 17. The BatchNormalization layer takes an axis argument, which specifies the feature axis that should be normalized. This argument defaults to −1, the last axis in the input tensor. This is the correct value when using Dense layers, Conv1D layers, RNN layers, and Conv2D layers with data_format set to "channels_last". But in the niche use case of Conv2D layers with data_format set to "channels_first", the features axis is axis 1; the axis argument in BatchNormalization can be set to 1.

Batch normalization provides a definition for feed-forwarding the input and computing the gradients with respect to the parameters and its own input via a backward pass. In practice, batch normalization layers are inserted after a convolutional or fully connected layer, but before the outputs are fed into an activation function. For convolutional layers, the different elements of the same feature map—i.e., the activations—at different locations are normalized in the same way in order to obey the convolutional property. Thus, all activations in a mini-batch are normalized over all locations, rather than per activation.

The internal covariate shift is the major reason why deep architectures have been notoriously slow to train. This stems from the fact that deep networks do not only have to learn a new representation at each layer, but also have to account for the change in their distribution.

The covariate shift in general is a known problem in the deep learning domain and frequently occurs in real-world problems. A common covariate shift problem is the difference in the distribution of the training and test set which can lead to suboptimal generalization performance. This problem is usually handled with a standardization or whitening preprocessing step. However, especially the whitening operation is computationally expensive and thus impractical in an online setting, especially if the covariate shift occurs throughout different layers.

The internal covariate shift is the phenomenon where the distribution of network activations change across layers due to the change in network parameters during training. Ideally, each layer should be transformed into a space where they have the same distribution but the functional relationship stays the same. In order to avoid costly calculations of covariance matrices to de-correlate and whiten the data at every layer and step, we normalize the distribution of each input feature in each layer across each mini-batch to have zero mean and a standard deviation of one.

Forward Pass

During the forward pass, the mini-batch mean and variance are calculated. With these mini-batch statistics, the data is normalized by subtracting the mean and dividing by the standard deviation. Finally, the data is scaled and shifted with the learned scale and shift parameters. The batch normalization forward pass $f_{BN}$ is depicted in FIG. 14.

In FIG. 14, $\mu_\beta$ is the batch mean and $\sigma_\beta^2$ is the batch variance, respectively. The learned scale and shift parameters are denoted by $\gamma$ and $\beta$, respectively. For clarity, the batch normalization procedure is described herein per activation and omit the corresponding indices.

Since normalization is a differentiable transform, the errors are propagated into these learned parameters and are thus able to restore the representational power of the network by learning the identity transform. Conversely, by learning scale and shift parameters that are identical to the corresponding batch statistics, the batch normalization transform would have no effect on the network, if that was the optimal operation to perform. At test time, the batch mean and variance are replaced by the respective population statistics since the input does not depend on other samples from a mini-batch. Another method is to keep running averages of the batch statistics during training and to use these to compute the network output at test time. At test time, the batch normalization transform can be expressed as illustrated in FIG. 15. In FIG. 15, $\mu_D$ and $\sigma_\beta^2$ denote the population mean and variance, rather than the batch statistics, respectively.

Backward Pass

Since normalization is a differentiable operation, the backward pass can be computed as depicted in FIG. 16.

Figure 18:
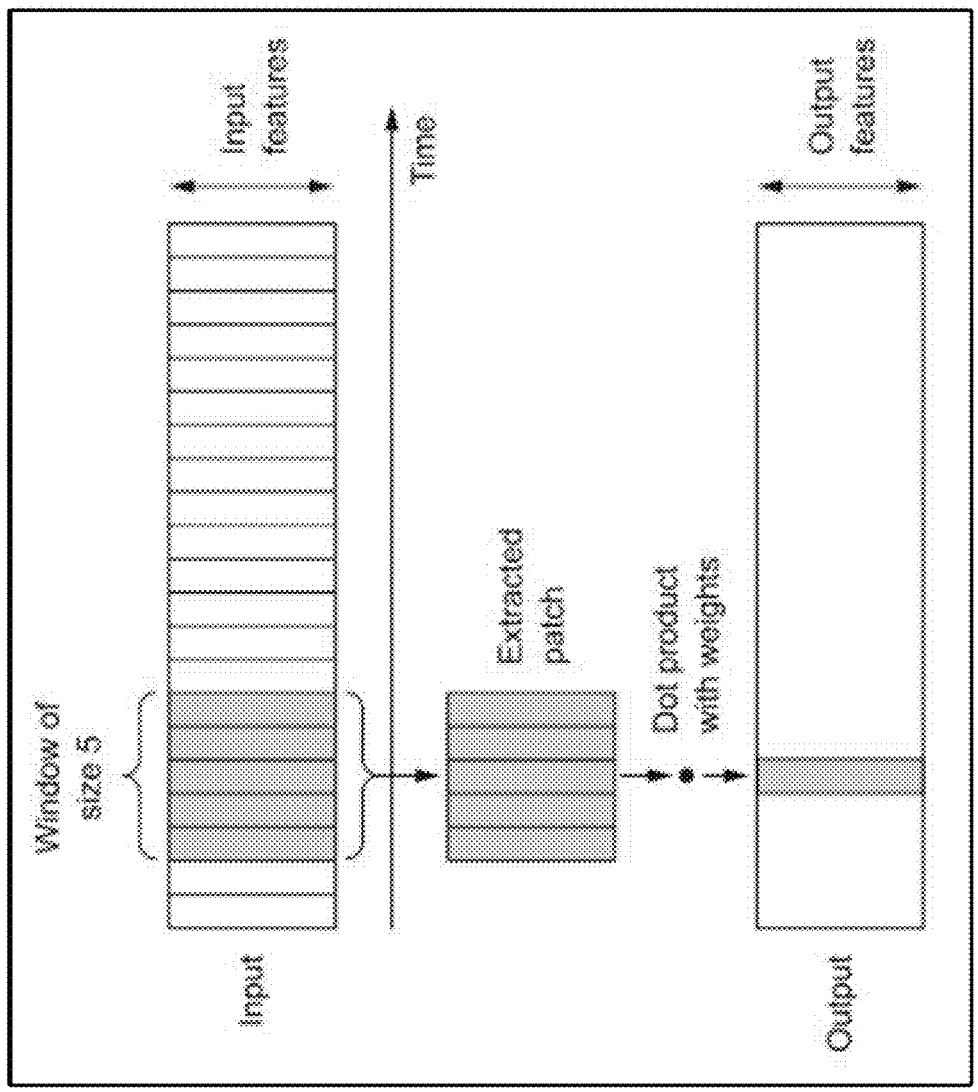
FIG. 18 shows one implementation of 1D convolution.

1D Convolution 1D convolutions extract local 1D patches or subsequences from sequences, as shown in FIG. 18. 1D convolution obtains each output timestep from a temporal patch in the input sequence. 1D convolution layers recognize local patterns in a sequence. Because the same input transformation is performed on every patch, a pattern learned at a certain position in the input sequences can be later recognized at a different position, making 1D convolution layers translation invariant for temporal translations. For instance, a 1D convolution layer processing sequences of bases using convolution windows of size 5 should be able to learn bases or base sequences of length 5 or less, and it should be able to recognize the base motifs in any context in an input sequence. A base-level 1D convolution is thus able to learn about base morphology.

Global Average Pooling

Figure 19:
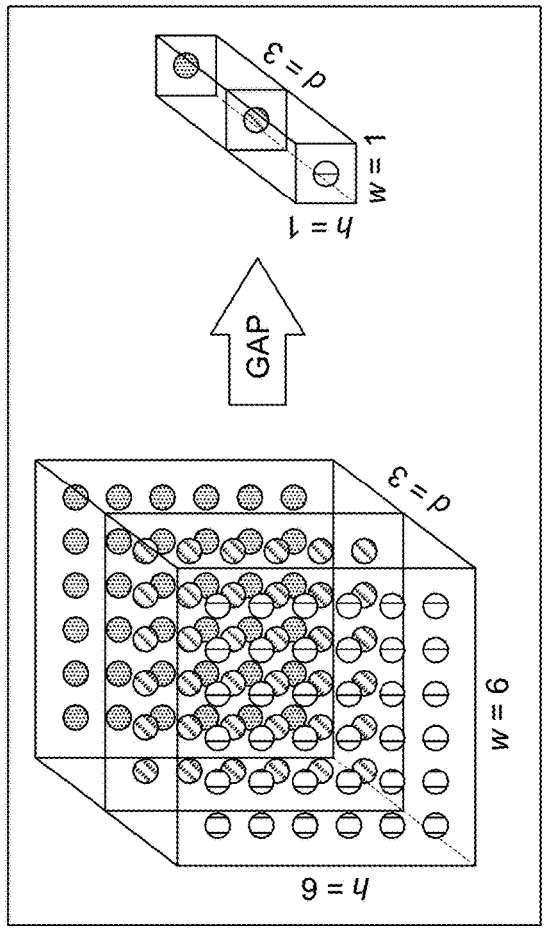
FIG. 19 illustrates how global average pooling (GAP) works.
Figure 19:
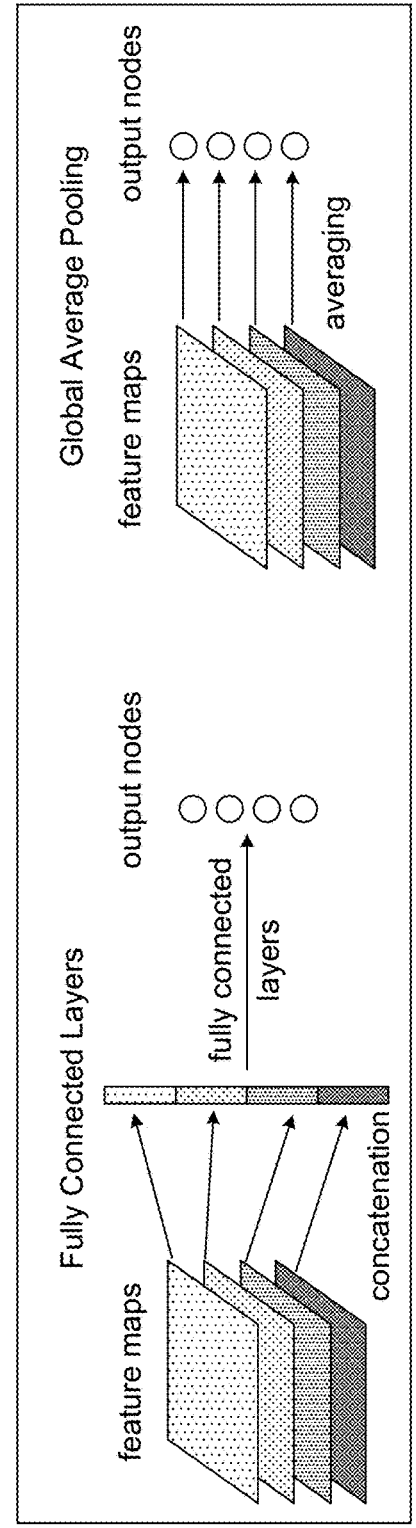

FIG. 19 illustrates how global average pooling (GAP) works. Global average pooling can be use used to replace fully connected (FC) layers for classification, by taking the spatial average of features in the last layer for scoring. The reduces the training load and bypasses overfitting issues. Global average pooling applies a structural prior to the model and it is equivalent to linear transformation with predefined weights. Global average pooling reduces the number of parameters and eliminates the fully connected layer. Fully connected layers are typically the most parameter and connection intensive layers, and global average pooling provides much lower-cost approach to achieve similar results. The main idea of global average pooling is to generate the average value from each last layer feature map as the confidence factor for scoring, feeding directly into the softmax layer.

Global average pooling have three benefits: (1) there are no extra parameters in global average pooling layers thus overfitting is avoided at global average pooling layers; (2) since the output of global average pooling is the average of the whole feature map, global average pooling will be more robust to spatial translations; and (3) because of the huge number of parameters in fully connected layers which usually take over 50% in all the parameters of the whole network, replacing them by global average pooling layers can significantly reduce the size of the model, and this makes global average pooling very useful in model compression.

Global average pooling makes sense, since stronger features in the last layer are expected to have a higher average value. In some implementations, global average pooling can be used as a proxy for the classification score. The feature maps under global average pooling can be interpreted as confidence maps, and force correspondence between the feature maps and the categories. Global average pooling can be particularly effective if the last layer features are at a sufficient abstraction for direct classification; however, global average pooling alone is not enough if multilevel features should be combined into groups like parts models, which is best performed by adding a simple fully connected layer or other classifier after the global average pooling.

Examples of Neural Network Models

Figure 20:
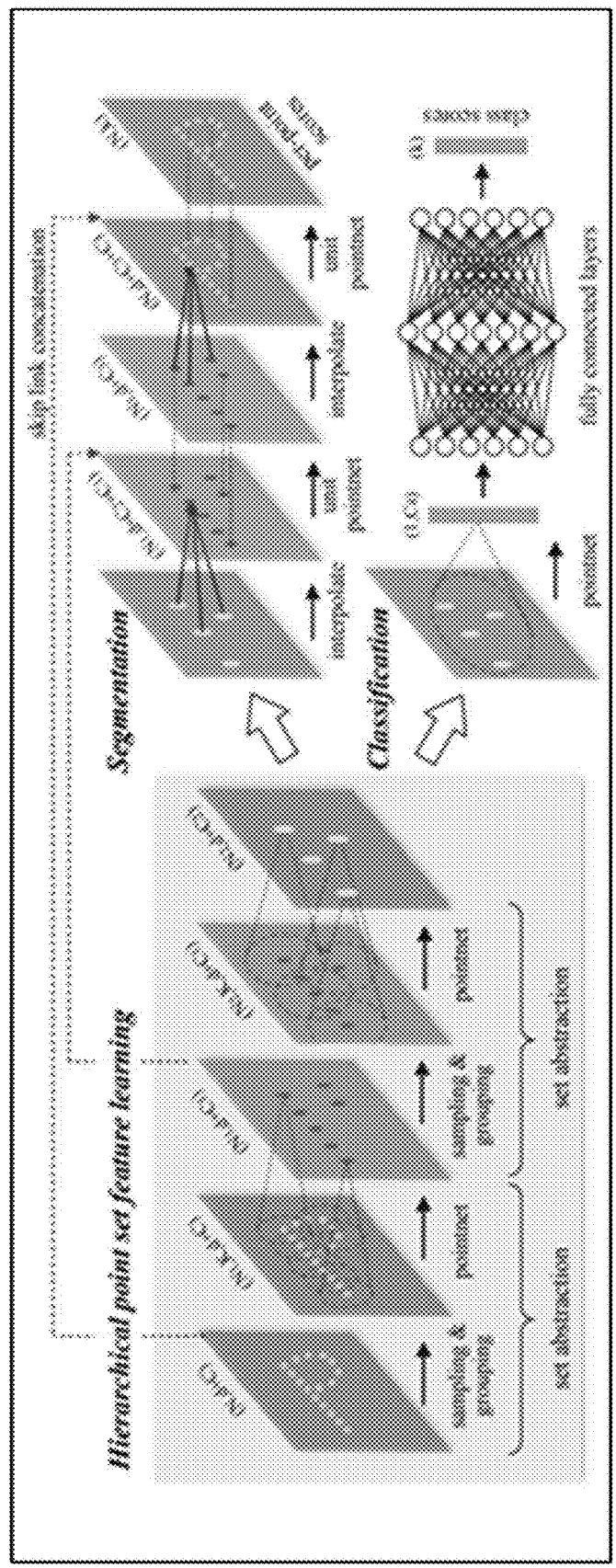
FIG. 20 is an example machine learning model that can be used by the technology disclosed.

FIG. 20 presents an example of a neural network that can be applied by the technology disclosed to process images captured by one or more cameras deployed on the robot system. The example network shown in FIG. 20 is referred to as PointNet++ implementation of the model. The PointNet model applies deep learning to point sets. However, PointNet model does not capture local structures limiting its ability to recognize fine-grained patterns. PointNet++ model includes hierarchical structure that can apply the deep learning model recursively on a nested partitioning of the input point set. For further details of PointNet++ model, refer to Qi et al. 2017, "PointNet++: Deep Hierarchical Feature Learning on Point Sets in a Metric Space", available at <<arxiv.org/abs/1706.02413>>. Color information can be associated to each point as additional channel information other than x, y, z coordinate positions. Note that the model does not require color information therefore it can be considered as an optional input.

The technology disclosed can also include depth information as an additional input to a machine learning model. The system can provide the image from the depth camera as an additional input to the machine learning model. The system can include depth image feature extractor logic to extract features from the depth image. The system can include logic to combine the depth image features with RGB image features extracted from images from the RGB camera. In one implementation, as the one or more RGB cameras and the depth camera deployed on the robot are synchronized and tightly coupled, the system can match features from corresponding depth images to matching RGB images when providing input to the machine learning model.

It is understood that the technology disclosed can use other types of machine learning models for image classification. Examples of such models include ResNet model, VGG model, etc.

Sensing, Point Cloud, Occupancy Map

Figure 21:
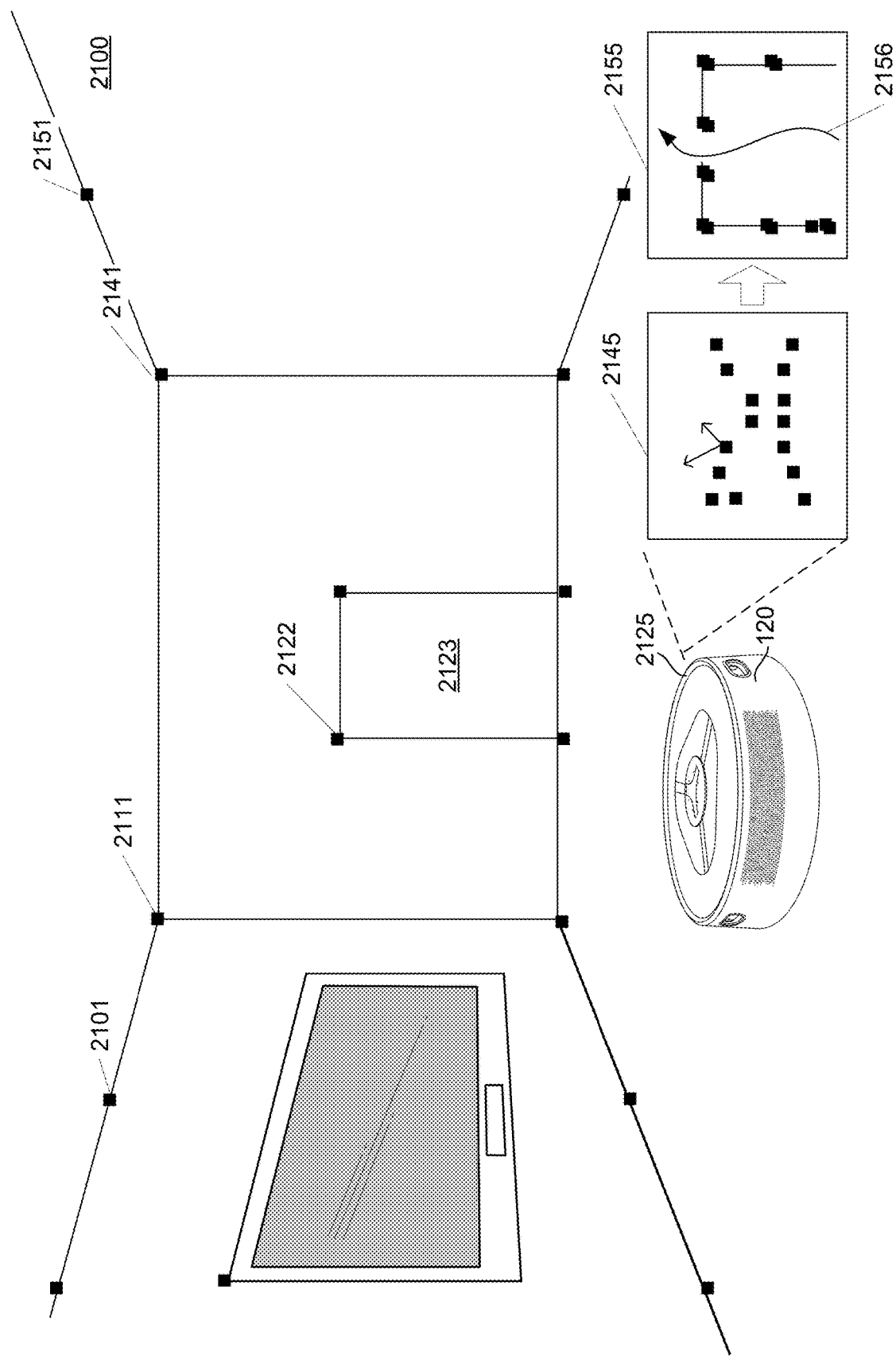
FIG. 21 illustrates an example robot guidance application in which one implementation can be embodied.

FIG. 21 illustrates an example model of robot guidance using image and auxiliary sensor information techniques described herein. Examples of robot applications that benefit from employing positional awareness techniques such as described herein include:
Caregiver and Service robots (traveling on a ground plane)
A robot vacuuming/mopping/cleaning the floor.
A robot being commanded to carry objects around the environment.
A telepresence robot moving around a remote environment automatically.
A robot butler that follows a person around.

In each of the scenarios listed above, the robot utilizes the technology disclosed herein in order to track its own location and to recognize the objects that it encounters. Also, since the robot performs many complex tasks, each with real-time constraints, it is beneficial that the sensing be done rapidly to accelerate the perception pipeline. In addition, since it is a mobile robot, which carries limited storage capacity battery, energy consumption is a design point. In implementations, some computational tasks are off loaded from the main processor to one or more auxiliary processors, either co-located on the robot or available via networks 181 (e.g., "in the cloud") to reduce power consumption, thereby enabling implementations to achieve overall energy efficiency. Cost is an issue in mobile robots, since lowering the cost of the robot makes the robot affordable to more customers. Hence cost can be another factor for sensor and guidance system design. In implementations, one depth sensing camera is used for localization tasks, e.g., finding distance to points on objects, and one colored (RGB) camera for recognition tasks. This design point enables these implementations to significantly improve performance vs. cost over a e.g., stereo colored sensor designs without sacrificing performance.

In FIG. 21, the walls, corners and door 2123 of room 2100 as well as the travels of service robot 2125 on the floor of room 2100 are reflected in the hybrid point grid, comprised of descriptive point cloud 2145 and occupancy grid 2155, developed by the multiple sensor architecture described herein above in the Robot Architecture section by applying deep learning techniques described herein above in the Deep Learning Architecture section. The occupancy grid 2155 is a part of the hybrid point grid that is a layer of the multi-layer 2D occupancy grid map described in the Deep Learning Architecture section. To build a map of an unknown (newly exposed) environment, the multi-sensor equipped robot 2125 can track its pose using the technology described herein above in the Robot Architecture section while incrementally building an initial descriptive point cloud using the technology described herein above in the Deep Learning Architecture section. Then, the robot 2125 builds an occupancy grid 2155 to complete the hybrid point grid from the initial descriptive point cloud 2145 using the technology described herein above in the Deep Learning Architecture section.

Obtain Real Time Image and Information from Auxiliary Sensors

In order to track its location, the robot senses its own movement through understanding images captured by the depth sensing camera and RGB sensing camera, and one or more auxiliary sensor types (tactile, odometry, etc.). The multiple sensory input robot generates reliable data from auxiliary sensors enabling the robot to accurately infer the robot's location within the environment. FIG. 21 illustrates an example robot guidance application in which one implementation can be embodied. As illustrated by FIG. 21, robot 2125 implements multiple sensory inputs to self-localize within a room 2100. The robot 2125 in FIG. 21 employs the cameras 202, 204 (of FIGS. 2A and 2B) of a multiple sensory input to capture image frames as well as distance (depth) information of the surrounding environment of room 2100. The images are processed according to the technology disclosed herein above under the Robot Architecture and Deep Learning Architecture sections as follows:

Detect and Describe Features in Captured Images

Multiple sensory input determines feature points 2101, 2111, 2141, 2151, 2122, and so forth for the walls, corners and door 2123 of room 2100 from the information in the captured image frames. In some implementations, Shi-Tomasi feature detection is employed to determine the feature points 2101, 2111, 2141, 2151, 2122 from the image frames. Features are assigned descriptors using ORB feature description. Optical flow techniques are used to determine 2D correspondences in the images, enabling matching together features in different images.

Map Feature Descriptors to a Hybrid Point Grid

The multiple sensory input equipped robot 2125 can build a descriptive point cloud 2145 of the obstacles in room 2100 enabling the robot 2125 to circumnavigate obstacles and self-localize within room 2100. Multiple sensory input creates, updates, and refines descriptive point cloud 2145 using feature descriptors determined for room features indicated by points 2101, 2111, 2141, 2151, 2122 using the technology disclosed herein above under the Deep Learning Architecture sections. As depicted schematically in FIG. 21, descriptive point cloud 2145 includes coordinates and feature descriptors corresponding to the feature points 2101, 2111, 2141, 2151, 2122 of room 2100. Multiple sensory input prepares an occupancy map 2155 by reprojecting feature points 2101, 2111, 2141, 2151, 2122 onto a 2D layer corresponding to the floor of the room 2100 as shown in FIG. 21. In some implementations, second and possibly greater occupancy maps are created at differing heights of the robot 2125, enabling the robot 2125 to navigate about the room 2100 without bumping its head into door soffits, or other obstacles above the floor.

Figure 22A:
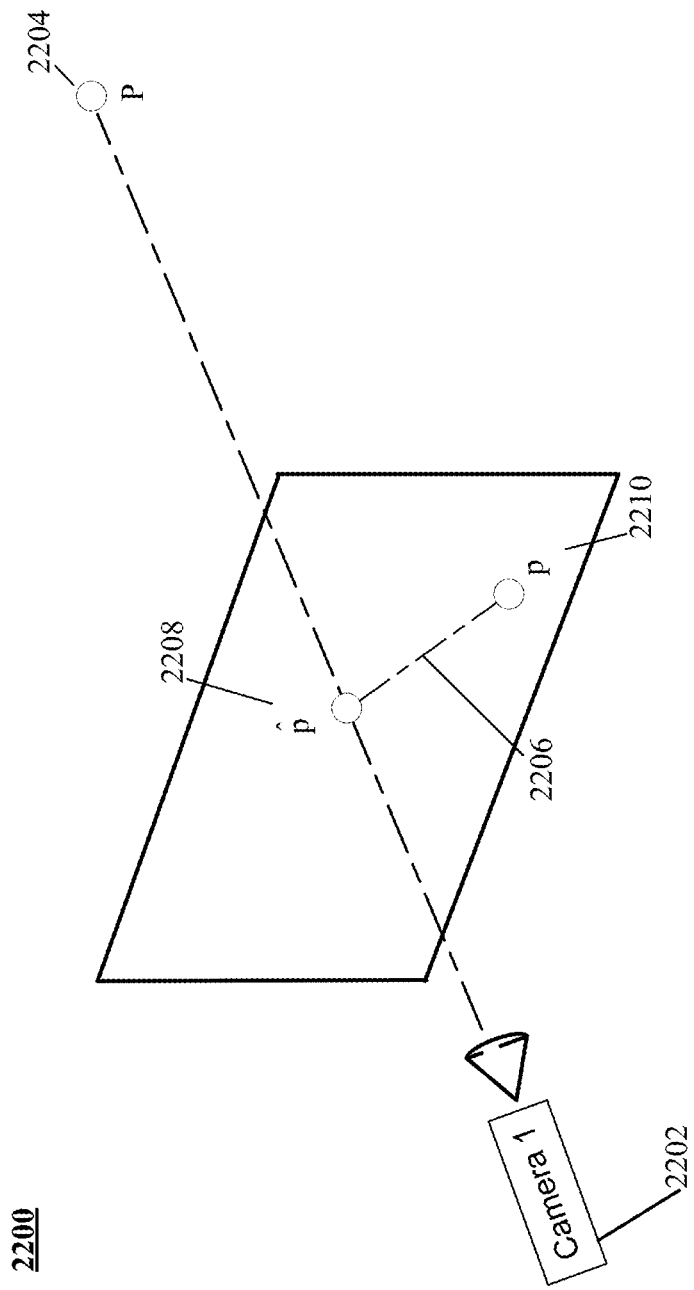
FIG. 22A illustrates an example of reprojection error.

Now with reference to FIG. 22A illustrates an example of reprojection 2200. In FIG. 22A, some points in the reference frame of camera 2202 are used to triangulate one or more new 3D points P 2204 in the world coordinate frame. Due to errors in the calibration of the camera(s) 2202, the spatial position of point P 2204 will not be completely accurate. The reprojection error 2206 can be determined from the resulting 3D point P 2204 re-projected into the coordinates of the camera 2202 (using the calibration data for the camera), obtaining a new point $\hat{p}$ 2208 near the originally projected p 2210. The reprojection error 2206 is the straight-line distance between the original point p 2210 and the reprojected point $\hat{p}$ 2208.

Figure 22B:
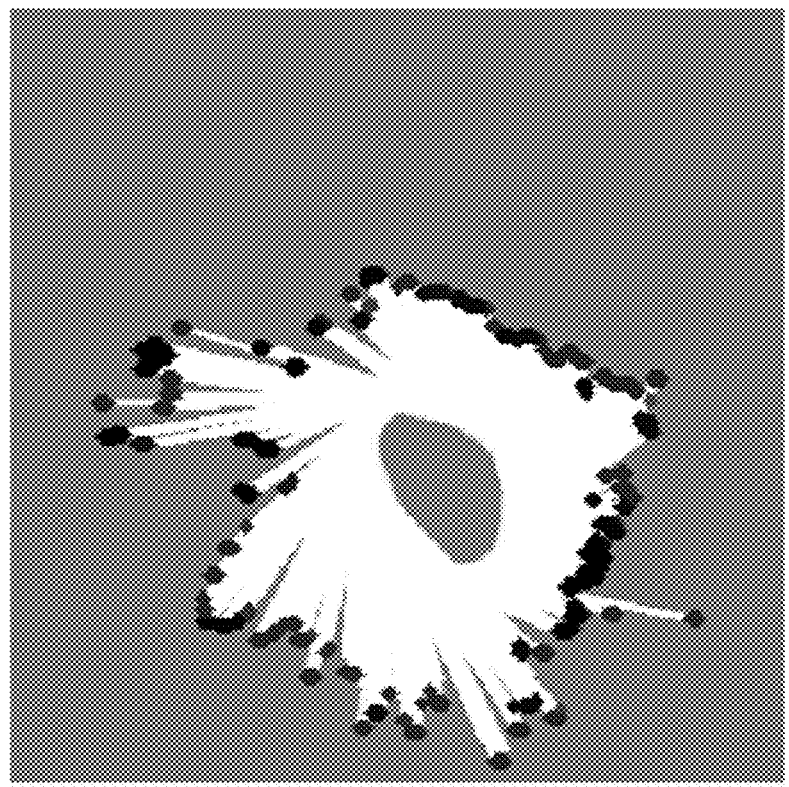
FIG. 22B illustrates an example of an occupancy grid map in one implementation.
Figure 22B:
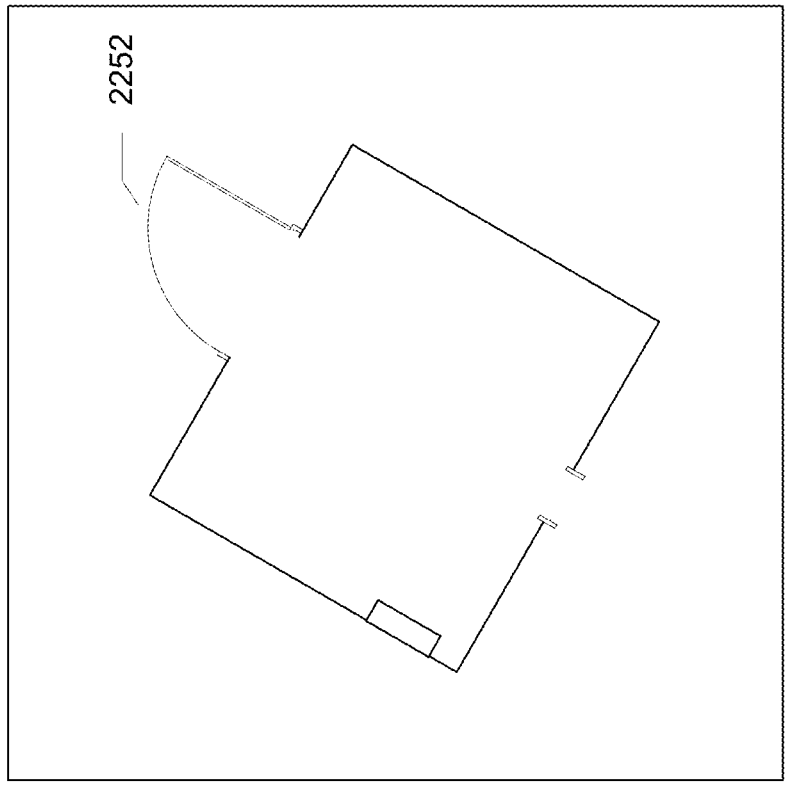

Now with reference to FIG. 22B, which illustrates an example of an occupancy grid 2250, the white portions indicate empty space—in other words space that has been determined from multiple sensory input to be unoccupied. Portions in solid black indicate space that is occupied by an object or obstacle. The gray portions indicate space that the multiple sensory input of robot 2125 has not yet determined whether these spaces are occupied or empty. The Occupancy grid 2250 of FIG. 22B indicates a single layer, such as a floor layer 2252.

The descriptive point cloud 2145 and occupancy grid 2155 comprise a hybrid point grid that enables the robot 2125 to plan paths of travel through room 2100, using the occupancy grid 2155 and self-localize relative to features in the room 2100 using the descriptive point cloud 2145.

Using the Occupancy Grid and Path Planning

When the robot is activated in a previously mapped environment, the robot uses the technology described herein above in the Tracking sections to self-locate within the descriptive point cloud 2145. In cases where the robot finds itself in an unmapped environment, the occupancy grid and path planning can be used without a previously built map by using the SLAM system described herein above to build a map in real-time, thereby enabling the robot to localize itself in the unmapped environment. The descriptive point cloud 2145 and occupancy grid 2155 comprise a hybrid point grid representation that is key to enabling robot action (i.e., moving on the floor) using passive sensors because the robot uses the occupancy grid 2155 in order to plan a trajectory 2156 from its current location to another location in the map using the technology described herein above in the Deep Learning Architecture sections. A person or entity can also command the robot to go to a specific point in the occupancy grid 2155. While traveling, the robot uses the descriptive point cloud 2145 to localize itself within the map as described herein above in the Tracking sections. The robot can update the map using the techniques described herein above in the Deep Learning Architecture sections. Further, some implementations equipped with active sensors (e.g., sonar, LIDAR) can update the map using information from these sensors as well.

Using the Occupancy Grid to Control Behavior and Perform Path Planning

In one implementation, planning is implemented using a plurality of state machines. A representative architecture includes three layers, comprising a Motion commander level, a Robot commander level and a Planner level. These state machines are configured to issue a command (s) once the state is changed. In our example, the Motion commander is the low-level robot motion controller. It controls the robot go forward, rotate and wall-follow. The Robot Commander is the mid-level robot commander. It controls the robot's motions including zigzag moves, waypoint moves, enter unknown space, etc. The Planner is the highest-level robot planner. It describes the planning how robot will conduct an area coverage application (e.g., inspecting a factory floor, i.e., locating stray parts, imperfections, lack of level, etc., cleaning a floor, surveying a surface area, etc.). As the robot moves, a process gathers sensory information from the camera(s), tactile and non-tactile sensors of the robot platform and wheel odometry information from one or more wheel sensors, from which the robot's position in its environment and the positions and locations of obstacles are updated in an occupancy grid map (OGM). When a sensed position for the robot differs from a mapped, computed position for the robot by a predefined threshold, a re-localization process is triggered. Certain implementations use thresholds between 1 cm. and 1 m. One embodiment employs a 0.5 m. threshold.

Occupancy Map Segmentation

Figure 23:
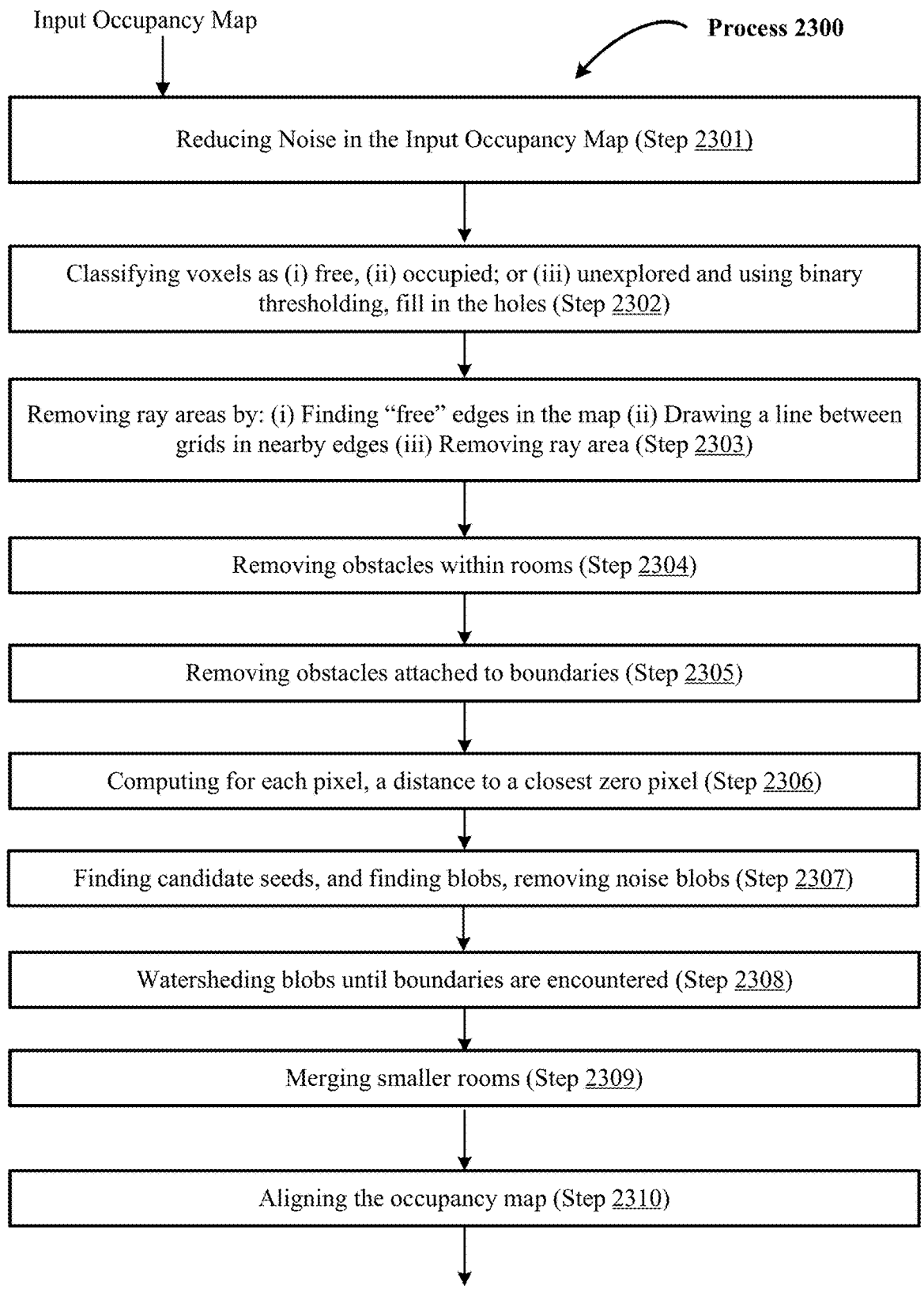
FIG. 23 presents a flowchart of processing steps for an occupancy map.

FIG. 23 depicts a flowchart of various processes used during the process 2300 of refining occupancy map for the Robot 120 in an embodiment of the present technology.

Figure 24B:
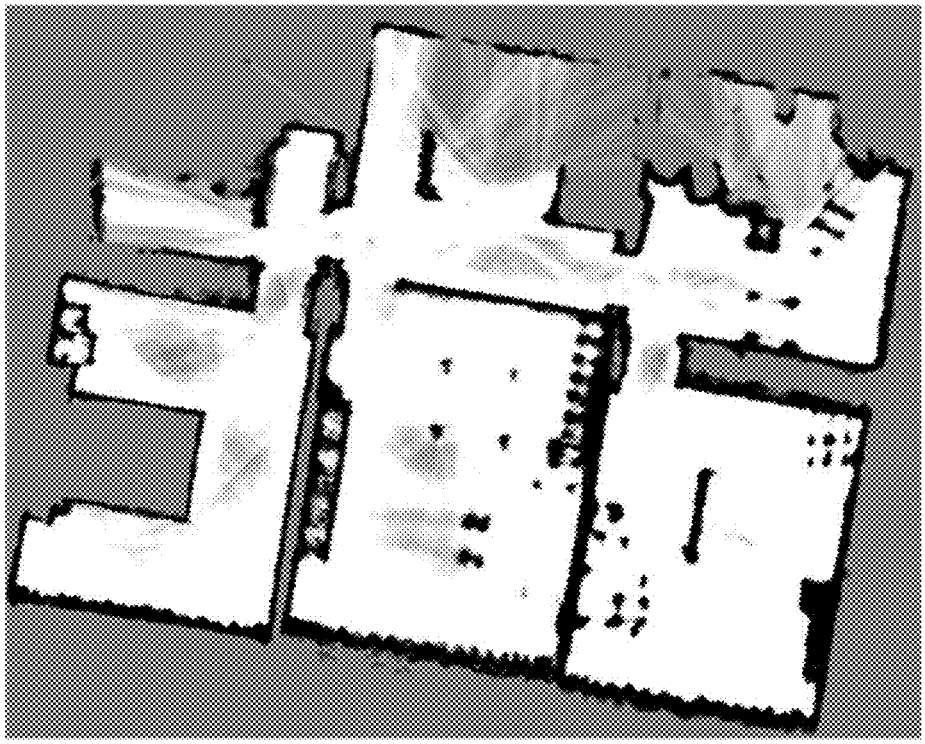
FIGS. 24A, 24B, 24C, 24D, 24E, 24F, 24G, 24H, 24I, 24J, 24K, 24L, 24M, 24N, 24O, 24P and 24Q present examples of occupancy maps that are processed by the technology disclosed by applying various image processing operations.
Figure 24A:
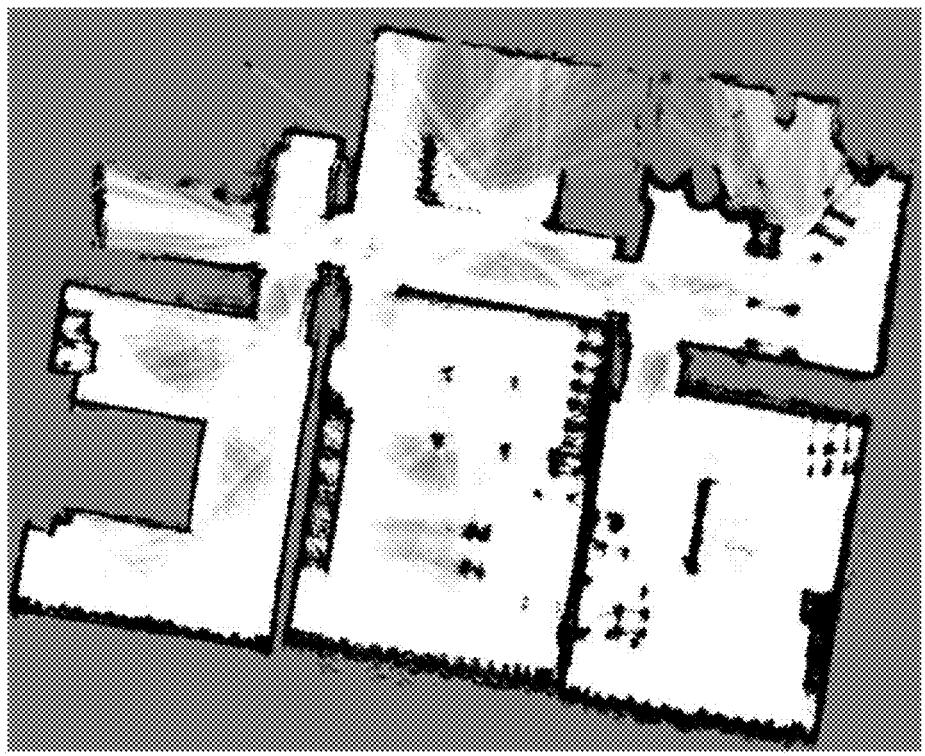

An input occupancy map (See FIG. 24A) is received.

In a step 2301 reducing noise in the occupancy map; (See FIG. 24B)

Figure 24D:
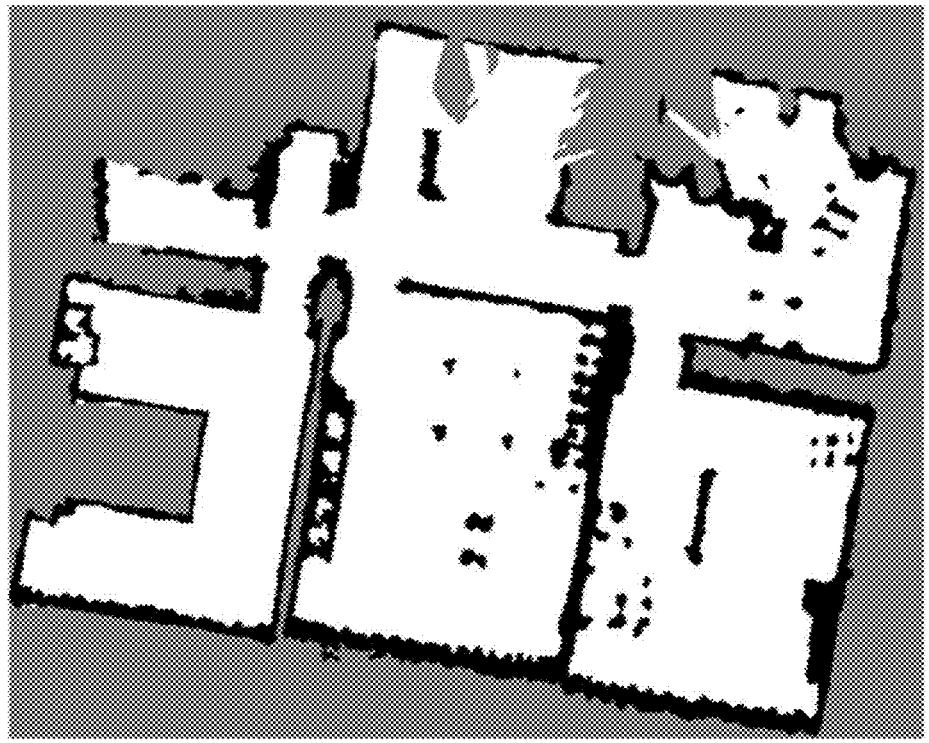
Figure 24C:
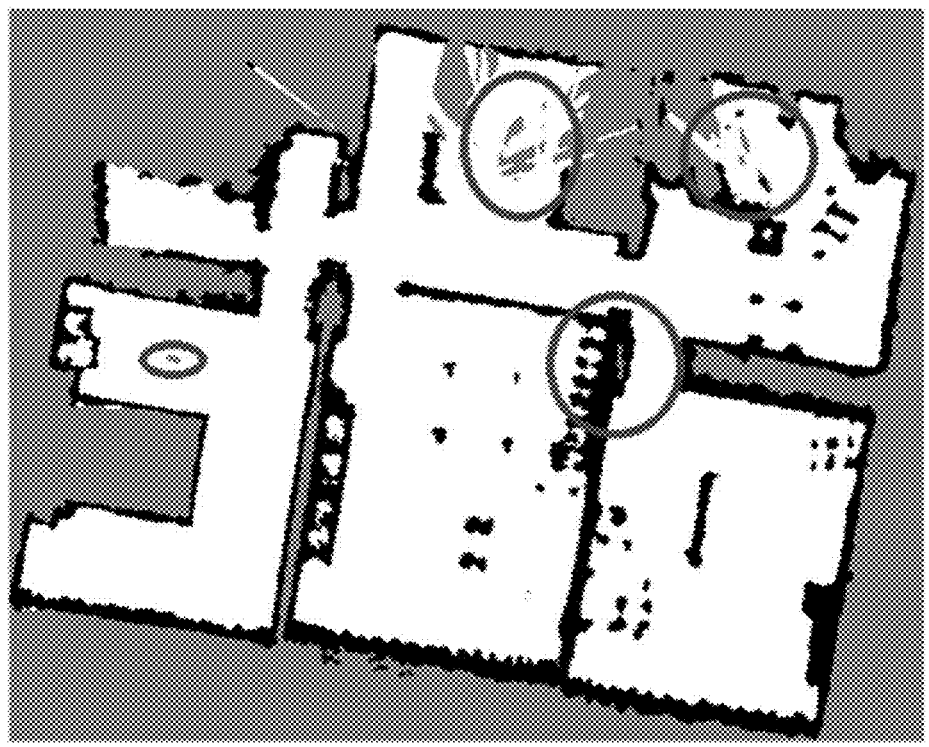

In a step 2302 classify voxels as (i) free, (ii) occupied; or (iii) unexplored; (See FIG. 24C) and using binary thresholding, fill in the holes (See FIG. 24D)

Figure 24G:
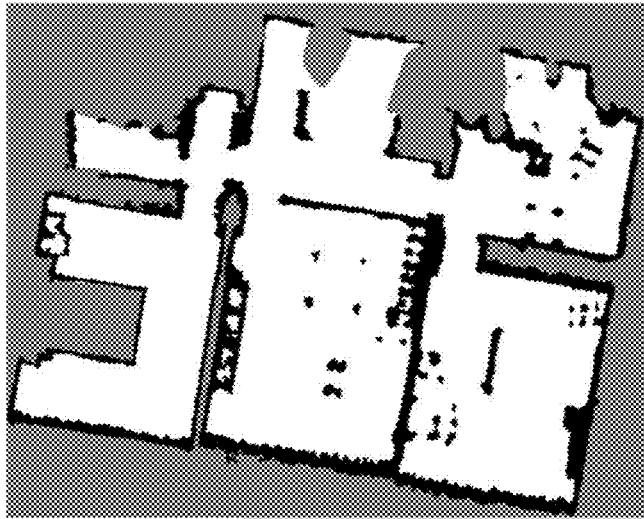
Figure 24F:
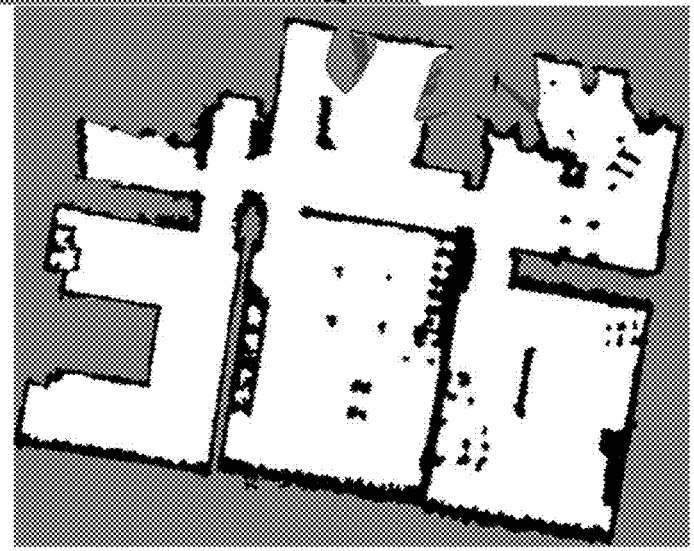
Figure 24E:
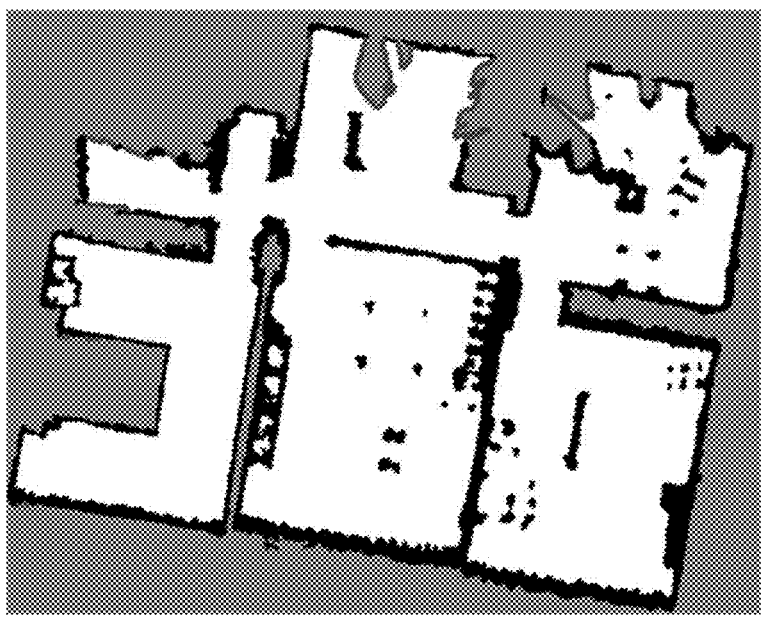
Figure 24I:
Figure 24H:

In a step 2303 removing ray areas by: (i) Find "free" edges in the map (See FIG. 24E), (ii) Drawing a line between grids in nearby edges, if the line is not blocked by occupied grids or sensor grids (See FIG. 24F), and (iii) removing ray area (See FIG. 24G);

In a step 2304 removing obstacles within rooms; and (Step 2305) removing obstacles attached to boundaries; (See FIG. 24H and FIG. 24I)

Figure 24K:
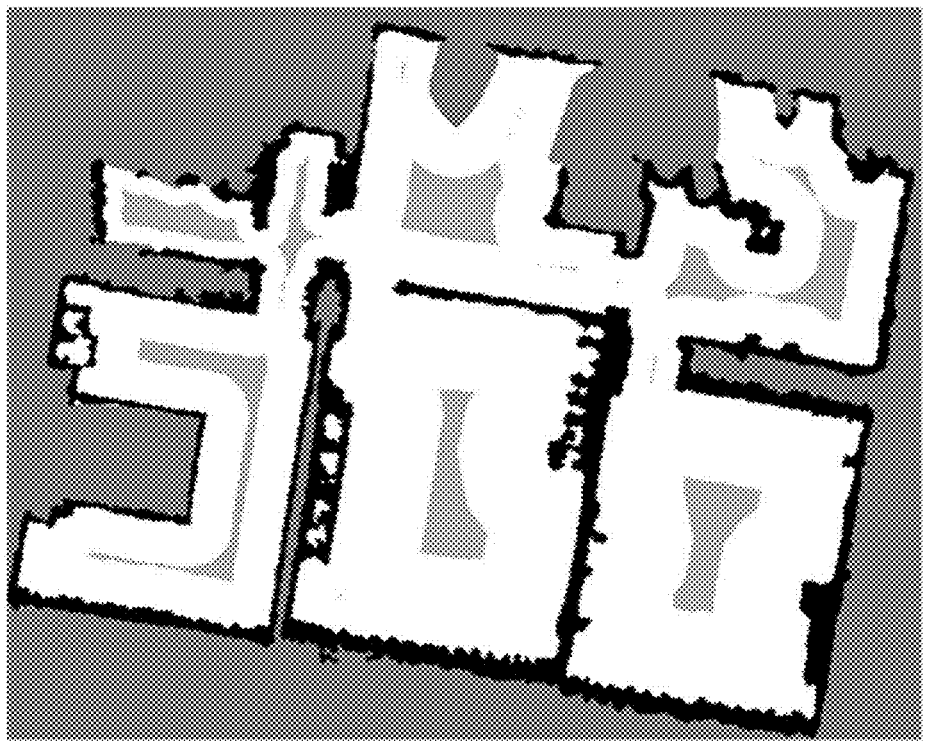
Figure 24J:
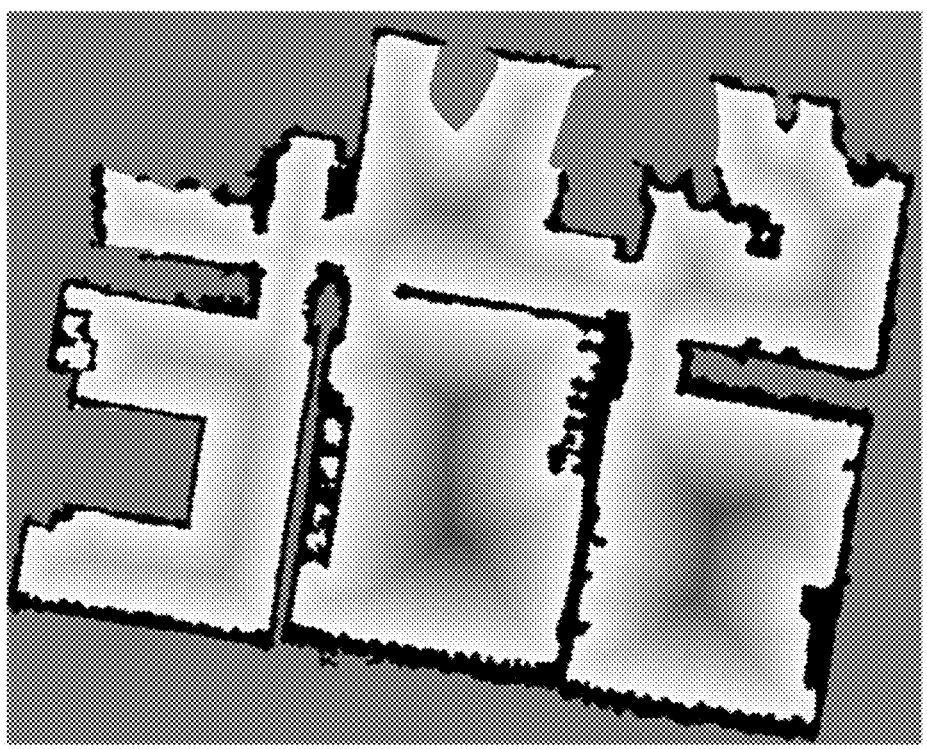

In a step 2306 computing for each pixel, a distance to a closest zero pixel; (See FIG. 24J)

Figure 24L:
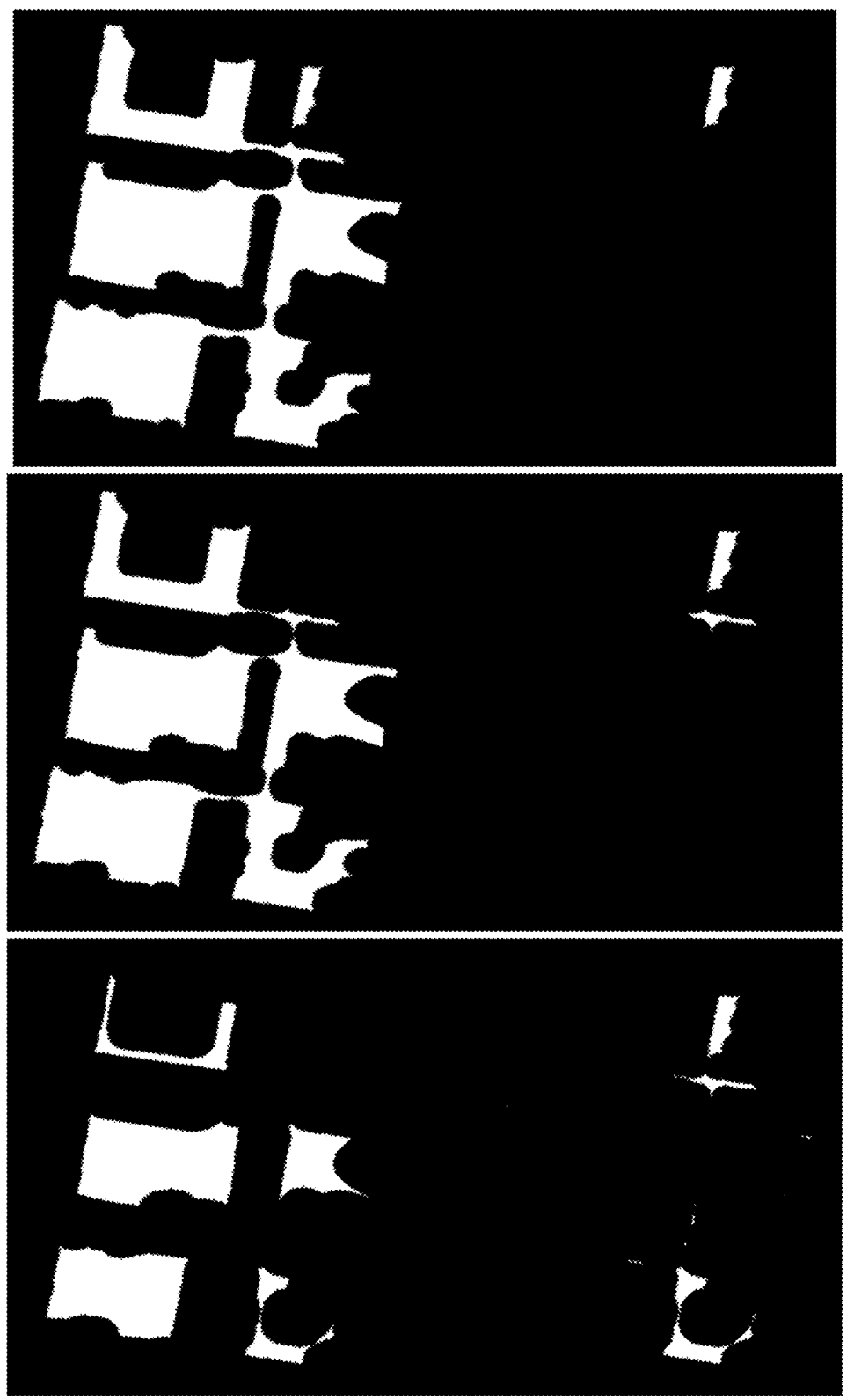
Figure 24O:
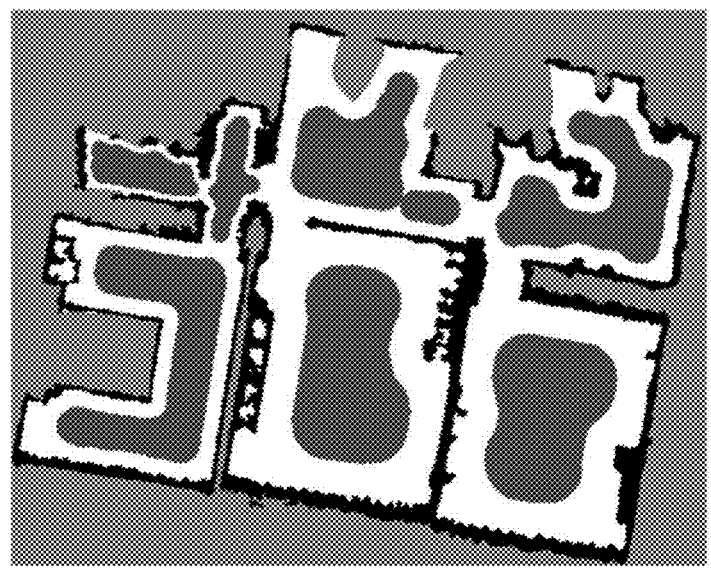
Figure 24N:
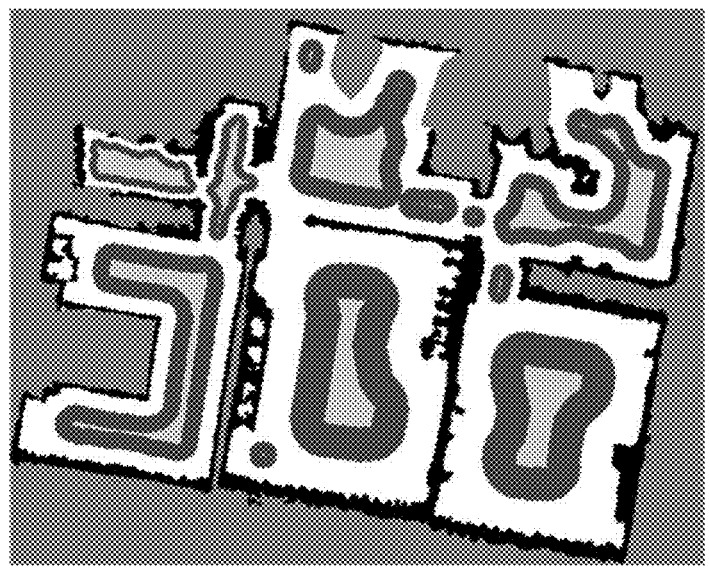
Figure 24M:
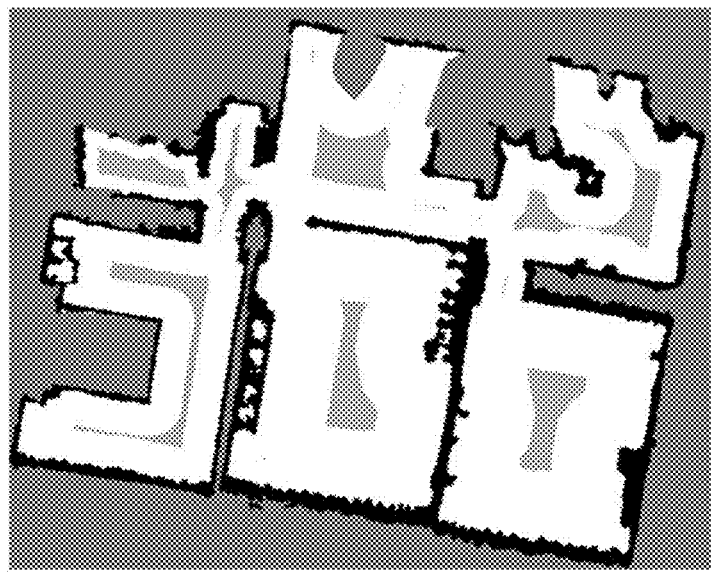

In a step 2307 finding candidate seeds (See FIG. 24K) by binarizing distance with a threshold change from low to high (See FIG. 24L) and finding blobs with size less than 2000; (See FIG. 24M) dilate the blobs; (See FIG. 24N) and remove noise blobs; (See FIG. 24O).

Figure 24P:
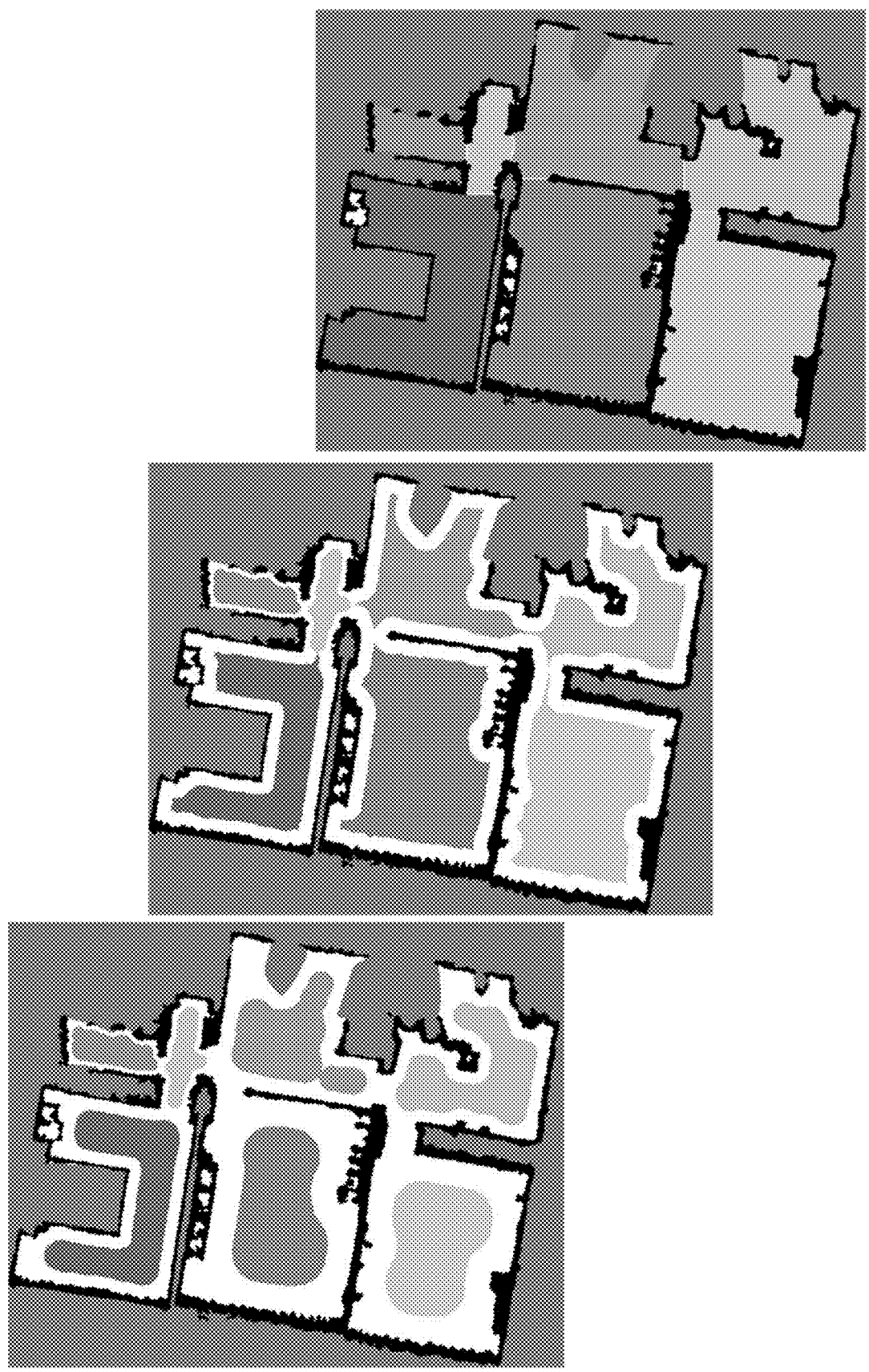

In a step 2308 watersheding blobs until boundaries are encountered; (See FIG. 24P)

In a step 2309 merging smaller rooms; and

In a step 2310 aligning the occupancy map.

Figure 24Q:
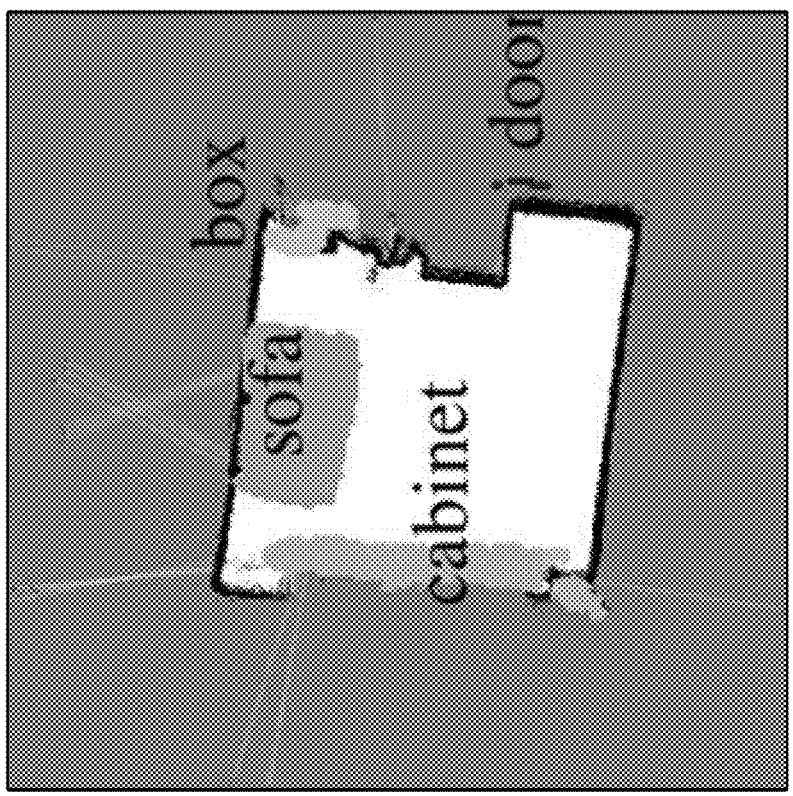

The technology disclosed includes logic to label the occupancy map using machine learning models. For example, FIG. 24Q presents a 2D occupancy map with labels "box," "sofa," "cabinet," and "door" assigned to items classified in a room. In one implementation, the system can compute a bounding box of each instance in the occupancy map. The system can extract wall information from the occupancy map. The system can align the bounding box with the closest wall. A bounding box can be drawn by aligning the bounding box on the map. A similar logic can be applied for 3D maps using meshed models of items in the 3D maps.

Robot Calibration

Figure 25A:
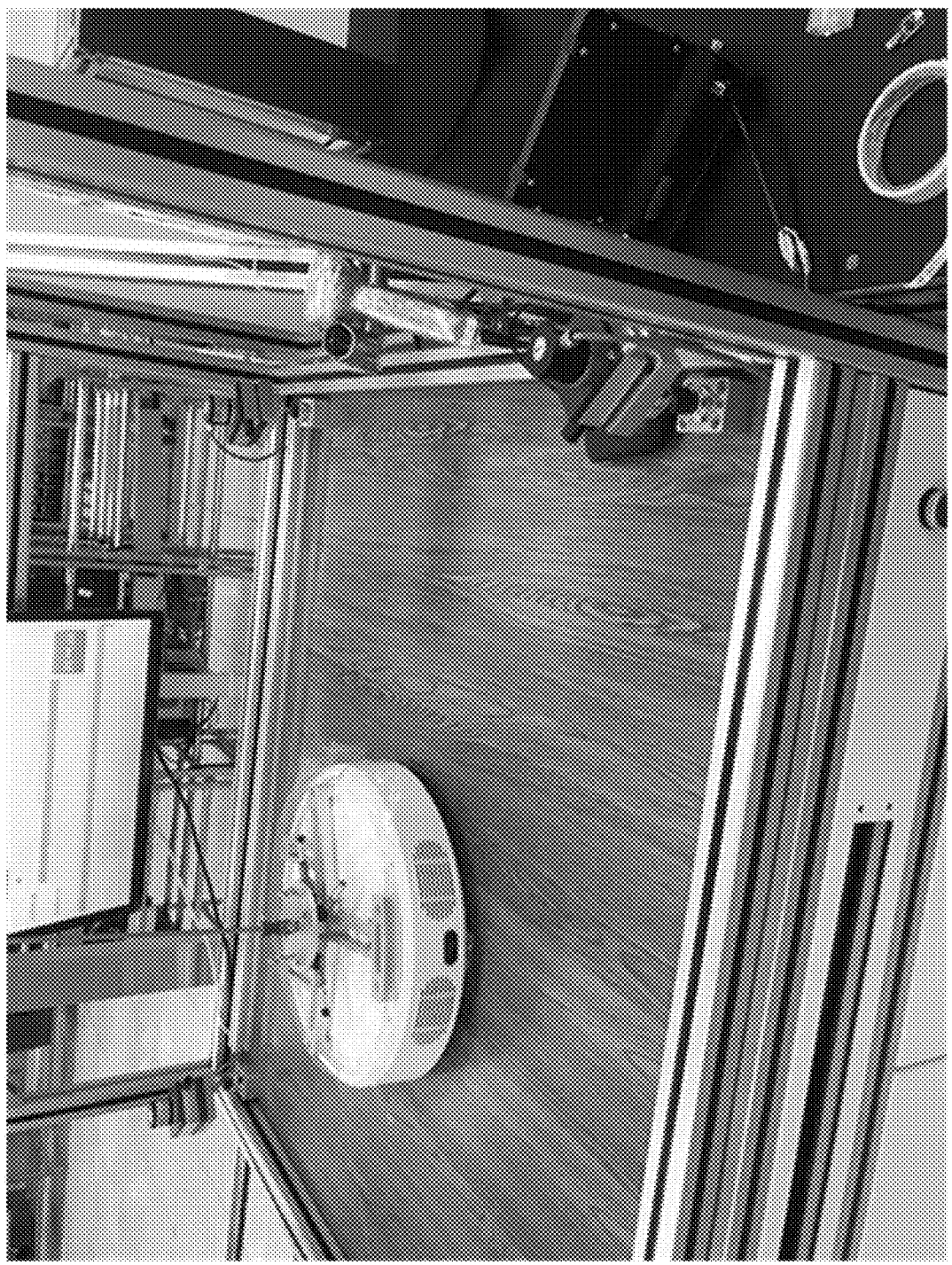
FIGS. 25A, 25B and 25C present examples for calibrating a robot.
Figure 25B:
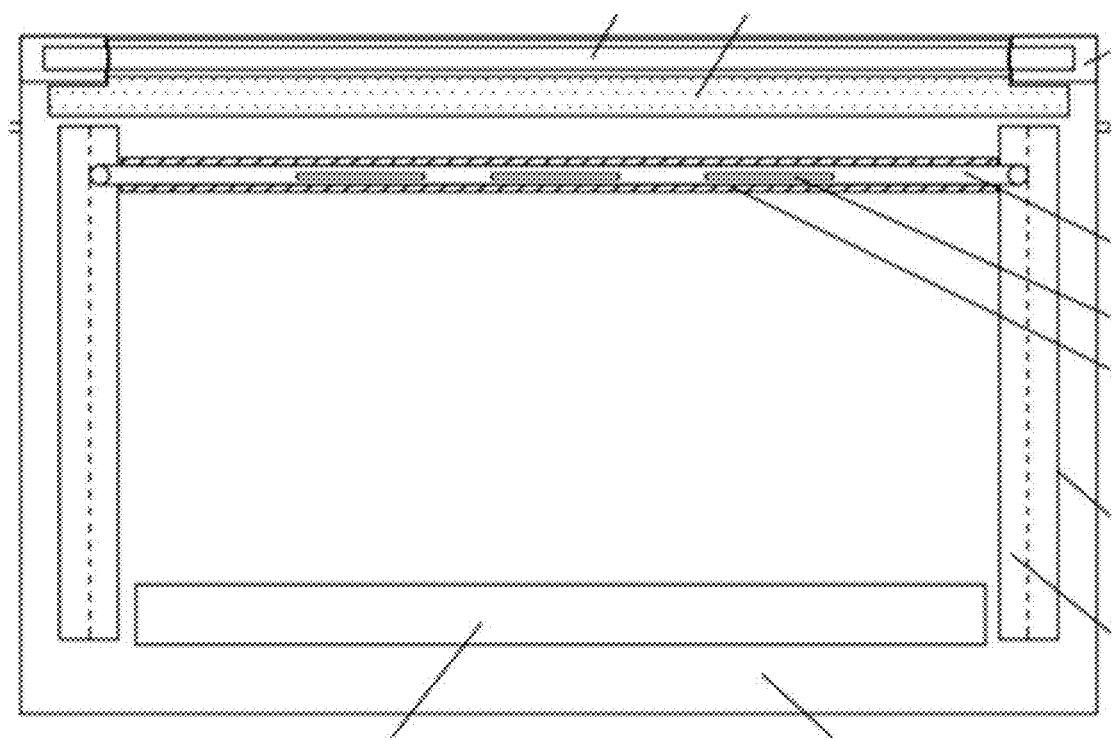

The technology disclosed includes logic to calibrate the robot system before deploying it in an environment. FIGS. 25A and 25B present examples of an environment in which a robot can be calibrated. The technology disclosed includes a method for calibrating an autonomous robot having encoders, an inertial measurement unit (IMU) and one or more cameras. We present the details of calibrating the robot in the following sections.

The method of calibrating the robot includes performing the following steps for each of a plurality of segments, each segment corresponding to a particular motion. The method includes querying, by a processor, for a first data from encoders. The method includes calculating, by a processor, a first reference pose using the first data from encoders. The method includes initiating, by a processor, performance by the robot of a movement, either linear or rotational, while accumulating sensor data. When the movement is complete, the method includes, querying by a processor, for a second data from encoders. The method includes calculating, by a processor, a second reference pose. The method includes storing the first and second reference poses and continuing to a next segment with a different motion until all segments of the plurality of segments are complete. The method includes calculating, by a processor, a set of calibration parameters including a scaling factor for the IMU, a wheel radius and an axle length, (x, y, theta, CPM (count per meter)) of an optical flow sensor (OFS) for odometry. The method includes applying thresholds to the calibration parameters calculated to determine pass or fail of the calibration.

Calculating a scaling factor calibration parameter further includes the following steps:
storing both angle data from encoder and an IMU reading for each segment;
performing 4 rotations and obtaining 4 groups of rotation angles;
wherein the computation of the IMU is 'actual=scaling_factor*reading'; and
$b=Ax \Rightarrow x=(A^TA)^{-1}A^Tb$.

Calculating a wheel radius and an axle length calibration parameter further includes the following steps:
storing angle data from encoder and wheel encoders for each segment;
performing 4 rotations and 3 linear movements and obtaining 7 groups of data;
wherein the constraints for two wheel model is 'right_wheel_distance−left_wheel_distance=axle_length*angle_difference'; and
using Gauss-Newton to compute an optimization result.

Calculating a x, y, theta, CPM calibration parameters further includes the following steps:
storing angle data from encoder, calculated reference pose, and OFS readings for each segment;
performing 4 rotations and 3 linear movements and obtaining 7 groups of data;
wherein the constraints for OFS are simple: 'robot position=OFS reading+OFS offset'; and
using Gauss-Newton to compute an optimization result.

Calculating a reference pose using absolute distance encoder readings further includes the following steps:
assuming all distance readings from encoders are absolute; and
calculating an orientation of the mounting plate as well as center xy position.

Calculating a reference pose using simplified absolute distance encoder readings further includes the following steps:
assuming all distance readings from encoders are absolute;
assuming orientation of the mounting plate is the same as of platform; and
calculating center xy position of mounting plate.

Calculating a reference pose using relative distance encoder readings further includes the following steps:
assuming there is one start point that all distance readings from encoders are zeros, and distance readings from encoders are relative to that point;

assuming orientation of the mounting plate is the same as of platform; and calculating center xy position of mounting plate.

Figure 25C:
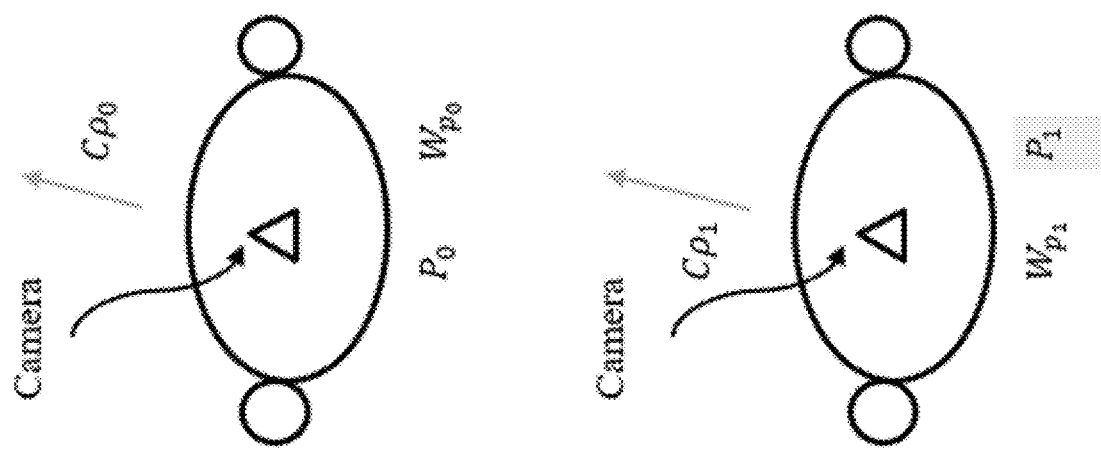

FIG. 25C illustrates a calibration technique for calibrating camera using relative movement of the robot sensed by wheel encoder. In this implementation, a transformation (T) between the Camera and the robot center is determined using a matrix as shown in FIG. 25C. Here relative movement of the robot from a projected point on image at $P_1$ and an observed point at $P_0$ is determined using wheel encoder $W_{p_0}^{-1} * W_{p_1}$ in step (1) and using relative movement of the camera $C_{p_0}^{-1} * C_{p_1}$ in step (2); setting them equal to one another in step (3) and solving for T in steps (4) and (5).

1) By wheel encoder, we know the relative movement of the robot at $$p_0 \text{ and } p_1 = W_{p_0}^{-1} * W_{p_1}$$

2) By camera, we know the relative movement of camera at $$p_0, p_1 = C_{p_0}^{-1} * C_{p_1}$$

3) The relative movement of robot estimate by camera should be the same as wheel's relative movement $$T * C_{p_0}^{-1} * C_{p_1} * T^{-1} = W_{p_0}^{-1} * W_{p_1}$$

$$C_{p_0}^{-1} * C_{p_1} = T^{-1} W_{p_0}^{-1} * W_{p_1} * T$$

$$C_{p_1} = * C_{p_0} * T^{-1} * W_{p_0}^{-1} * W_{p_1} * T$$

4) Here $$C_{p_0} * T^{-1} * W_{p_0}^{-1} * W_{p_1} * T$$

is the camera projection matrix. We represent all 3D points on the pre-define pattern to get the projected point on image at $P_1$ and this should be the same as we observed at $P_0$.

$$T^* = \arg\min \Sigma_{z=1}^m \| f_z^{2d} - \text{Proj}(C_{p_0} * T^{-1} * W_{p_0}^{-1} * W_{p_1} * T, f_i^{3d}) \|^2$$

Where $f_i^{2d}$ is position of the i-th corner point observed on image at $p_1$, $f_i^{3d}$ is the 3D position of that corner point 5) We do have multiple movements, so finally $$T^* = \arg\min_{W_{p_{j-1}}^{-1} * W_{p_j} * T f_{j,i}^{3d}} \Sigma_{j=1}^n \Sigma_{z=1}^m \| f_{j-i}^{2d} - \text{Proj}(C_{p_{j-1}} * T^{-1} * \|^2$$

Where j denotes the j-th frame (stop points)

Cleaning Robot with Auto-Cleaning Tank

Figure 26A:
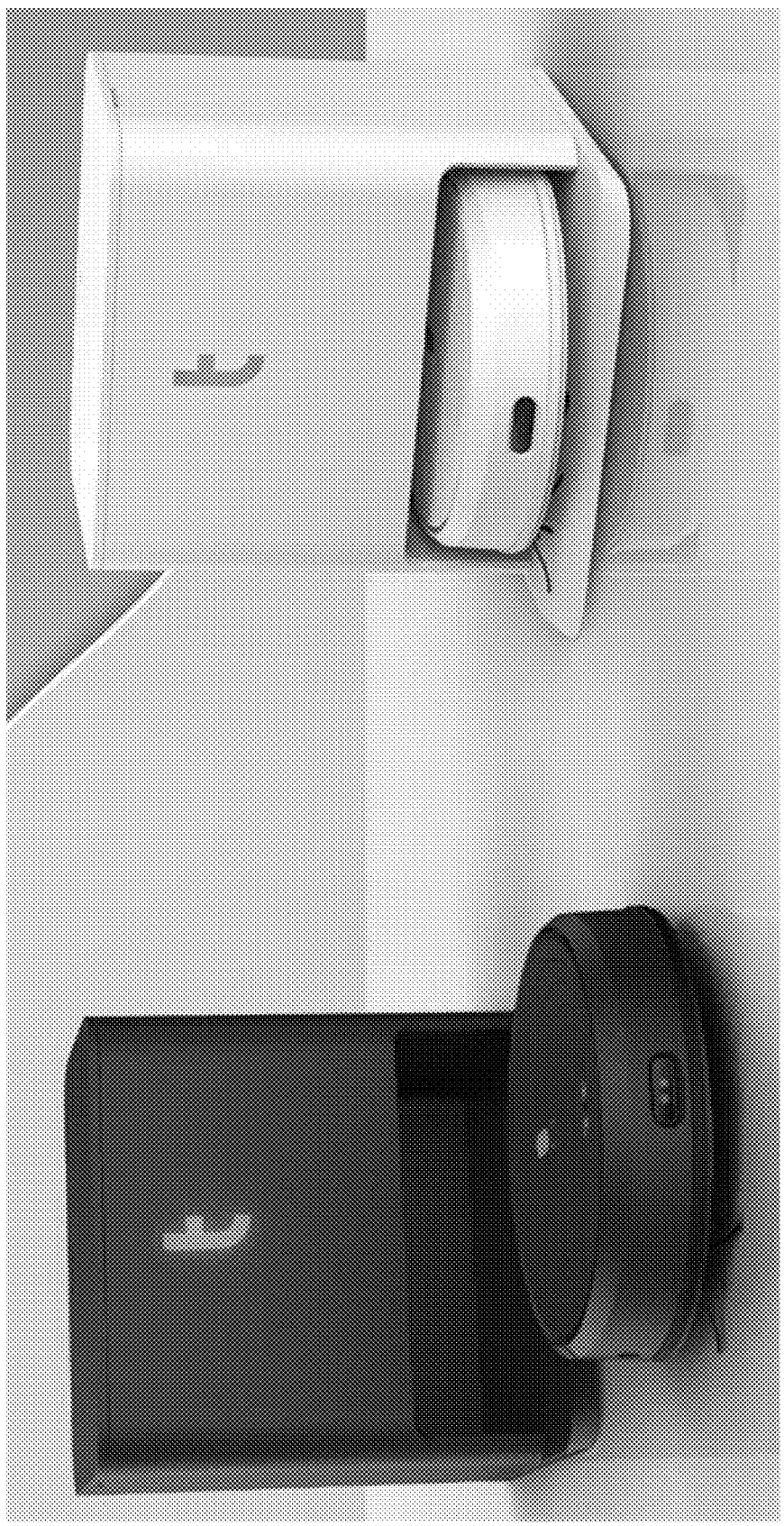
FIGS. 26A and 26B present two example designs for a robot system including a docking station.
Figure 26B:
Figure 27:
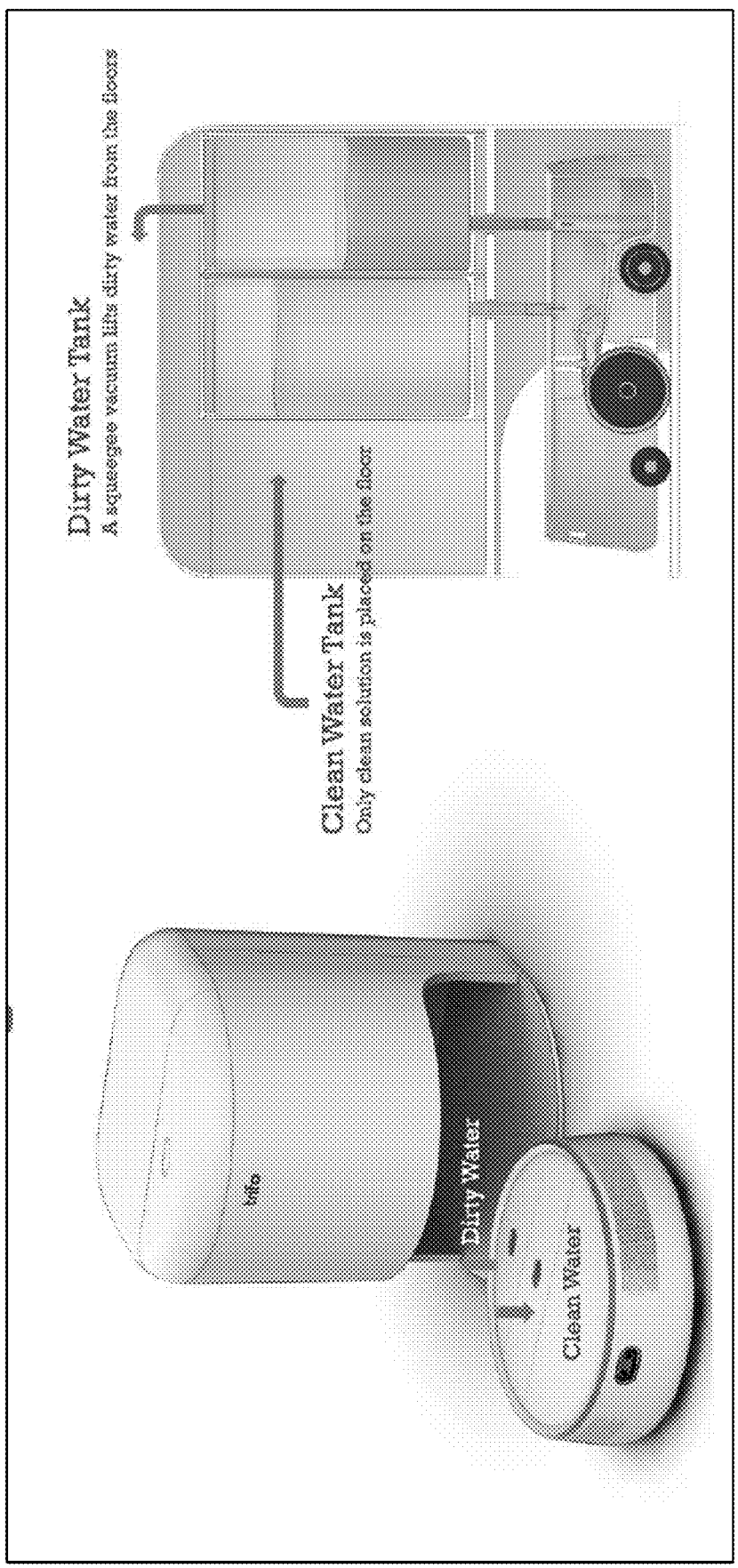
FIG. 27 presents further details of a docking station and a robot system that can be used for cleaning floors.

The technology disclosed includes a robot system that can be used for cleaning floors. The robot system can include a docking station. FIG. 26A presents one example of a robot system with a docking station. FIG. 26B presents another example of a robot system with a docking station. FIG. 27 presents further details of how clean and dirty liquids can be stored in the docking station. The robot can include openings that align to the openings to clean and dirty water tanks in the docking station when the robot is positioned in the docking station. A vacuum mechanism can lift dirty water from the robot.

The docking station comprises an interface configured to couple with a robot and to off-load waste collected and stored by the robot and a robot comprising a mobile platform having disposed thereon a waste storage, at least one visual spectrum-capable camera and an interface to a host. The waste storage is used for accumulating waste collected from floor cleaning. The host can include one or more processors coupled to memory storing computer instructions to perform an area coverage task, according to at least some estimated poses and locations of at least some 3D points that define a map. The map is used to provide an occupancy grid mapping that provides guidance to the mobile platform that includes the camera. The computer instructions, when executed on the processors, implement a method comprising the following actions. The method includes receiving a sensory input from a set of sensors including at least one waste storage full sensor being monitored while performing the area coverage task. The sensory input can indicate a full condition exists with the waste storage of the robot. The method includes obtaining a location of a docking station from an occupancy grid mapping generated using sensory input from the at least one visual spectrum-capable camera. The method includes obtaining a set of waypoints generated. The set of waypoints can include a first waypoint in a path to the location of the docking station. The method includes initiating a motion to move the robot to the first waypoint.

Figure 28:
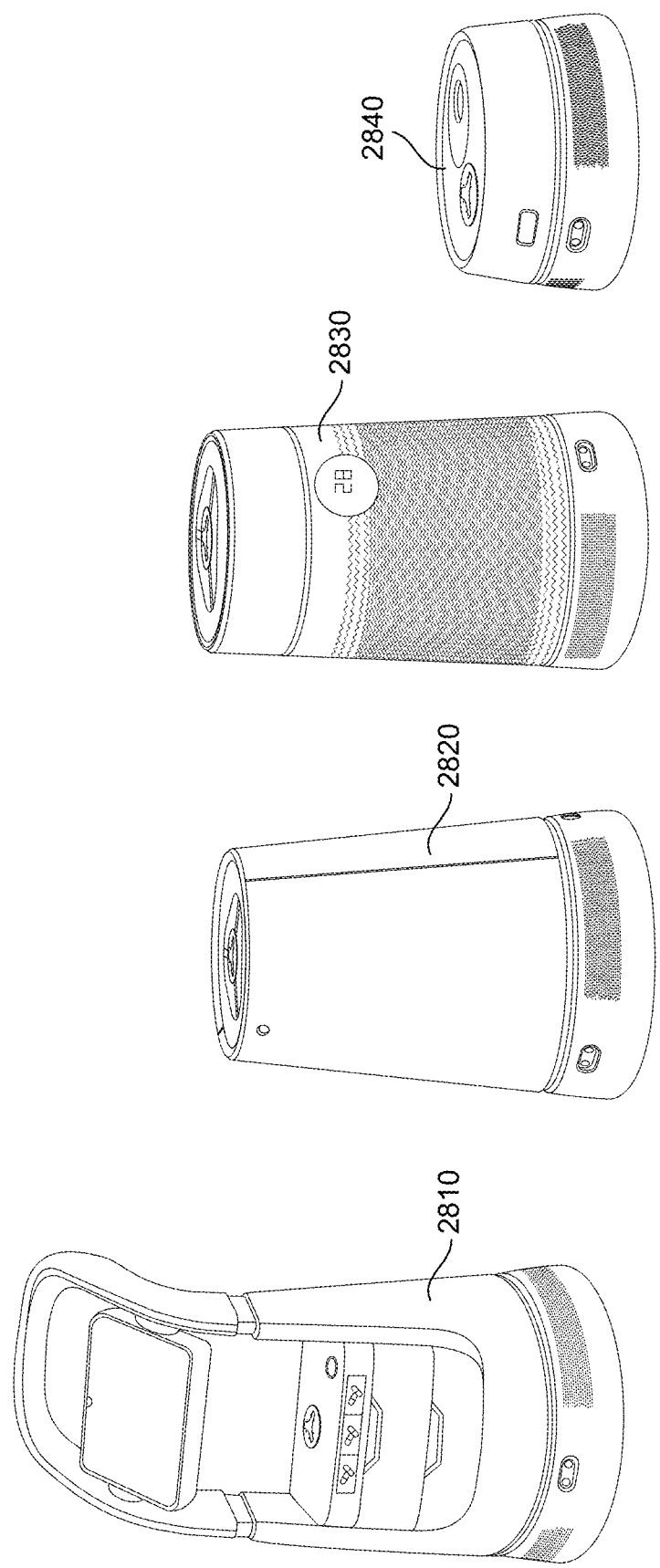
FIG. 28 presents a plurality of configurations for modularized robot implementations.

FIG. 28 presents a plurality of configurations for modularized robot implementations. The modularized components are selected from among an elderly care component 2810, an entertainment component 2820, an environment component 2830 and a pet sitter component 2840. Addition of modularized robot components enable the robot base to be configured as a home care robot 2810, a home entertainment companion 2820, a home environment monitor 2830 and a pet sitter 2840. These configurations will next be described with reference to example implementations. Robot components include hardware such an electronic interface, sensors, and actuators, mechanical, hydraulic, electrical and others. Custom hardware can be included in some components. For example, humidifier hardware, image projection hardware, and the like. In some component implementations, a processor and memory storing executable instructions will be included within the module. In other components, processing is offloaded to host processors (e.g., "in the cloud") via cloud node using wireless network connections. Robot components can be controlled using outputs of select deep neural networks such as the deep neural networks.

Robot Re-Localization

We now describe re-localization functionality of the robot for re-localization on a pre-loaded map of an environment when the robot needs to re-localize itself to resume cleaning from some error states such as hijack, bumper stuck, etc.

Re-Localization Process Flow

Figure 30:
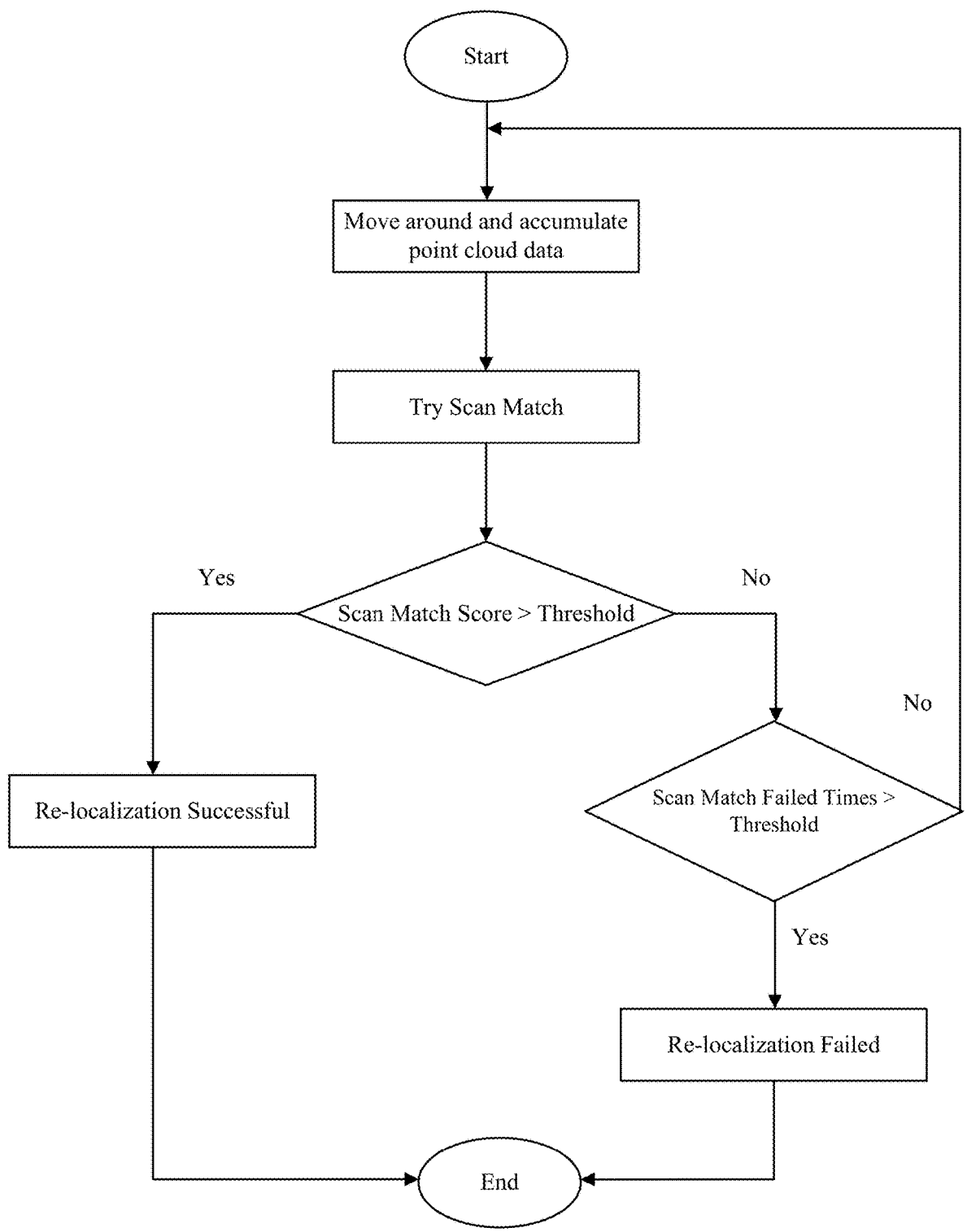
FIG. 30 presents a process flowchart including process steps for re-localization of a robot.

When the robot starts re-localization process, it navigates in the environment and accumulates point cloud as a local map. The re-localization logic tries to match the local map with the global map based on a "scan matching" algorithm. If the "scan matching" algorithm returns a score higher than the threshold, the re-localization is successful. Otherwise, the robot tries to accumulate more point cloud data in the local map and initiates "scan matching" algorithm again using all accumulated point clouds so far. The system can repeat this process until a good scan matching result is found or the re-localization fails after several tries of scan matching returning a low score. FIG. 30 presents a process flowchart with high-level process steps of re-localization process. The process flowchart presents the re-localization process steps described above.

Robot Perception Design—Barrier Range Detection

We now describe image processing for perception of the robot especially for barrier range detection of the robot.

Barrier range discretizes the field of view of the camera on the robot into angular bins. This data is useful for generating occupancy grid map by including the barrier information in the map.

Figure 31A:
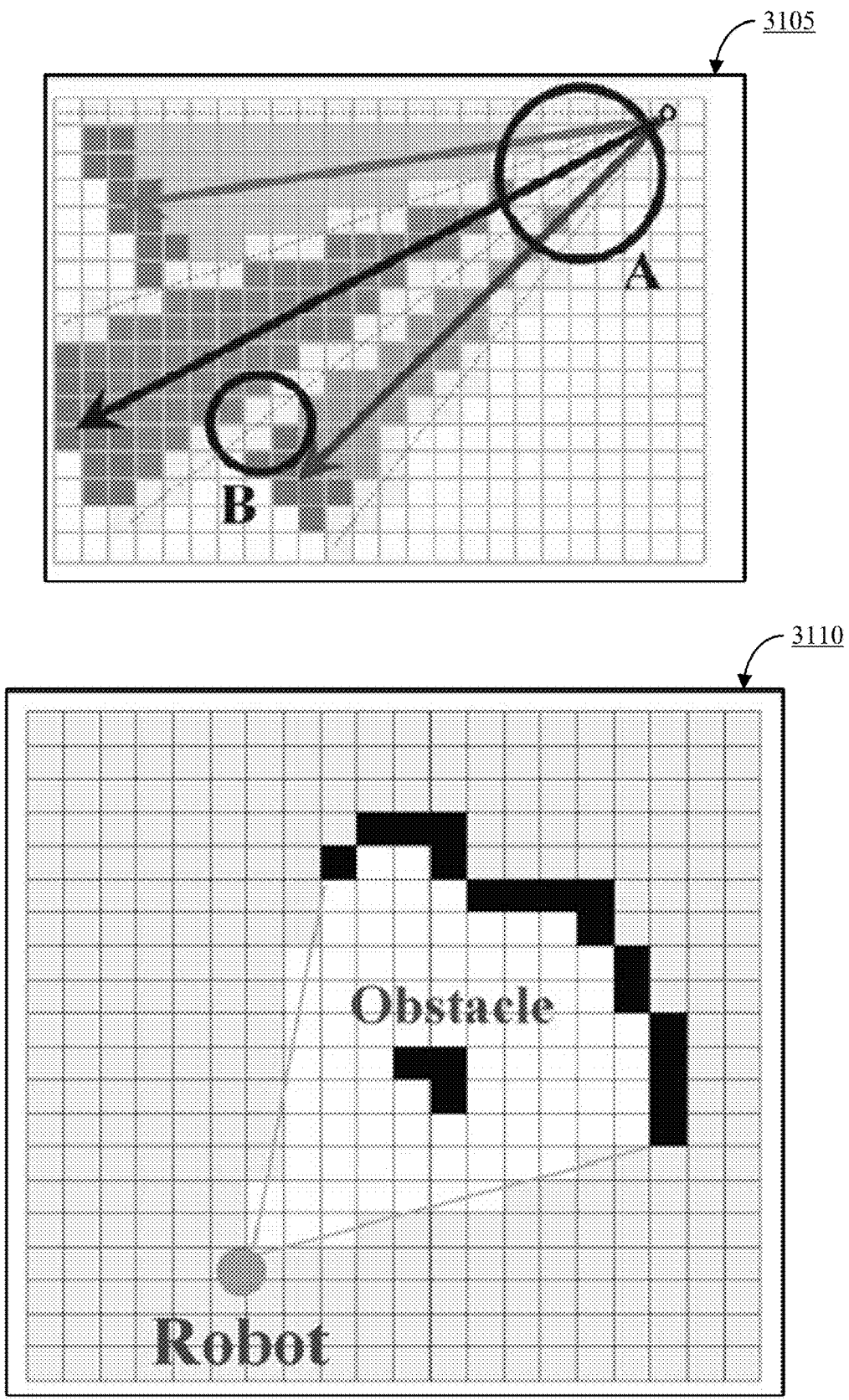
FIG. 31A presents illustrations related to barrier range detection by a robot.

FIG. 31A presents examples 3105 and 3110 of barrier detection. The illustration 3105 shows the FOV discretized into three bins. The illustration 3110 shows an obstacle in one discrete bin of the FOV. The system can detect barrier range of an item from PCD, deep learning models and dock detection logic. The system can contain logic to generate a number of bins of the FOV and each bin contains barrier information along the trajectory of the robot. The technology disclosed can increase occupied probability for an image pixel where the current "barrier range item" has obstacle. The system includes logic to increase probability for obstacle label at each grid cell in the map. The system includes logic to decrease occupied probability where the current "barrier range item" has no obstacle. The system includes logic occupied probability to determine occurrence of the obstacles. The system includes logic to record obstacle labels that can determine obstacle type.

Figure 31B:
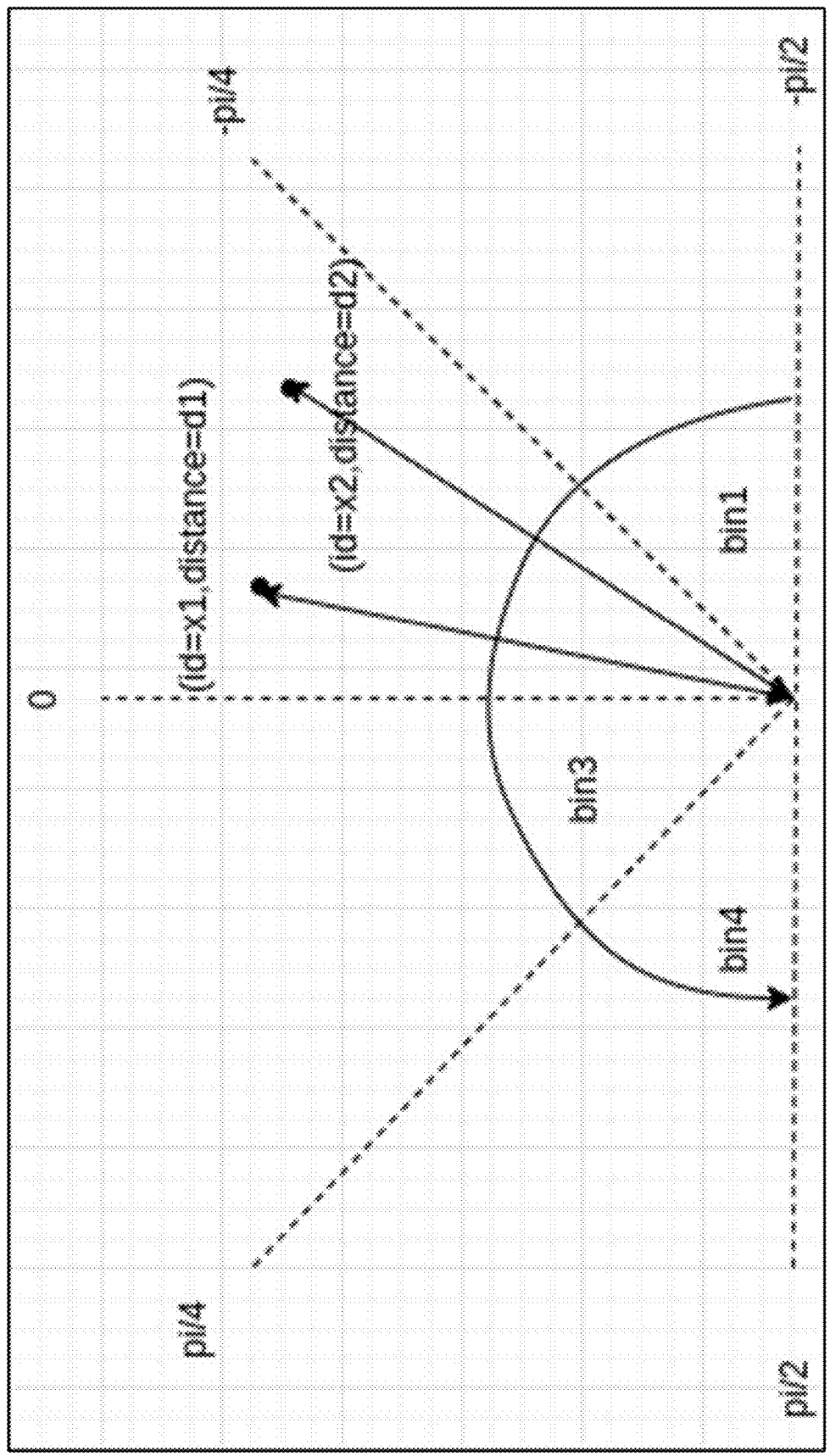
FIG. 31B presents discretization of field of view of a camera into bins for barrier range detection.

FIG. 31B shows discretization of the field of view of a robot into a plurality of bins. The system can include a BarrierRange data structure that store discretized FOV of the robot into angular bins from −pi/2 to pi/2 and stores barrier information in each of those bins. Distance can be calculated by sqrt(x^2+y^y2) without considering the height. A height filter (such as 3 cm to 9 cm range) can be applied at the beginning. Each element of barriers is a vector of barrier information in a particular angular bin. Each angular bin has a series of (barrier id, distance) pairs, where distance is the distance to the robot from the barrier. They are in no particular order. In FIG. 31B, we can see the top view of the robot in 2D, with 0 radians pointing to the robot heading direction. There are 2 barrier points marked in bin2 as an illustration. This data is useful for the occupancy grid map when this barrier information in the robot coordinate frame is transformed to the global map. This information about an obstacle can be aggregated over multiple views to be used for planning.

Coordinate System

The z-axis points upward, parallel to gravity. The heading direction of the robot can be along x-axis and y-axis can be assumed normal to the movement of the robot.

Barrier Detection Process

Figure 31C:
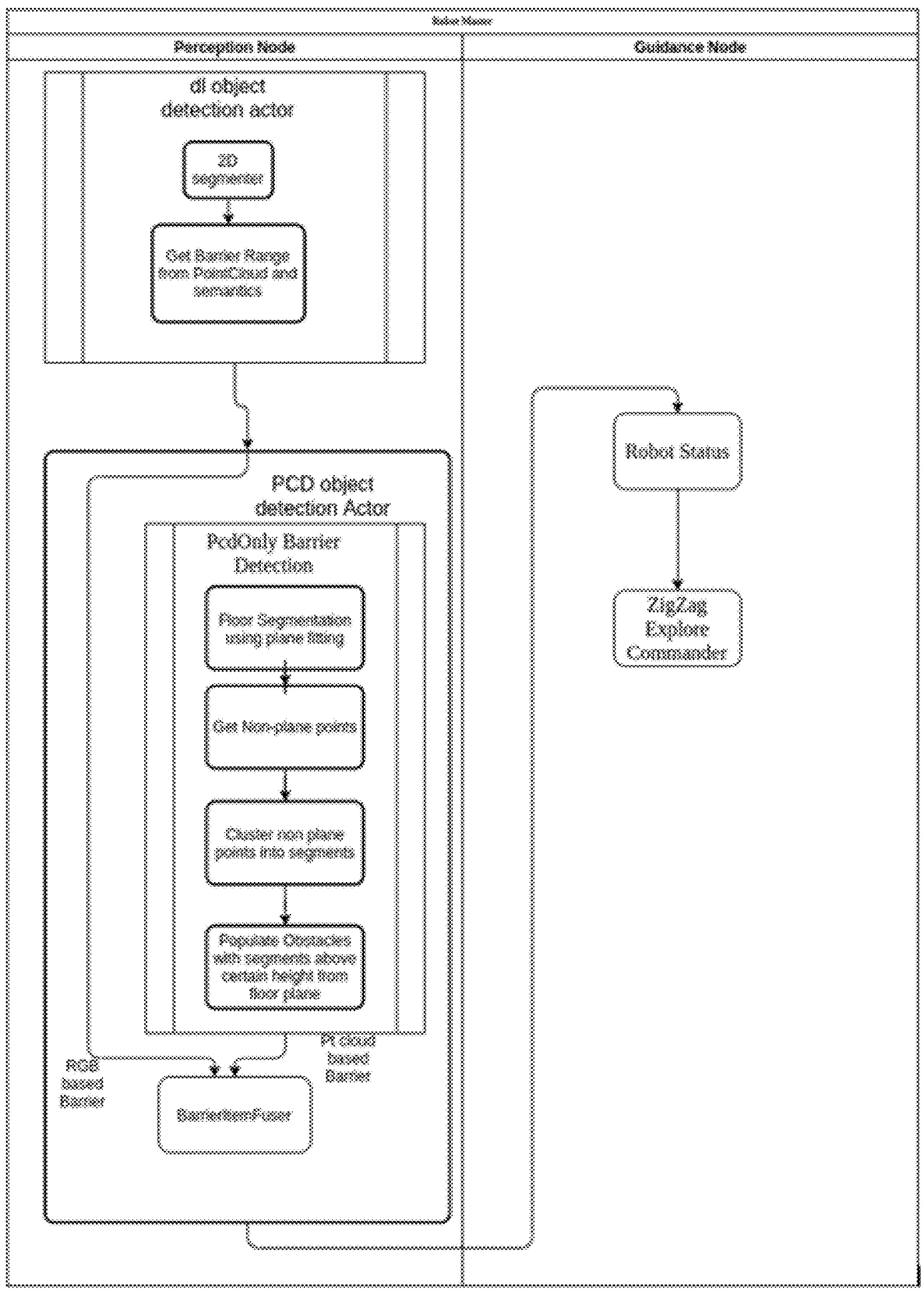
FIG. 31C presents a flowchart of example process steps for barrier range detection.

FIG. 31C presents a process flowchart for barrier detection process. The process includes operations carried out by two compute modules labeled as "perception node" and "guidance node". The perception node can implement logic to perform the following operations:
1) Read calibration data
2) Initiate Pointcloud Preprocessor
3) Barrier item fusion selection
4) Initiate Object detection Actor
   a) pcd_object_detection_actor_.start( )
   b) dl_object_detection_actor_.start( ) dl_object_detection_actor_.RegisterRGBBarrierCallback (a callback that calls pcd_object_detection)
   c) dock_detection_actor_.start( )

The process further includes two components labeled as, "DL object detection actor," and "PCD object detection actor".

The "DL Object Detection Actor" component includes logic to run the Deeplab model for segmentation and pick out the xyz coordinates of the obstacle classes such as socks, shoes, etc. These xyz coordinates are turned into the BarrierRange data structure and passed onto the "PcdObjectDetectionActor" through the rgb_barrier_callback API.

The "PCD Object Detection Actor" component includes logic to perform at least two tasks presented below.

The first task is performed by "ExecutePcdObjectDetectionActor" component. This component performs a point-cloud based barrier detection. This component includes logic to build a 2D grid on the floor map. It performs minimum to maximum (or min to max) checks for range and height. Then it creates a barrier range data structure for the cells that are occupied in the grid and could be barriers. These points remaining in the point cloud are passed as output for further processing. Then, using the points remaining from the previous step, it fits a floor plane and finds all other points above a specified height as obstacles in 3D. As shown in FIG. 31C, the "PCDOnly Barrier Detection" component includes logic to perform floor segmentation using plane fitting. The component then receives non-plane points and clusters non-plane points into segments. The component includes logic to populate obstacles with segments above certain height the floor plane as described above. The output from the "PCDOnly Barrier Detection" component and RGB based barrier data is sent to "BarrierItemFuser" component.

The second task is performed by "BarrierItemFuser" component. This component includes logic to aggregate barrier items detected from RGB image, point cloud and docker. The component includes logic to adjust the barrier item to current time and populate a common BarrierDepthItem data structure based on BarrierRange. The component includes logic to publish the BarrierDepthItem for guidance and planning.

The output from "BarrierItemFuser" component is sent to "Guidance Node" component which includes logic to determine "robot status" and invokes "Zigzag Explore Commander" component.

Map Merging

Figure 32A:
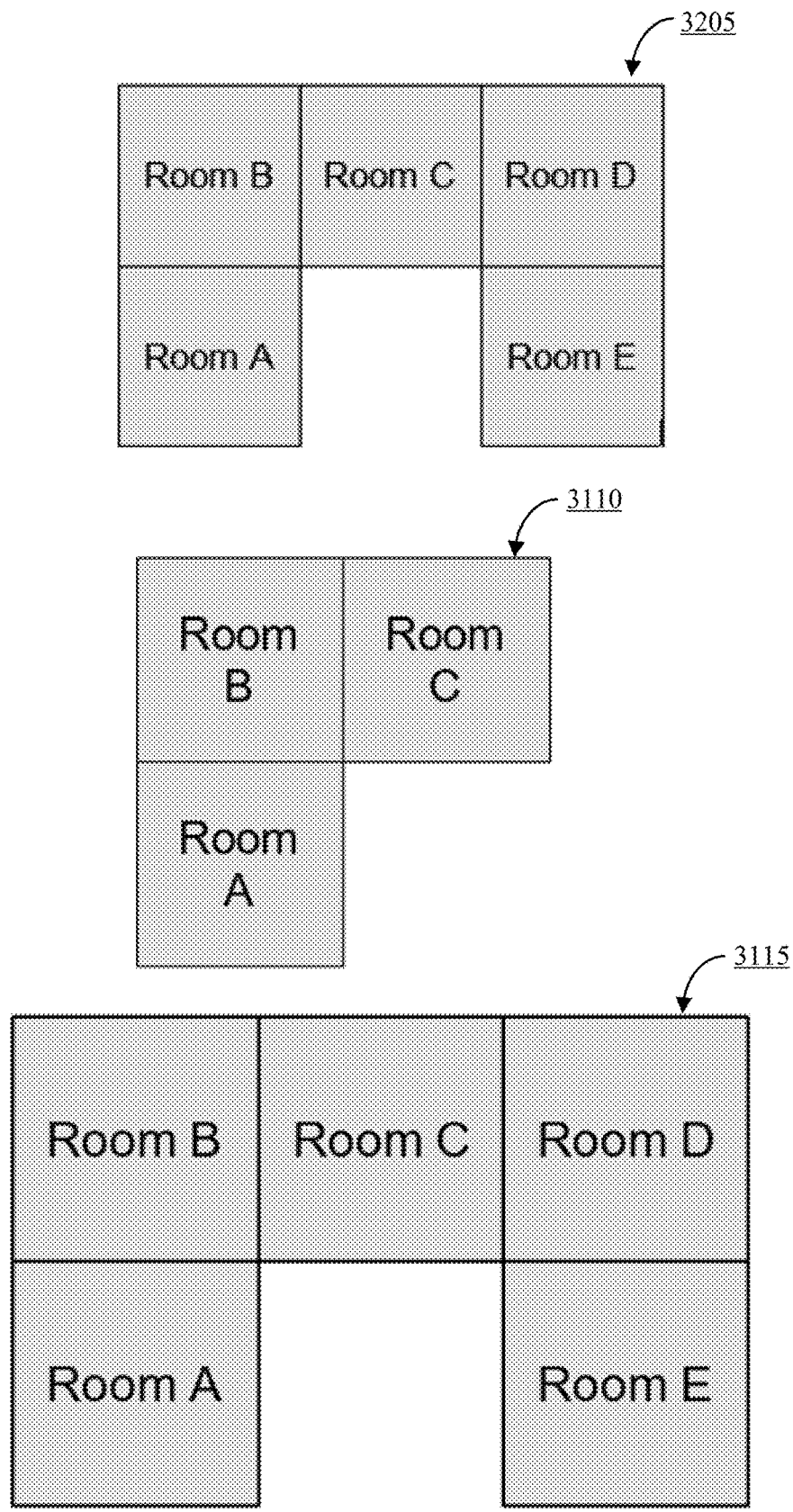
FIGS. 32A and 32B present examples of map merging feature.
Figure 32B:
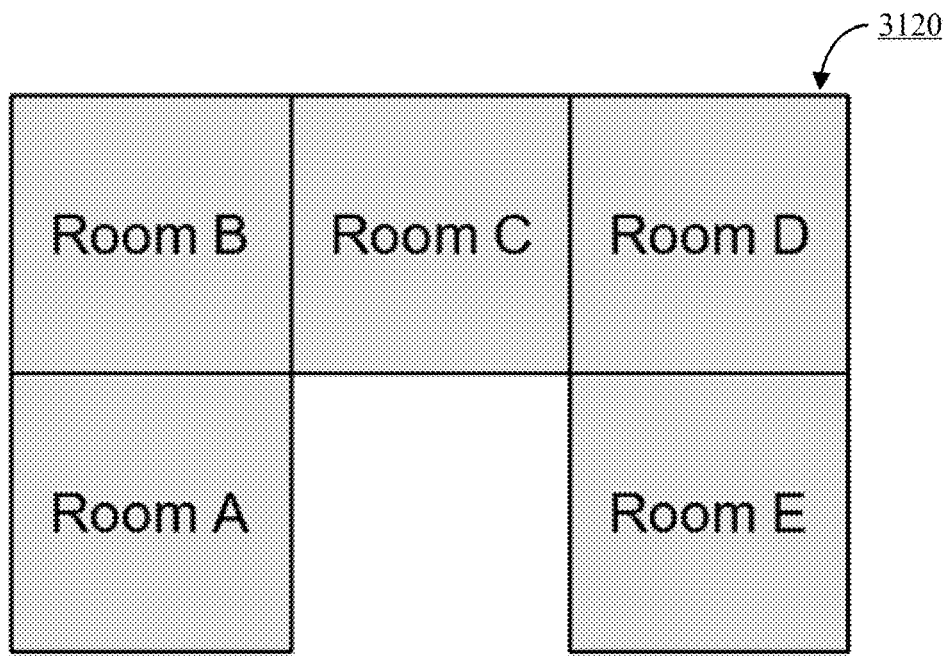
Figure 32B:
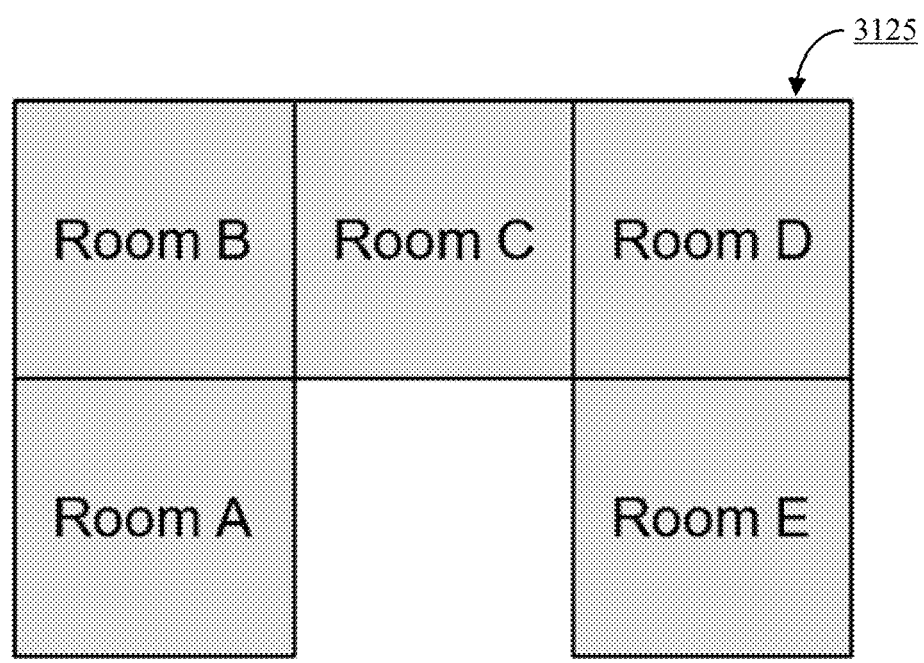

FIGS. 32A and 32B present examples of map merging feature of the technology disclosed. The system includes logic to automatically save maps across multiple times of cleaning or other tasks performed by the robot. The system can maintain the updated information of the environment by merging the old map and the new map of the environment. An example map 3205 in FIG. 32A presents a map with five rooms labeled as room A, room B, room C, room D, and room E. FIG. 32A presents a first example of map merging in which the robot finishes cleaning and covers a larger area than the loaded map. For example, the robot loaded the map with three rooms (room A, room B, room C) as shown by an illustration 3110 in FIG. 32A. The robot then cleans five rooms (room A, room B, room C, room D, room E), the saved map will cover all five rooms as shown in illustration 3115 in FIG. 32A.

FIG. 32B presents a second example of map merging in which robot finishes cleaning and covers a smaller area than the loaded map. The robot loaded the map with five rooms (room A, room B, room C, room D, room E) as shown in illustration 3120 in FIG. 32B. The robot then cleans and covers only three rooms (room A, room B, room C), the saved map will cover all five rooms as shown in the illustration 3125 in FIG. 32B.

In a third example of map merging, the robot finishes cleaning and covers the same area as the loaded map, the saved map will save all the areas with five rooms.

Multi-Task Inference on Robot

As part of robot's perception, a segmentation model running on the robot partitions the image captured by the at least one visual-spectrum capable camera into different segments such as shoe, sock, wire, floor etc. These segments are further processed in combination with the point-cloud to produce obstacles in 3D that the robot avoids.

In addition to segmentation, other inference tasks can also be performed. For example, classification of scenes containing wires can be useful as additional information for robot. Classification might be easier than pinpointing the pixels where the wire is present in the scene. Labeling images is also quicker than segments. So, given a higher number of training examples of wire classification, with sufficient network capacity the classifier can be more reliable. The classification requires more post-processing than segmentation, but it can still be made useful by taking advantage of greater data. There are other inference tasks such as obstacle distance regression which can be useful when the depth frames do not arrive on time.

These inference tasks depend on efficient computation on the embedded computer. One way to enable all these tasks without an increase in compute and memory load would be to share feature computation. This means, we branch out of our backbone machine learning model to add a few convolutions to produce a classification. With some extra flops, the system can gain additional understanding of the scene.

Training multiple tasks can be challenging because of task competition instead of cooperation. However, for closely related tasks such as performed by the robot, this training may not hamper overall accuracy especially if the backbone machine learning model is frozen in weights.

Wire Classifier—Machine Learning Model

Figure 33:
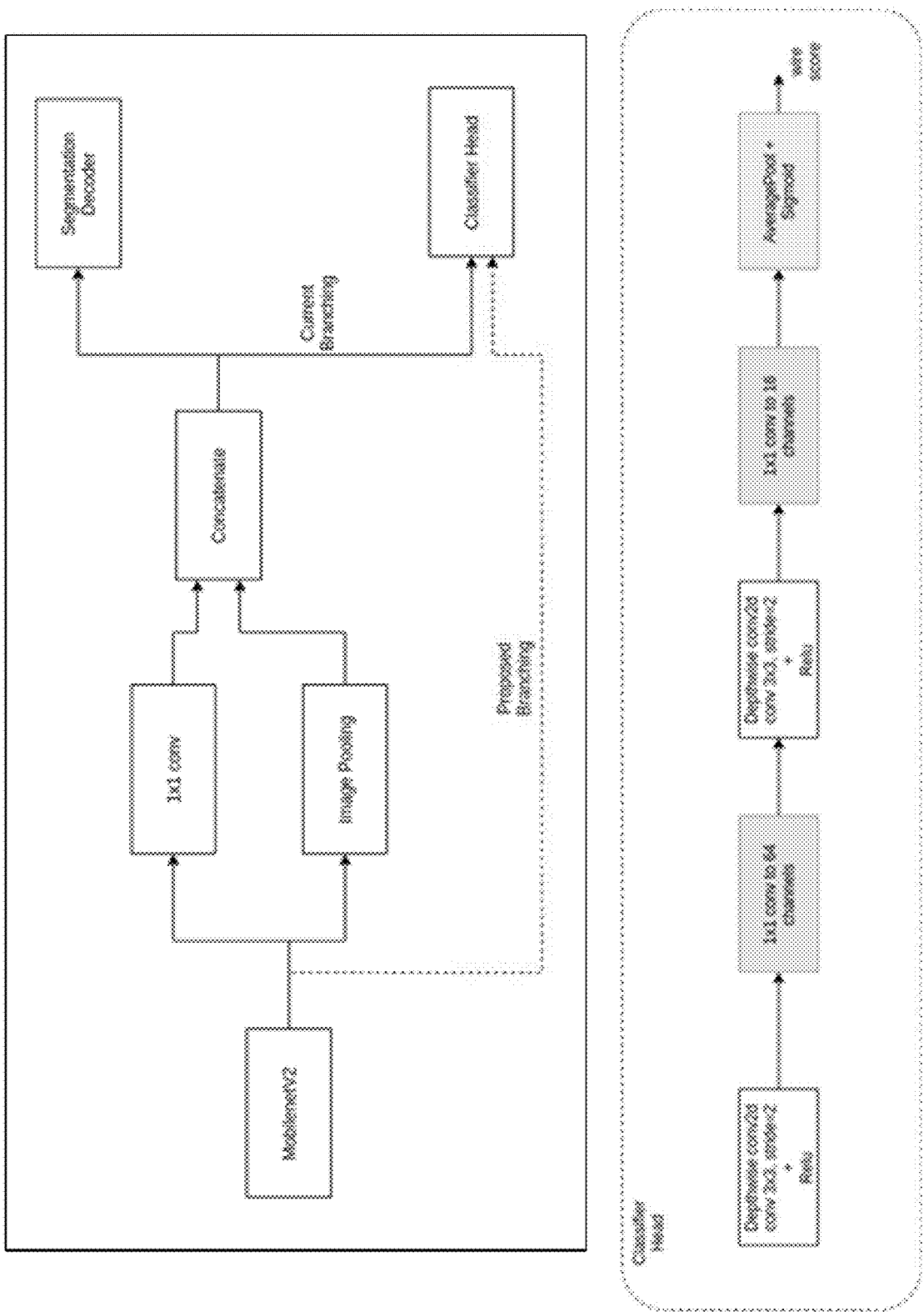
FIG. 33 presents an example architecture of branching of a machine learning classifier.

FIG. 33 provides the branching of the classifier from the backbone of the Deeplab segmentation. Without freezing the backbone, the wire classification accuracy obtained is 88.2%.

The current prototype model uses the extract_features( ) part of Deeplab model.py. The feature tensor size is 41×41× 256 which is obtained after the ASPP module. In other implementations, the node named MobilenetV2/expanded_conv_16/output can be a better choice for branching in terms of compute because it comes before the ASPP module.

Training Data

Every training record example has an image name associated with it. Our ground truth is labeled "1" if wire is present in it, and is labeled "0" if it is not. This captures the case that the wire is present as an obstacle on the floor.

Figure 34A:
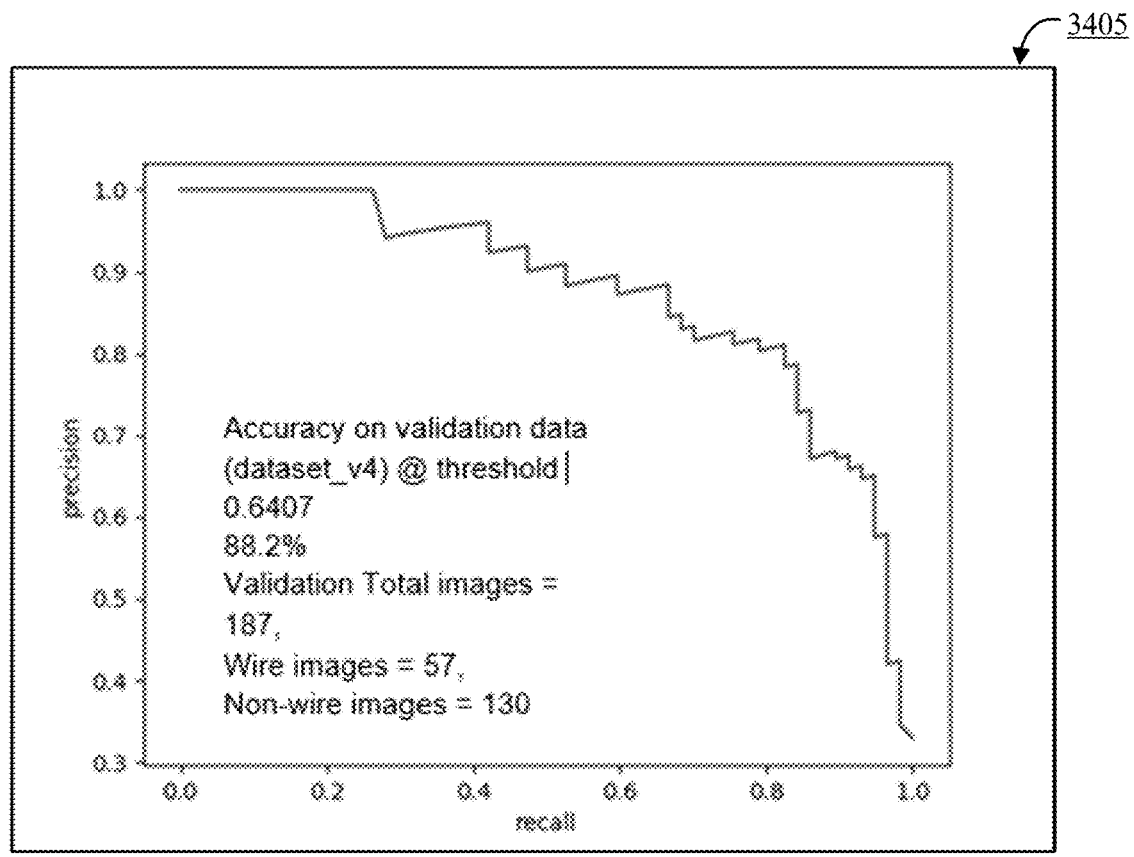
FIGS. 34A and 34B present validation results for machine learning classifiers for wire classification.
Figure 34A:
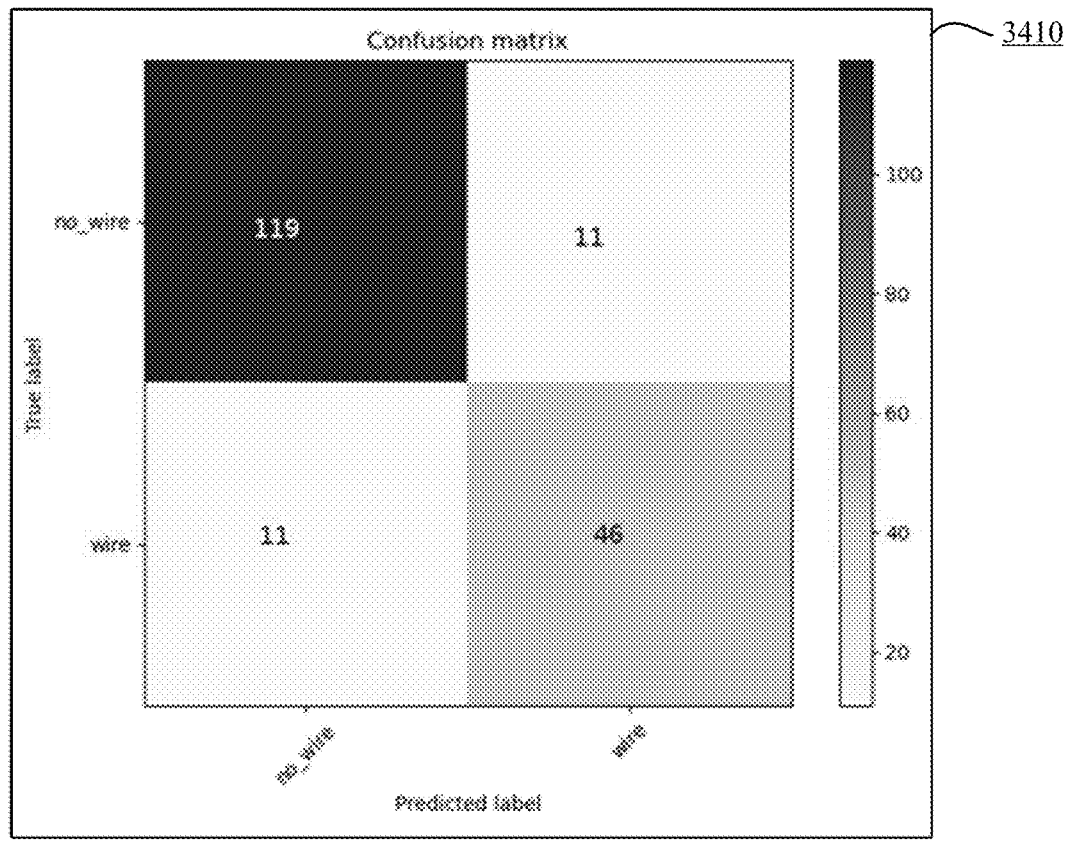

FIG. 34A presents the predicted score's precision and recall (or PR) curve 3405. We selected a threshold of 0.6407 on the wire score that has precision approximately equal recall at around 0.8. We could also pick a lower threshold so that we have very high recall where we miss no wire predictions. This can be a tunable parameter in the model.

If the wire classifier predicts there is a wire in the scene, then it can be used to select a threshold for the output of the segmentation. Currently, we use an arg max of all the predicted probabilities at every pixel to obtain the segment label at the pixel. But, given that there is a wire on the floor somewhere, we could drop the threshold for per pixel wire probability and use this instead of a pure arg max. A confusion matrix 3410 presents comparison of true and false detections of wire by the model on a validation data set.

Figure 34B:
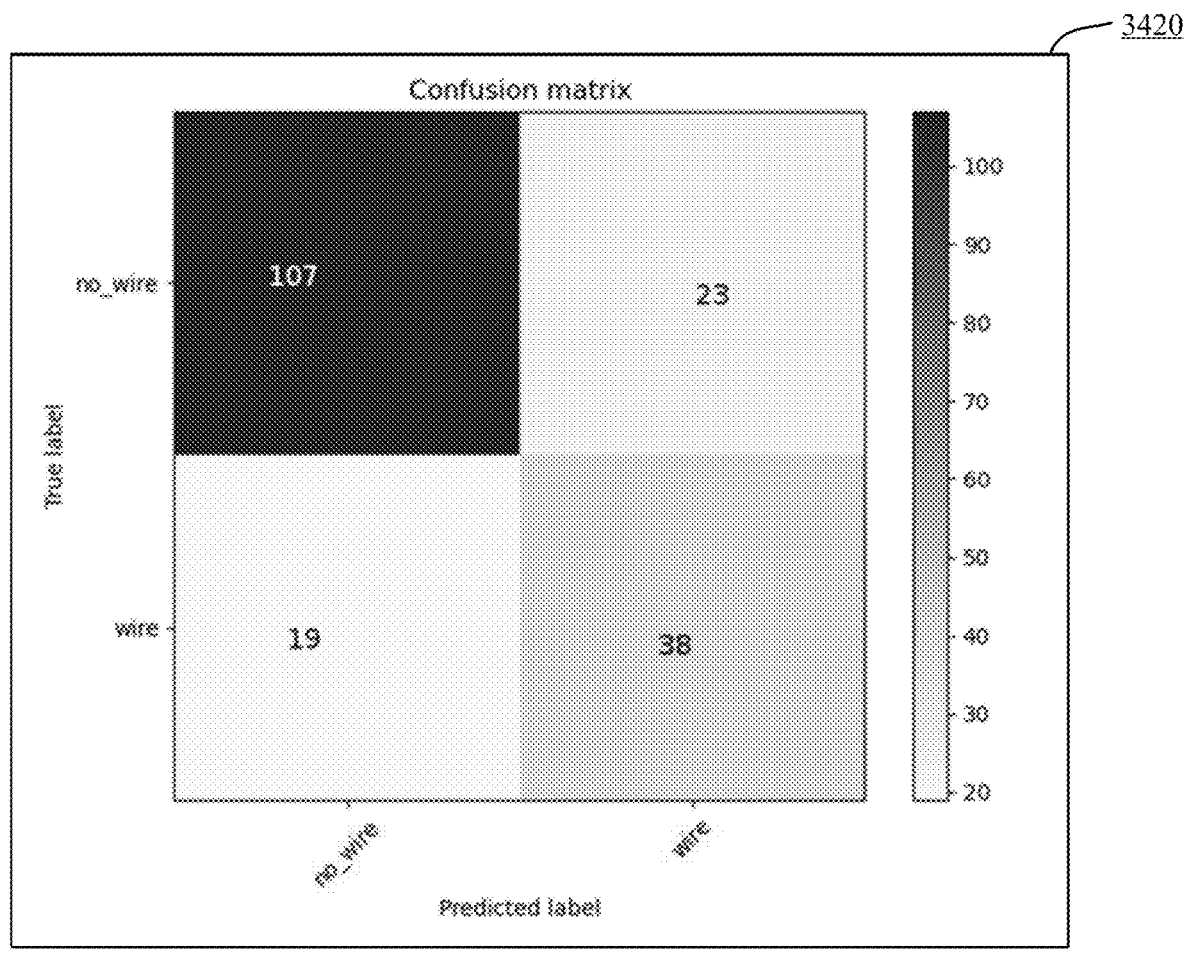

In other experiments we can modify vis.py to run both inference for classification and segmentation at the same time. We can also separate feature extraction tflite from the decoder tflite. FIG. 34B present results 3420 with tflite conversion for the new model with frozen backbone model. The model includes two extra convolutional layers for classification task. We ran the evaluation on the validation dataset accuracy drops to 77%.

Robot Stuck Detection

Technology disclosed includes logic to detect when robot gets stuck in the environment. Once robot is detected as stuck, the system includes logic to help the robot overcome the obstacle. There can be various scenarios in which the robot can get stuck. For example, (i) a robot can get stuck in a narrow space, e.g., a gap between a carpet and a wall, under a chair, etc. or (ii) a robot can get stuck with wheel slip, e.g., on cable duct, at the edge of a carpet, etc.

For the first example, when the robot gets stuck in a narrow space, the system can detect using pose and bumper history. In some cases, the system can also use command history to detect such scenario.

For the second example, when the robot gets stuck with a wheel slip, the system can detect by estimating the robot's pose from the point cloud and compare with the odometry pose to see if wheel slip happened.

The system can also guide the robot get out of the above two situations and move forward. For the first example, the system can make the robot to follow the wall. For the second example, the system can make the robot to move backward.

The stuck detection logic can access a "point cloud stuck detector" component. The input to the "point cloud stuck detector" component can include "point cloud" and "odometry poses". The output from the "point cloud stuck detector" component can include an "emit stuck signal".

The stuck detection logic can access a "pose stuck detector" component. The input to the "pose stuck detector" component can include "odometry poses", and "bumper and infrared or IR signals". The output from the "pose stuck detector" component can include an "emit stuck signal".

When the path planning module receives the stuck signal, it attempts to escape with the corresponding escape motion. After finishing the escape motion, the robot can resume its task such as cleaning, etc. The system can re-enter the escape motion when a new stuck signal is received.

Clauses

Other implementations can include one or more of the following:

Robot System Using Deep Learning Models to Avoid Objects

The technology disclosed includes systems and methods for a mobile platform such as a robot system that includes one or more deep learning models to avoid objects in an environment. The method includes using a deep learning trained classifier, deployed in a robot system, to detect obstacles and avoid obstructions in an environment in which a robot moves based upon image information. The image information is captured by at least one visual spectrum-capable camera that captures images in a visual spectrum (RGB) range and at least one depth measuring camera. The method can include receiving image information captured by the at least one visual spectrum-capable camera. The method can include receiving an object location information including depth information for the object captured by the at least one depth measuring camera. The visual spectrum-capable camera and the depth measuring camera can be located on the mobile platform. The method can include extracting features in the environment from the image information by a processor. The method can include determining an identity for objects corresponding to the features as extracted from the images. The method can include determining an occupancy map of the environment using the ensemble of trained neural network classifiers. The method can include providing the occupancy map to a process for initiating robot movement to avoid objects in the occupancy map of the environment.

The depth camera is tightly coupled with the at least one visual spectrum-capable camera by (i) an overlapping of fields of view; (ii) a calibration of pixels per unit area of field of view; and (iii) a synchronous capture of images. The tight coupling between the depth camera and the visual spectrum camera enables locations and features of objects to correspond to one another in sets of images captured by the cameras.

The calibration of pixels per unit area of field of view of the at least one visual spectrum-capable camera and the depth camera can be one-to-one or 1:1. This means that one pixel in the image captured by the at least one visual spectrum-capable camera maps to at least one pixel in the image captured by the depth camera in a corresponding image capturing cycle.

The calibration of pixels per unit area of field of view of the at least one visual spectrum-capable camera and the depth camera is sixteen-to-one or 16:1. This means that sixteen pixels in the image captured by the at least one visual spectrum-capable camera maps to at least one pixel in the image captured by the depth camera in a corresponding image capturing cycle.

The calibration of pixels per unit area of field of view of the at least one visual spectrum-capable camera and the depth camera is twenty-four-to-one or 24:1. This means that twenty-four pixels in the image captured by the at least one visual spectrum-capable camera maps to at least one pixel in the image captured by the depth camera in a corresponding image capturing cycle. It is understood that other mappings of image pixels in images captured by visual spectrum-capable camera to image pixels in images captured by depth camera are possible such as 4:1, 9:1, 20:1, 25:1, 30:1 or more.

The field of view (or FOV) of the at least one visual spectrum-capable camera can be 1920×1080 pixels. It is understood that images of other sizes less than 1920×1080 pixels and greater than 1920×1080 pixels can be captured by the visual spectrum-capable camera. Example FOV values for the visual spectrum-capable camera are 640×480 pixels, 1280×720 pixels, 2560×1440 pixels, or even higher resolution values. The field of view (or FOV) of depth camera is 224×172 pixels. Images of sizes less than 224×172 pixels and greater than 224×172 pixels can be captured by the depth camera. Example FOV values for the depth camera are 200×100 pixels, 300×150 pixels, 400×200 pixels.

The field of view (FOV) of the depth camera can be within a range of −20 degrees and +20 degrees about a principal axis of the depth camera in the vertical plane. In a further implementation, the field of view (FOV) of the depth camera can be within a range of −30 degrees and +30 degrees about a principal axis of the depth camera in the vertical plane. It is understood that larger FOVs such as −40 degrees to +40 degrees, −50 degrees to +50 degrees, −60 degrees to +60 degrees, etc. by some implementations. Turning now to the horizontal plane, the principal axis of the camera can form an angle with the principal axis of the robot in a range of between 0 and 135 degrees in the horizontal plane. Examples of ranges for alignment for angle between camera principal axis and principal axis of the robot in the horizontal plane include between (i) 0 degrees and +/−30 degrees; (ii) 0 degrees and +/−45 degrees; and (iii) 0 degrees and +/−90 degrees and (iv) 0 degrees and +/−120 degrees, etc.

The method can include determining, by a processor, a 3D point cloud of points having 3D information including object location information (or object depth information or object distance information) from the depth measuring camera and the at least one visual spectrum-capable camera. The points in the 3D point cloud can correspond to the features in the environment as extracted. The method can include using the 3D point cloud of points to prepare the occupancy map of the environment by locating the objects identified at locations in the 3D point cloud of points.

The trained neural network classifiers can implement convolutional neural networks (CNN). The trained neural network classifiers can implement recursive neural networks (RNN) for time-based information. The trained neural network classifiers can implement long short-term memory networks (LSTM) for time-based information.

The ensemble of neural network classifiers can include 80 levels in total, from the input to the output.

The ensemble of neural network classifiers can implement a multi-layer convolutional network. The multi-layer convolutional network can include 60 convolutional levels. The ensemble of neural network classifiers can include normal convolutional levels and depth-wise convolutional levels.

The technology disclosed can include a robot system comprising a mobile platform having disposed thereon at least one visual spectrum-capable camera to capture images in a visual spectrum (RGB) range. The robot system can comprise at least one depth measuring camera. The robot system can comprise an interface to a host including one or more processors coupled to a memory storing instructions to implement the method presented above.

The technology disclosed can include a non-transitory computer readable medium comprising stored instructions, which when executed by a processor, cause the processor to implement actions comprising the method presented above.

Robot System Using Deep Learning Models and
3D Point Cloud to Identify, Locate and Avoid
Objects The technology disclosed presents systems and methods for a trained deep learning classifier deployed on a robot system to detect obstacles and pathways in an environment in which a robot moves. The method of detecting obstacles and pathways in an environment in which a robot move can be based upon mage information as captured by at least one visual spectrum-capable camera that captures images in a visual spectrum (RGB) range and at least one depth measuring camera. The method can include receiving image information captured by at least one visual spectrum-capable camera and location information captured by at least one depth measuring camera located on a mobile platform. The method can include extracting, by a processor, from the image information, features in the environment. determining, by a processor, a three-dimensional 3D point cloud of points having 3D information. The 3D information can include location information from the depth camera and the at least one visual spectrum-capable camera. The location information can include depth information or distance of the object from the robot system. The points in the 3D point cloud can correspond to the features in the environment as extracted. The method includes determining, by a processor, an identity for objects corresponding to the features as extracted from the images. The method can include using an ensemble of trained neural network classifiers, including first trained neural network classifiers, to determine the identity of objects. The method includes determining, by a processor, from the 3D point cloud and the identity for objects as determined using the ensemble of trained neural network classifiers, an occupancy map of the environment. The method includes determining, by a processor, from the 3D point cloud and the identity for objects as determined using the ensemble of trained neural network classifiers, an occupancy map of the environment.

The depth camera is tightly coupled with the at least one visual spectrum-capable camera by (i) an overlapping of fields of view; (ii) a calibration of pixels per unit area of field of view; and (iii) a synchronous capture of images. The tight coupling between the depth camera and the at least one visual spectrum-capable camera can include enable locations and features of objects to correspond to one another in sets of images captured by the cameras.

The method can include annotating, by a processor, the occupancy map with annotations of object identities at locations corresponding to at least some of the points in the 3D point cloud. The method can include using the occupancy map as annotated to plan paths to avoid certain ones of objects based upon identity and location.

The occupancy map is one of a 3D map and a 2D grid representation of a 3D map.

The method includes determining, by a processor, an identity for a room based upon objects identified that correspond to the features as extracted from the images. The method can include using a second trained neural network classifiers to determine the identity for the room. The method includes annotating, by a processor, the occupancy map with annotations of room identities at locations corresponding to at least some of the points in the 3D point cloud. The method includes using the occupancy map as annotated to plan paths to remain within or to avoid certain ones of rooms based upon identity and location.

The technology disclosed presents a robot system comprising a mobile platform having disposed thereon at least one visual spectrum-capable camera to capture images in a visual spectrum (RGB) range. The robot system can comprise at least one depth measuring camera. The robot system can comprise an interface to a host including one or more processors coupled to a memory storing instructions to implement the method presented above.

A non-transitory computer readable medium comprising stored instructions is disclosed. The instructions which when executed by a processor, cause the processor to implement actions comprising the method presented above.

Training of Deep Learning Models for a Robot System

The technology disclosed presents a method for training a plurality of neural network systems to recognize perception events and object identifications. The output from the trained plurality of neural network systems can be used to trigger in a mobile platform, applications that take responsive actions based upon image information of an environment in which the mobile platform moves. The image information is captured by at least one visual spectrum-capable camera that captures images in a visual spectrum (RGB) range and at least one depth measuring camera. The method includes generating at a time $t_0$, a training data set comprising 5000 to 10000 perception events. A perception event is labelled with sensed information and with object shapes, and corresponding ground truth object identifications. The method includes subdividing the object identifications into one or more overlapping situational categories. The method includes training a first set of perception classifier neural networks with the sensed information, object identification information, object shape information, and corresponding ground truth object identifications for each of the situational categories. The method includes saving parameters from training the perception classifier neural networks in tangible machine readable memory for use by the mobile platform in recognizing or responding to perceptions in the environment.

The method includes training a second set of perception classifier neural networks with the sensed information, object identification information, object shape information, and corresponding ground truth responsive actions for each of the situational categories. The method includes saving parameters from training the perception classifier neural networks in tangible machine readable memory for use by the mobile platform in recognizing or responding to perceptions in the environment.

In one implementation, the first and second sets of perception classifier neural networks are drawn from a superset of image processing layers of neural networks of disparate types. For example, the first and the second set of perception classifier neural networks can be different types of neural networks such as PointNet++, ResNet, VGG, etc.

In one implementation, the first and second sets of perception classifier neural networks are drawn from a superset of image processing layers of neural networks of a same type. For example, the first and the second set of perception classifier neural networks can be a same type of neural networks such as PointNet++, ResNet, VGG, etc., but with different configuration of layers in the network.

The method includes generating a third training data set at a time t1, later in time than t0, including additional perception events reported after time t0. The method includes using the third training data set, performing the subdividing, training and saving steps to retrain the classifier neural networks, thereby enabling the classifiers to learn from subsequent activity. The images for the additional perception events may not be sent outside physical boundaries of the environment in which the platform moves.

The training data set can further include images of different kinds of households.

The training data set can further include images of at least one household environment containing a plurality of different furniture or barriers.

In one implementation, at least some training images have people or pets.

The technology disclosed presents a robot system comprising a mobile platform having disposed thereon at least one visual spectrum-capable camera to capture images in a visual spectrum (RGB) range. The robot system comprises at least one depth measuring camera. The robot system comprises an interface to a host including one or more processors coupled to a memory storing instructions to prepare a plurality of neural network systems to recognize perception events and object identifications. The instructions include logic to trigger, in the mobile platform, applications that take responsive actions based upon image information of an environment in which the mobile platform moves. The image information is captured by at least one visual spectrum-capable camera and depth measuring camera. The computer instructions when executed on the processors, implement actions comprising the method presented above.

A non-transitory computer readable medium comprising stored instructions is disclosed. The instructions, when executed by a processor, cause the processor to: implement actions comprising the method presented above.

Preparing Training Data Sets for Deep Learning Models for a Robot System

The technology disclosed includes a method of preparing sample images for training of neural network systems. The method includes accessing a plurality of sample images and indicating with one or more polygons a presence of a certain kind of object. Thereby, the method includes, specifying (i) a location of the object in a sample image and (ii) a type of object. The method includes generating between 5,000 and 10,000 perception event simulations, each simulation labeled with 1 or more selected parameters, including an identity of the object. The method includes saving the simulated perception events with labelled ground truth parameters indicating at least an identity of the objects for use in training a neural network in a robot system.

The object is selected from a set comprising: unknown, air_conditioner, apparel, bag, basin, basket, bathtub, bed, book, box, cabinet, cat, ceiling, chair, cleaning_tool, clock, coffee_able, counter, curtain, desk, desktop, dining_table, dishes, dishwasher, dog, door, door_frame, exhaust_hood, fan, fireplace, floor, fragile_container, handrail, laptop, light, microwave, mirror, monitor, oven, painting, person, pillow, plant, plaything, pot, quilt, refrigerator, rice_cooker, rug, screen_door, shelf, shoe, shower, sink, sock, sofa, stairs, step, stool, stove, swivel_chair, television, toilet, trash_bin, vacuum, vase, wall, washer, water_heater, window, wire, door sill, bathroom_scale, key, stains, rag, yoga_mat, dock, excrement.

The method includes saving the simulated perception events with labelled ground truth parameters indicating at least one responsive activity for use in training a neural network in a robot system.

A system for preparing sample images for training of neural network systems is disclosed. The system comprises one or more processors coupled to a memory storing instructions; which instructions, when executed on the processors, implement actions comprising the method presented above.

A non-transitory computer readable medium is disclosed. The non-transitory computer readable medium comprises stored instructions, which when executed by a processor, cause the processor to implement actions comprising the method presented above.

Calibration of a Robot System

The technology disclosed includes a method for calibrating an autonomous robot having encoders, an inertial measurement unit (IMU) and one or more cameras. The method includes performing the following steps for each of a plurality of segments, each segment corresponding to a particular motion. The method includes querying, by a processor, for a first data from encoders. The method includes calculating, by a processor, a first reference pose using the first data from encoders. The method includes initiating, by a processor, performance by the robot of a movement, either linear or rotational, while accumulating sensor data. When the movement is complete, the method includes, querying by a processor, for a second data from encoders. The method includes calculating, by a processor, a second reference pose. The method includes storing the first and second reference poses and continuing to a next segment with a different motion until all segments of the plurality of segments are complete. The method includes calculating, by a processor, a set of calibration parameters including a scaling factor for the IMU, a wheel radius and an axle length, (x, y, theta, CPM (count per meter)) of an optical flow sensor (OFS) for odometry. The method includes applying thresholds to the calibration parameters calculated to determine pass or fail of the calibration.

Calculating a scaling factor calibration parameter further includes the following steps:
storing both angle data from encoder and an IMU reading for each segment;
performing 4 rotations and obtaining 4 groups of rotation angles;
wherein the computation of the IMU is 'actual=scaling_factor*reading'; and
$b=Ax \Rightarrow x=(A^T A)^{-1} A^T b$.

Calculating a wheel radius and an axle length calibration parameter further includes the following steps:
storing angle data from encoder and wheel encoders for each segment;
performing 4 rotations and 3 linear movements and obtaining 7 groups of data;
wherein the constraints for two wheel model is 'right_wheel_distance–left_wheel_distance=axle_length*angle_difference'; and
using Gauss-Newton to compute an optimization result.

Calculating a x, y, theta, CPM calibration parameters further includes the following steps:
storing angle data from encoder, calculated reference pose, and OFS readings for each segment;
performing 4 rotations and 3 linear movements and obtaining 7 groups of data;
wherein the constraints for OFS are simple: 'robot position=OFS reading+OFS offset'; and
using Gauss-Newton to compute an optimization result.

Calculating a reference pose using absolute distance encoder readings further includes the following steps:
assuming all distance readings from encoders are absolute; and
calculating an orientation of the mounting plate as well as center xy position.

Calculating a reference pose using simplified absolute distance encoder readings further includes the following steps:
assuming all distance readings from encoders are absolute;
assuming orientation of the mounting plate is the same as of platform; and
calculating center xy position of mounting plate.

Calculating a reference pose using relative distance encoder readings further includes the following steps:
assuming there is one start point that all distance readings from encoders are zeros, and distance readings from encoders are relative to that point;

assuming orientation of the mounting plate is the same as of platform; and calculating center xy position of mounting plate.

The technology disclosed includes a system comprising one or more processors coupled to a memory storing instructions; which instructions, when executed on the processors, implement actions comprising the method presented above.

A non-transitory computer readable medium comprising stored instructions is disclosed. The instructions when executed by a processor, cause the processor to implement actions comprising the method presented above.

Cleaning Robot System with Self-Cleaning Docking Station

The technology disclosed includes a system including a docking station. The docking station comprises an interface configured to couple with a robot and to off-load waste collected and stored by the robot and a robot comprising a mobile platform having disposed thereon a waste storage, at least one visual spectrum-capable camera and an interface to a host. The waste storage is used for accumulating waste collected from floor cleaning. The host can include one or more processors coupled to memory storing computer instructions to perform an area coverage task, according to at least some estimated poses and locations of at least some 3D points that define a map. The map is used to provide an occupancy grid mapping that provides guidance to the mobile platform that includes the camera. The computer instructions, when executed on the processors, implement a method comprising the following actions. The method includes receiving a sensory input from a set of sensors including at least one waste storage full sensor being monitored while performing the area coverage task. The sensory input can indicate a full condition exists with the waste storage of the robot. The method includes obtaining a location of a docking station from an occupancy grid mapping generated using sensory input from the at least one visual spectrum-capable camera. The method includes obtaining a set of waypoints generated. The set of waypoints can include a first waypoint in a path to the location of the docking station. The method includes initiating a motion to move the robot to the first waypoint.

The following clauses describe aspects of various examples of methods relating to embodiments of the invention discussed herein.

Clause 1. A method for using a deep learning trained classifier to detect obstacles and avoid obstructions in an environment in which a robot moves based upon image information as captured by at least one visual spectrum-capable camera that captures images in a visual spectrum (RGB) range and at least one depth measuring camera, comprising:

receiving image information captured by the at least one visual spectrum-capable camera and object location information including depth information captured by the at least one depth measuring camera located on a mobile platform;

extracting, by a processor, from the image information, features in the environment;

determining, by a processor, using an ensemble of trained neural network classifiers, an identity for objects corresponding to the features as extracted from the images;

determining, by a processor, from the object location information and the identity for objects as determined using the ensemble of trained neural network classifiers, an occupancy map of the environment; and providing the occupancy map to a process for initiating robot movement to avoid objects in the occupancy map of the environment.

Clause 2. The method of clause 1, wherein the depth camera is tightly coupled with the at least one visual spectrum-capable camera by (i) an overlapping of fields of view; (ii) a calibration of pixels per unit area of field of view; and (iii) a synchronous capture of images; thereby enabling locations and features of objects to correspond to one another in sets of images captured by the cameras.

Clause 3. The method of clause 2, wherein the calibration of pixels per unit area of field of view of the at least one visual spectrum-capable camera and the depth camera is 1:1.

Clause 4. The method of clause 2, wherein the calibration of pixels per unit area of field of view of the at least one visual spectrum-capable camera and the depth camera is 16:1.

Clause 5. The method of clause 2, wherein the calibration of pixels per unit area of field of view of the at least one visual spectrum-capable camera and the depth camera is 24:1.

Clause 6. The method of clause 1, wherein the field of view of the at least one visual spectrum-capable camera is 1920×1080 and the depth camera is 200×100.

Clause 7. The method of clause 1, wherein the field of view of the depth camera is within a range of −20 and +20 about a principal axis of the depth camera.

Clause 8. The method of clause 1, wherein the field of view of the depth camera is within a range of −30 and +30 about a principal axis of the depth camera.

Clause 9. The method of clause 1, further including:

determining, by a processor, a 3D point cloud of points having 3D information including object location information from the depth measuring camera and the at least one visual spectrum-capable camera, the points corresponding to the features in the environment as extracted; and using the 3D point cloud of points to prepare the occupancy map of the environment by locating the objects identified at locations in the 3D point cloud of points.

Clause 10. The method of clause 1, wherein trained neural network classifiers implement convolutional neural networks (CNN).

Clause 11. The method of clause 1, further including employing trained neural network classifiers implementing recursive neural networks (RNN) for time-based information.

Clause 12. The method of clause 1, further including employing trained neural network classifiers implementing long short-term memory networks (LSTM) for time-based information.

Clause 13. The method of clause 1, wherein the ensemble of neural network classifiers includes:

80 levels in total, from the input to the output.

Clause 14. The method of clause 1, wherein the ensemble of neural network classifiers implements a multi-layer convolutional network.

Clause 15. The method of clause 6, wherein the multi-layer convolutional network includes:

60 convolutional levels.

Clause 16. The method of clause 1, wherein the ensemble of neural network classifiers includes:

normal convolutional levels and depth-wise convolutional levels.

Clause 17. A robot system comprising:
a mobile platform having disposed thereon:
at least one visual spectrum-capable camera to capture images in a visual spectrum (RGB) range;
at least one depth measuring camera; and
an interface to a host including one or more processors coupled to a memory storing instructions to implement the method of clause 1.

Clause 18. A non-transitory computer readable medium comprising stored instructions, which when executed by a processor, cause the processor to: implement actions comprising the method of clause 1.

Clause 21. A method for using a deep learning trained classifier to detect obstacles and pathways in an environment in which a robot moves, based upon image information as captured by at least one visual spectrum-capable camera that captures images in a visual spectrum (RGB) range and at least one depth measuring camera, the method comprising:
receiving image information captured by at least one visual spectrum-capable camera and location information captured by at least one depth measuring camera located on a mobile platform;
extracting, by a processor, from the image information, features in the environment;
determining, by a processor, a three-dimensional 3D point cloud of points having 3D information including location information from the depth camera and the at least one visual spectrum-capable camera, the points corresponding to the features in the environment as extracted;
determining, by a processor, using an ensemble of trained neural network classifiers, including first trained neural network classifiers, an identity for objects corresponding to the features as extracted from the images;
determining, by a processor, from the 3D point cloud and the identity for objects as determined using the ensemble of trained neural network classifiers, an occupancy map of the environment; and
providing the occupancy map to a process for initiating robot movement to avoid objects in the occupancy map of the environment.

Clause 22. The method of clause 21,
wherein the depth camera is tightly coupled with the at least one visual spectrum-capable camera by (i) an overlapping of fields of view; (ii) a calibration of pixels per unit area of field of view; and (iii) a synchronous capture of images; thereby enabling locations and features of objects to correspond to one another in sets of images captured by the cameras.

Clause 23. The method of clause 21, further including:
annotating, by a processor, the occupancy map with annotations of object identities at locations corresponding to at least some of the points in the 3D point cloud; and
using the occupancy map as annotated to plan paths to avoid certain ones of objects based upon identity and location.

Clause 24. The method of clause 23, wherein the occupancy map is one of a 3D map and a 2D grid representation of a 3D map.

Clause 25. The method of clause 21, further including:
determining, by a processor, using second trained neural network classifiers, an identity for a room based upon objects identified that correspond to the features as extracted from the images;
annotating, by a processor, the occupancy map with annotations of room identities at locations corresponding to at least some of the points in the 3D point cloud; and
using the occupancy map as annotated to plan paths to remain within or to avoid certain ones of rooms based upon identity and location.

Clause 26. A robot system comprising:
a mobile platform having disposed thereon:
at least one visual spectrum-capable camera to capture images in a visual spectrum (RGB) range;
at least one depth measuring camera; and
an interface to a host including one or more processors coupled to a memory storing instructions to implement the method of clause 21.

Clause 27. A non-transitory computer readable medium comprising stored instructions, which when executed by a processor, cause the processor to: implement actions comprising the method of clause 21.

Clause 31. A method for training a plurality of neural network systems to recognize perception events and object identifications and to trigger, in a mobile platform, applications that take responsive actions based upon image information of an environment in which the mobile platform moves as captured by at least one visual spectrum-capable camera that captures images in a visual spectrum (RGB) range and at least one depth measuring camera, the method comprising:
generating at a time $t_0$, a training data set comprising 5000 to 10000 perception events, each perception event labelled with sensed information and with object shapes, and corresponding ground truth object identifications;
subdividing the object identifications into one or more overlapping situational categories;
training a first set of perception classifier neural networks with the sensed information, object identification information, object shape information, and corresponding ground truth object identifications for each of the situational categories; and
saving parameters from training the perception classifier neural networks in tangible machine readable memory for use by the mobile platform in recognizing or responding to perceptions in the environment.

Clause 32. The method of clause 31, further including:
training a second set of perception classifier neural networks with the sensed information, object identification information, object shape information, and corresponding ground truth responsive actions for each of the situational categories; and
saving parameters from training the perception classifier neural networks in tangible machine readable memory for use by the mobile platform in recognizing or responding to perceptions in the environment.

Clause 33. The method of clause 32, wherein
the first and second sets of perception classifier neural networks are drawn from a superset of image processing layers of neural networks of disparate types.

Clause 34. The method of clause 32, wherein
the first and second sets of perception classifier neural networks are drawn from a superset of image processing layers of neural networks of a same type.

Clause 35. The method of clause 31, further including:
generating a third training data set at a time t1, later in time than t0, including additional perception events reported after time t0; and using the third training data set, performing the subdividing, training and saving steps to retrain the classifier neural networks, thereby enabling the classifiers to learn from subsequent activity;

wherein images for the additional perception events are not sent outside physical boundaries of the environment in which the platform moves.

Clause 36. The method of clause 31, wherein the training set data further includes:

images of different kinds of households.

Clause 37. The method of clause 31, wherein the training set data further includes:

images of at least one household environment containing a plurality of different furniture or barriers.

Clause 38. The method of clause 31, wherein at least some training images have people or pets.

Clause 39. A robot system comprising:

a mobile platform having disposed thereon:

at least one visual spectrum-capable camera to capture images in a visual spectrum (RGB) range;

at least one depth measuring camera; and an interface to a host including one or more processors coupled to a memory storing instructions to prepare a plurality of neural network systems to recognize perception events and object identifications and to trigger, in the mobile platform, applications that take responsive actions based upon image information of an environment in which the mobile platform moves as captured by at least one visual spectrum-capable camera and depth measuring camera; which computer instructions, when executed on the processors, implement actions comprising the method of clause 31.

Clause 40. A non-transitory computer readable medium comprising stored instructions, which when executed by a processor, cause the processor to: implement actions comprising the method of clause 31.

Clause 41. A method of preparing sample images for training of neural network systems, the method including:

accessing a plurality of sample images and indicating with one or more polygons a presence of a certain kind of object; thereby specifying (i) a location of the object in a sample image and (ii) a type of object;

generating between 5,000 and 10,000 perception event simulations, each simulation labeled with 1 or more selected parameters, including an identity of the object; and saving the simulated perception events with labelled ground truth parameters indicating at least an identity of the objects for use in training a neural network in a robot system.

Clause 42. The method of clause 41, wherein the object is selected from a set comprising: unknown, air_conditioner, apparel, bag, basin, basket, bathtub, bed, book, box, cabinet, cat, ceiling, chair, cleaning_tool, clock, coffee_table, counter, curtain, desk, desktop, dining_table, dishes, dishwasher, dog, door, door_frame, exhaust hood, fan, fireplace, floor, fragile_container, handrail, laptop, light, microwave, mirror, monitor, oven, painting, person, pillow, plant, plaything, pot, quilt, refrigerator, rice_cooker, rug, screen_door, shelf, shoe, shower, sink, sock, sofa, stairs, step, stool, stove, swivel chair, television, toilet, trash_bin, vacuum, vase, wall, washer, water_heater, window, wire, door_sill, bathroom_scale, key, stains, rag, yoga_mat, dock, excrement.

Clause 43. The method of clause 41, further including:

saving the simulated perception events with labelled ground truth parameters indicating at least one responsive activity for use in training a neural network in a robot system.

Clause 44. A system comprising:

one or more processors coupled to a memory storing instructions; which instructions, when executed on the processors, implement actions comprising the method of clause 41.

Clause 45. A non-transitory computer readable medium comprising stored instructions, which when executed by a processor, cause the processor to: implement actions comprising the method of clause 41.

Clause 51. A method for preparing a segmented occupancy grid map based upon image information of an environment in which a robot moves captured by at least one visual spectrum-capable camera and at least one depth measuring camera comprising:

receiving image information captured by at least one visual spectrum-capable camera and location information captured by at least one depth measuring camera located on a mobile platform;

extracting, by a processor, from the image information, features in the environment;

determining, by a processor, a 3D point cloud of points having 3D information including location information from the depth camera and the at least one visual spectrum-capable camera, the points corresponding to the features in the environment as extracted;

determining, by a processor, from the 3D point cloud, an occupancy map of the environment; and segmenting, by a processor, the occupancy map into a segmented occupancy map of regions that represent rooms and corridors in the environment.

Clause 52. The method of clause 51, wherein segmenting an occupancy map further includes:

(1) reducing noise in the occupancy map;

(2) classify voxels as (i) free, (ii) occupied; or (iii) unexplored;

(3) removing ray areas;

(4) removing obstacles within rooms; and (5) obstacles attached to boundaries;

(6) computing for each pixel, a distance to a closest zero pixel;

(7) finding candidate seeds by binarizing distance with a threshold change from low to high and finding blobs with size less than 2000; dilate the blobs; and remove noise blobs;

(8) watersheding blobs until boundaries are encountered;

(9) merging smaller rooms; and

(10) aligning the occupancy map.

Clause 53. The method of clause 52, wherein a voxel classified as occupied further includes a label from a neural network classifier implementing 3D semantic analysis.

Clause 54. The method of clause 52, wherein classifying further includes:

setting a binary threshold to find free and occupied voxels;

filling holes according to surrounding voxels by:

if there are more free points around any voids, the voids will become free; otherwise, smaller voids will become occupied, and larger voids will remain unexplored; and using sensory information, repairing defects.

Clause 55. The method of clause 52, wherein removing ray areas further includes:
 finding free edges in the map;
 drawing a line between voxels in nearby edges, if the line is not blocked by occupied voxels or sensor voxels.

Clause 56. A robot system comprising:
 a mobile platform having disposed thereon:
 at least one visual spectrum-capable camera to capture images in a visual spectrum (RGB) range;
 at least one depth measuring camera; and
 an interface to a host including one or more processors coupled to a memory storing instructions to prepare a segmented occupancy grid map based upon image information captured by the at least one visual spectrum-capable camera and location information captured by the at least one depth measuring camera; which computer instructions, when executed on the processors, implement actions comprising the method of clause 51.

Clause 57. A non-transitory computer readable medium comprising stored instructions, which when executed by a processor, cause the processor to implement actions comprising the method of clause 51.

Clause 61. A method for calibrating an autonomous robot having encoders, an inertial measurement unit (IMU) and one or more cameras, comprising:
 for each of a plurality of segments, each segment corresponding to a particular motion,
  querying, by a processor, for a first data from encoders;
  calculating, by a processor, a first reference pose using the first data from encoders;
  initiating, by a processor, performance by the robot of a movement, either linear or rotational, while accumulating sensor data;
  when the movement is complete, querying by a processor for a second data from encoders;
  calculating, by a processor, a second reference pose;
  storing the first and second reference poses and continuing to a next segment with a different motion until all segments of the plurality of segments are complete;
 calculating, by a processor, a set of calibration parameters including a scaling factor for the IMU, a wheel radius and an axle length, (x, y, theta, CPM (count per meter)) of an optical flow sensor (OFS) for odometry; and
 applying thresholds to the calibration parameters calculated to determine pass or fail.

Clause 62. The method of clause 61, wherein calculating a scaling factor calibration parameter further includes:
 storing both angle data from encoder and an IMU reading for each segment;
 performing 4 rotations and obtaining 4 groups of rotation angles;
 wherein the computation of the IMU is 'actual=scaling_factor*reading'; and
 $b=Ax \Rightarrow x=(A^TA)^{-1}A^Tb$.

Clause 63. The method of clause 61, wherein calculating a wheel radius and an axle length calibration parameter further includes:
 storing angle data from encoder and wheel encoders for each segment;
 performing 4 rotations and 3 linear movements and obtaining 7 groups of data;
 wherein the constraints for two wheel model is 'right_wheel_distance−left_wheel_distance=axle_length*angle_difference'; and
 using Gauss-Newton to compute an optimization result.

Clause 64. The method of clause 61, wherein calculating a x, y, theta, CPM calibration parameters further includes:
 storing angle data from encoder, calculated reference pose, and OFS readings for each segment;
 performing 4 rotations and 3 linear movements and obtaining 7 groups of data;
 wherein the constraints for OFS are simple: 'robot position=OFS reading+OFS offset'; and
 using Gauss-Newton to compute an optimization result.

Clause 65. The method of clause 61, wherein calculating a reference pose using absolute distance encoder readings further includes:
 assuming all distance readings from encoders are absolute; and
 calculating an orientation of the mounting plate as well as center xy position.

Clause 66. The method of clause 61, wherein calculating a reference pose using simplified absolute distance encoder readings further includes:
 assuming all distance readings from encoders are absolute;
 assuming orientation of the mounting plate is the same as of platform; and
 calculating center xy position of mounting plate.

Clause 67. The method of clause 61, wherein calculating a reference pose using relative distance encoder readings further includes:
 assuming there is one start point that all distance readings from encoders are zeros, and distance readings from encoders are relative to that point;
 assuming orientation of the mounting plate is the same as of platform; and
 calculating center xy position of mounting plate.

Clause 68. A system comprising:
 one or more processors coupled to a memory storing instructions; which instructions, when executed on the processors, implement actions comprising the method of clause 61.

Clause 69. A non-transitory computer readable medium comprising stored instructions, which when executed by a processor, cause the processor to implement actions comprising the method of clause 61.

Clause 71. A system, including:
 a docking station comprising:
  an interface configured to couple with a robot and to off-load waste collected and stored by the robot; and
 a robot comprising a mobile platform having disposed thereon:
  a waste storage for accumulating waste collected from floor cleaning;
  at least one visual spectrum-capable camera; and
  an interface to a host including one or more processors coupled to memory storing computer instructions to perform an area coverage task, according to at least some estimated poses and locations of at least some 3D points that define a map, the map used to provide an occupancy grid mapping that provides guidance to the mobile platform that includes the camera, which computer instructions, when executed on the processors, implement actions comprising:
   receiving a sensory input from a set of sensors including at least one waste storage full sensor being monitored while performing the area coverage task, the sensory input indicating a full condition exists with the waste storage of the robot;

obtaining a location of a docking station from an occupancy grid mapping generated using sensory input from the at least one visual spectrum-capable camera;

obtaining a set of waypoints generated, the set of waypoints including a first waypoint in a path to the location of the docking station; and initiating motion to move the robot to the first waypoint.

Computer System

Figure 29:
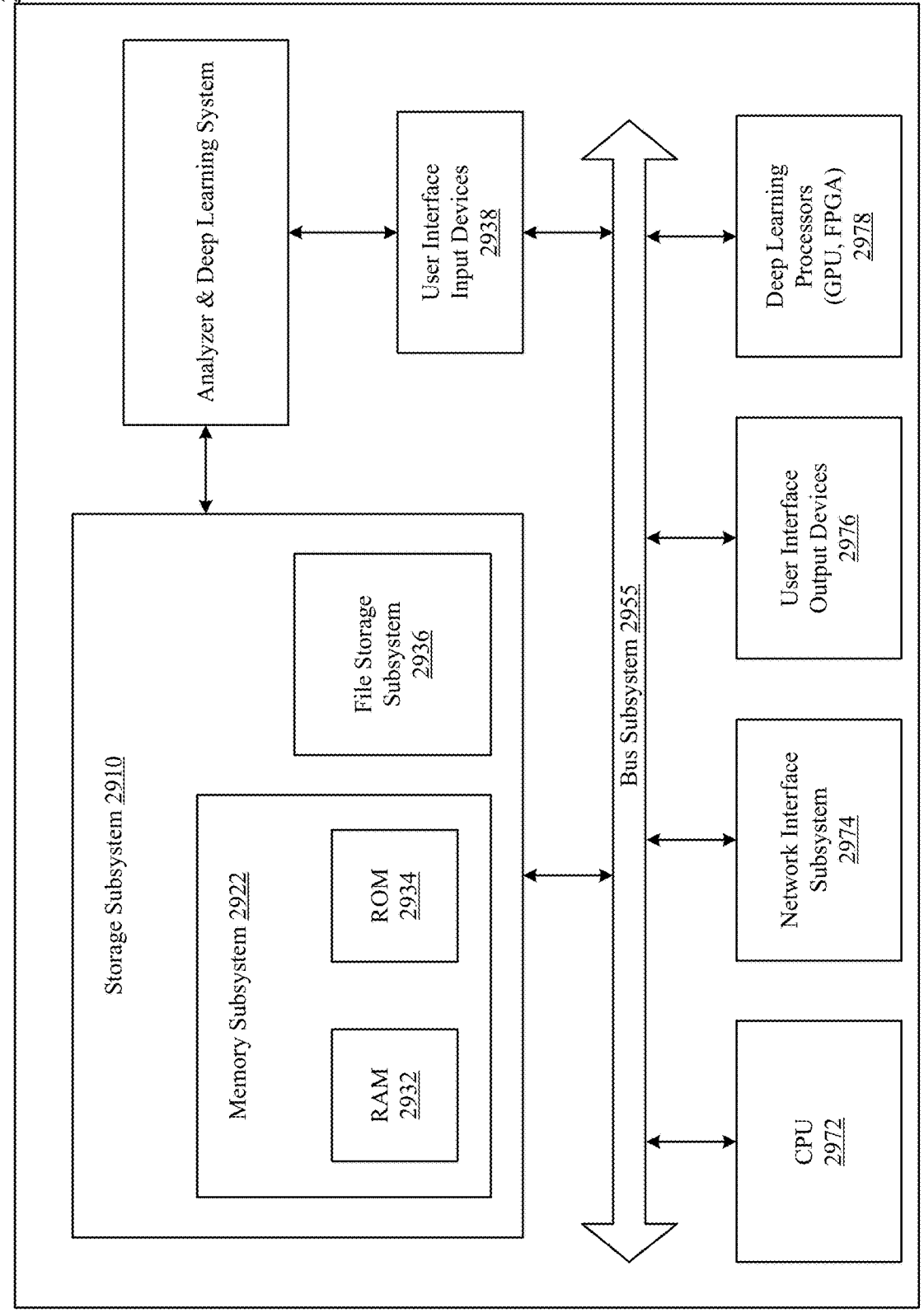
FIG. 29 is a simplified block diagram of a computer system 1100 that can be used to implement the autonomous robot with deep learning environment recognition and sensor calibration.

FIG. 29 is a simplified block diagram of a computer system 2900 that can be used to implement an autonomous robot with deep learning environment recognition and sensor calibration. Computer system 2900 includes at least one central processing unit (CPU) 2972 that communicates with a number of peripheral devices via bus subsystem 2955. These peripheral devices can include a storage subsystem 2910 including, for example, memory devices and a file storage subsystem 2936, user interface input devices 2938, user interface output devices 2976, and a network interface subsystem 2974. The input and output devices allow user interaction with computer system 2900. Network interface subsystem 2974 provides an interface to outside networks, including an interface to corresponding interface devices in other computer systems.

In one implementation, the advanced sensing and autonomous platform of FIG. 1 is communicably linked to the storage subsystem 2910 and the user interface input devices 2938.

User interface input devices 2938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2900.

User interface output devices 2976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2900 to the user or to another machine or computer system.

Storage subsystem 2910 stores programming and data constructs that provide the functionality of some or all of the modules and methods described herein. These software modules are generally executed by deep learning processors 2978.

Deep learning processors 2978 can be graphics processing units (GPUs) or field-programmable gate arrays (FPGAs). Deep learning processors 2978 can be hosted by a deep learning cloud platform such as Google Cloud Platform™, Xilinx™, and Cirrascale™. Examples of deep learning processors 2978 include Google's Tensor Processing Unit (TPU)™, rackmount solutions like GX4 Rackmount Series™, GX2 Rackmount Series™, NVIDIA DGX-1™, Microsoft' Stratix V FPGA™, Graphcore's Intelligent Processor Unit (IPU)™, Qualcomm's Zeroth Platform™ with Snapdragon processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 2922 used in the storage subsystem 2910 can include a number of memories including a main random access memory (RAM) 2932 for storage of instructions and data during program execution and a read only memory (ROM) 2934 in which fixed instructions are stored. A file storage subsystem 2936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2936 in the storage subsystem 2910, or in other machines accessible by the processor.

Bus subsystem 2955 provides a mechanism for letting the various components and subsystems of computer system 2900 communicate with each other as intended. Although bus subsystem 2955 is shown schematically as a single bus, alternative implementations of the bus subsystem can use multiple busses.

Computer system 2900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2900 depicted in FIG. 29 is intended only as a specific example for purposes of illustrating the preferred embodiments of the present technology. Many other configurations of computer system 2900 are possible having more or less components than the computer system depicted in FIG. 29.

The present technology can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the present technology can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

A Base64 is a binary-to-text encoding scheme that represents binary data in an ASCII string format by translating it into a radix-64 representation. Each Base64 digit represents exactly 6 bits of data. Three 8-bit bytes (i.e., a total of 24 bits) can therefore be represented by four 6-bit Base64 digits. Common to all binary-to-text encoding schemes, Base64 is designed to carry data stored in binary formats across channels that only reliably support text content. Base64 is used embed image files or other binary assets inside textual assets such as HTML and CSS files. A byte is a basic storage unit used in many integrated circuit logic and memory circuits, and consists of eight bits. Basic storage unit can have other sizes, including for example one bit, two bits, four bits, 16 bits and so on. Thus, the description of a string 64 data string set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four-bit storage units combined with eight-bit storage units.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the present technology, and it will be understood that numerous additional steps for accomplishing other functions can be performed before, after and between those shown.

While the present technology is described by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the present technology and the scope of the following claims.

What is claimed is:

1. A method for preparing a segmented occupancy grid map based upon image information of an environment in which a robot moves captured by an at least one visual spectrum-capable camera, and at least one depth measuring camera comprising:
   receiving image information captured by the at least one visual spectrum-capable camera and location information captured by the at least one depth measuring camera located on a mobile platform;
   extracting, by a processor, from the image information, features in the environment;
   determining, by a processor, a 3D point cloud of points having 3D information including location information from the depth measuring camera and the at least one visual spectrum-capable camera, the points corresponding to the features in the environment as extracted;
   determining, by a processor, from the 3D point cloud, an occupancy map of the environment; and segmenting, by a processor, the occupancy map into a segmented occupancy map of regions that represent rooms and corridors in the environment by:
   determining for non-zero pixels, a distance to a zero pixel, and binning each distance;
   determining for binned distances, a blob having distances meeting a threshold size; and
   organizing blobs into regions fitting boundaries of the occupancy map, yielding the segmented occupancy map.

2. A method of preparing a segmented occupancy grid map based at least in part upon an occupancy map determined based at least in part upon image information of an environment in which a robot moves captured by at least one visual spectrum- capable camera and at least one depth measuring camera including:
   reducing noise in the occupancy map;
   classifying voxels as (i) free, (ii) occupied, or (iii) unexplored;
   removing ray areas;
   removing any obstacles within rooms and any obstacles attached to boundaries;
   computing for each non-zero pixel, a distance to a closest zero pixel;
   finding candidate seeds by binarizing the distance with a threshold change and finding blobs with a blob size meeting a threshold blob size; dilating the blobs; and removing any noise blobs;
   watersheding the blobs until one or more boundaries are encountered;
   merging one or more rooms together; and
   aligning the occupancy map.

3. The method of claim 2, wherein a voxel classified as occupied further includes a label from a neural network classifier, implementing 3D semantic analysis.

4. The method of claim 2, wherein classifying further includes:
   setting a binary threshold to find free and occupied voxels;
   filling holes according to surrounding voxels by:
      if there are more free points around any voids, the voids will become free; otherwise,
      smaller voids will become occupied, and larger voids will remain unexplored; and
   using sensory information, repairing defects.

5. The method of claim 2, wherein removing ray areas further includes:
   finding one or more free edges in the occupancy map;
   drawing a line between at least two voxels in nearby edges, if the line is not blocked by occupied by a voxel or a sensor voxel.

6. The method of claim 3, wherein the neural network classifier implements one or more convolutional neural networks (CNN).

7. The method of claim 3, further including employing a trained neural network classifier implementing one or more recursive neural networks (RNN) for time-based information.

8. The method of claim 3, further including employing a trained neural network classifier implementing long short-term memory networks (LSTM) for time-based information.

9. The method of claim 3, wherein the neural network classifier includes:
80 levels, from an input to an output.

10. The method of claim 3, wherein the neural network classifier implements a multi-layer convolutional network.

11. The method of claim 10, wherein the multi-layer convolutional network includes:
60 convolutional levels.

12. The method of claim 3, wherein the neural network classifier includes:
a normal convolutional level and a depth-wise convolutional level.

13. A robot system comprising:
a mobile platform having disposed thereon:
at least one visual spectrum-capable camera to capture images in a visual spectrum (RGB) range;
at least one depth measuring camera; and
an interface to a host including one or more processors coupled to a memory storing instructions to prepare a segmented occupancy grid map based at least in part upon an occupancy map determined based at least in part upon image information captured by the at least one visual spectrum-capable camera and location information captured by the at least one depth measuring camera; which computer instructions, when executed on the processors, implement operations comprising:
reducing noise in the occupancy map;
classifying voxels as (i) free, (ii) occupied, or (iii) unexplored;
removing ray areas;
removing any obstacles within rooms and any obstacles attached to boundaries;
computing for each non-zero pixel, a distance to a closest zero pixel;
finding candidate seeds by binarizing the distance with a threshold change and finding blobs with a blob size meeting a threshold blob size; dilating the blobs; and removing any noise blobs;
watersheding the blobs until one or more boundaries are encountered;
merging one or more rooms together; and
aligning the occupancy map.

14. A non-transitory computer readable medium comprising stored instructions for preparing a segmented occupancy grid map based at least in part upon an occupancy map, which when executed by a processor, cause the processor to implement actions comprising;
reducing noise in the occupancy map;
classifying voxels as (i) free, (ii) occupied, or (iii) unexplored;
removing ray areas;
removing any obstacles within rooms and any obstacles attached to boundaries;
computing for each non-zero pixel, a distance to a closest zero pixel;
finding candidate seeds by binarizing the distance with a threshold change and finding blobs with a blob size meeting a threshold blob size; dilating the blobs; and removing any noise blobs;
watersheding the blobs until one or more boundaries are encountered;
merging one or more rooms together; and
aligning the occupancy map.

15. The non-transitory computer readable medium of claim 14, wherein classifying further includes:
setting a binary threshold to find free and occupied voxels;
filling holes according to surrounding voxels by:
if there are more free points around any voids, the voids will become free; otherwise,
smaller voids will become occupied, and larger voids will remain unexplored; and
using sensory information, repairing defects.

16. The non-transitory computer readable medium of claim 14, wherein removing ray areas further includes:
finding one or more free edges in the occupancy map;
drawing a line between at least two voxels in nearby edges, if the line is not blocked by occupied by a voxel or a sensor voxel.

17. The non-transitory computer readable medium of claim 14, wherein the occupancy map is determined based at least in part upon image information.

18. The non-transitory computer readable medium of claim 14, wherein occupancy map is determined based at least in part upon image information captured by an at least one visual spectrum-capable.

19. The non-transitory computer readable medium of claim 14, wherein occupancy map determined based at least in part upon image information captured by an at least one visual spectrum-capable camera and location information captured by an at least one depth measuring camera.

20. The non-transitory computer readable medium of claim 14, wherein the meeting a threshold blob size comprises meeting a blob size threshold of 2000 pixels.

* * * * *